(12) United States Patent
Kitagawa et al.

(10) Patent No.: US 6,679,992 B1
(45) Date of Patent: Jan. 20, 2004

(54) METHOD AND APPARATUS FOR PURIFYING POLLUTED SUBSTANCES CONTAINING HALOGENATED ORGANIC COMPOUND

(75) Inventors: Masayoshi Kitagawa, Kanagawa (JP); Tatsuo Shimomura, Tokyo (JP); Shunji Oya, Kanagawa (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/869,305
(22) PCT Filed: Jan. 25, 2000
(86) PCT No.: PCT/JP00/00339
§ 371 (c)(1), (2), (4) Date: Jul. 19, 2001
(87) PCT Pub. No.: WO00/43138
PCT Pub. Date: Jul. 27, 2000

(30) Foreign Application Priority Data

| Jan. 25, 1999 | (JP) | ............................................. 9-015929 |
| Feb. 10, 1999 | (JP) | ............................................. 9-033403 |
| Jun. 4, 1999 | (JP) | ............................................. 9-158100 |

(51) Int. Cl.[7] ................................................. C02F 3/00
(52) U.S. Cl. ......................... 210/610; 210/757; 210/170
(58) Field of Search .................................. 210/610, 757, 210/170

(56) References Cited

U.S. PATENT DOCUMENTS 5,766,929 A    6/1998   Orolin et al.

FOREIGN PATENT DOCUMENTS

| JP | 7-136632 | 5/1995 |
| JP | 10-263522 | 10/1998 |
| WO | WO 98/34740 | 8/1998 |

*Primary Examiner*—Chester T. Barry
(74) *Attorney, Agent, or Firm*—Oblon, Spivak, McClelland, Maier & Neustadt, P.C.

(57) ABSTRACT

A nutrient solution is reduced with a reducing agent, and introduced into a contaminated object. Alternatively, groundwater reduced with a reducing agent is introduced into the contaminated object. Groundwater is contacted with the reducing agent while being circulated between an aquifer and a housing. A nutrient source for heterotrophic anaerobic microorganism may also be introduced into the contaminated object. The contaminated object contaminated with halogenated organic compounds can be purified efficiently and easily.

35 Claims, 34 Drawing Sheets

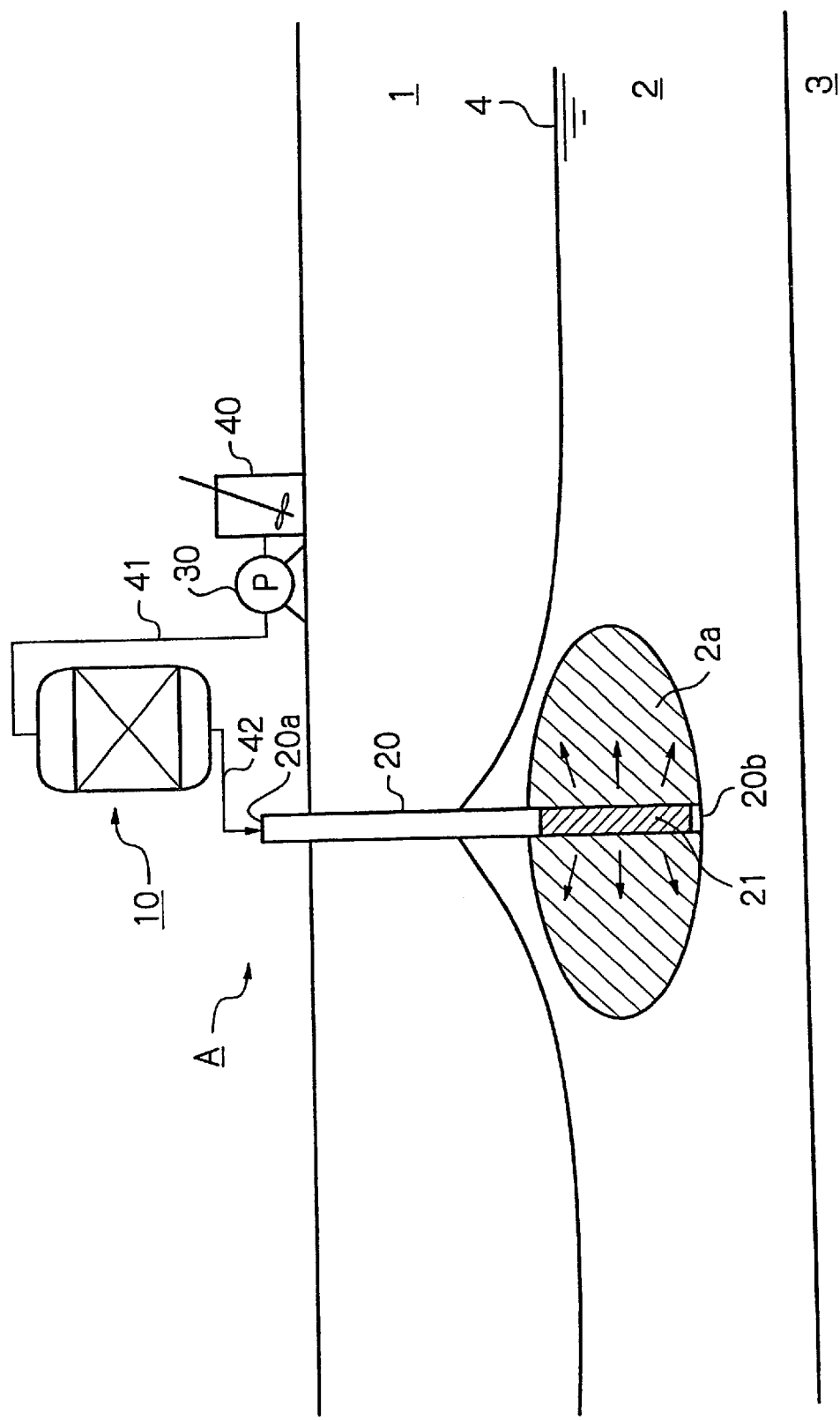

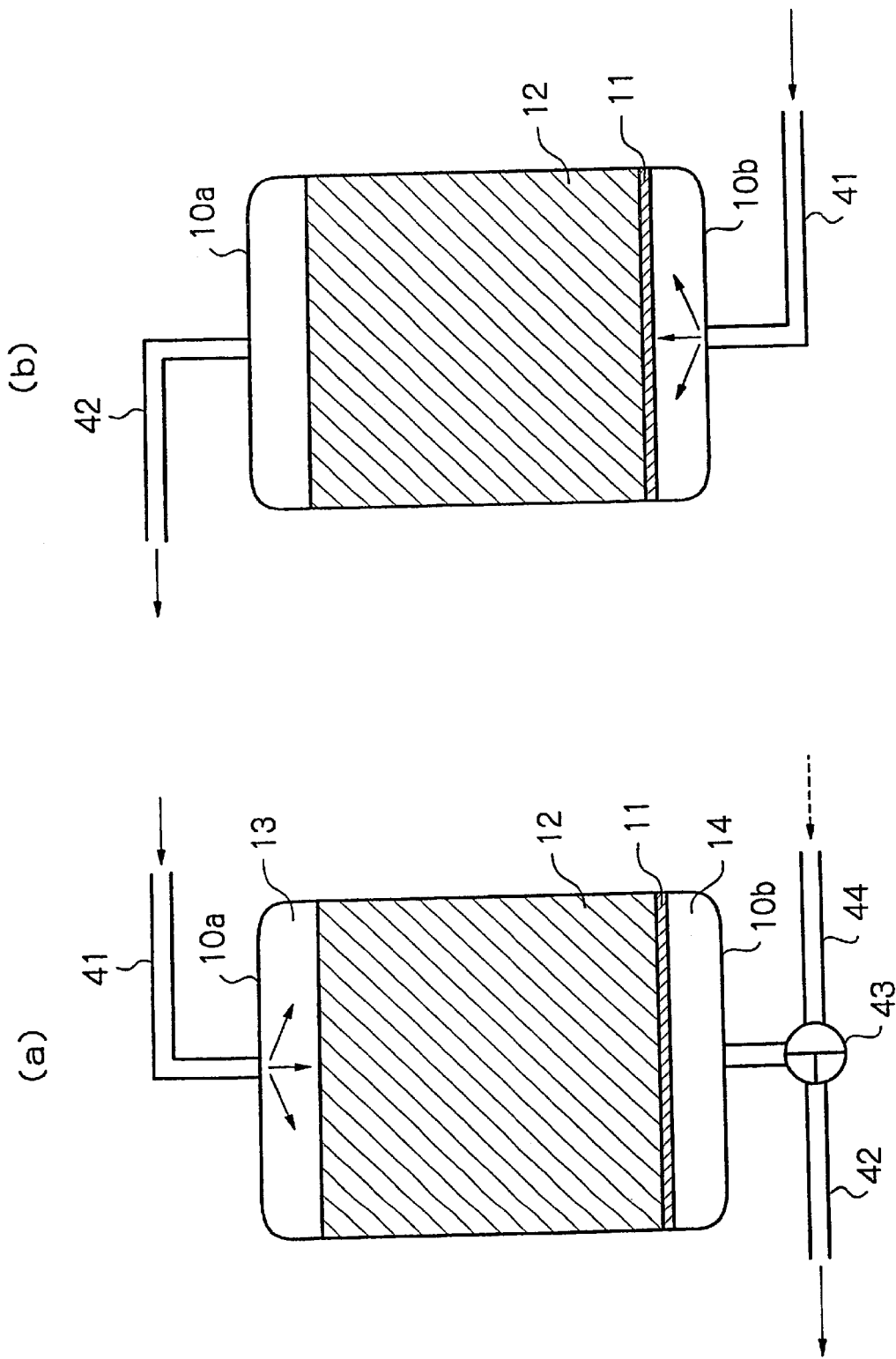

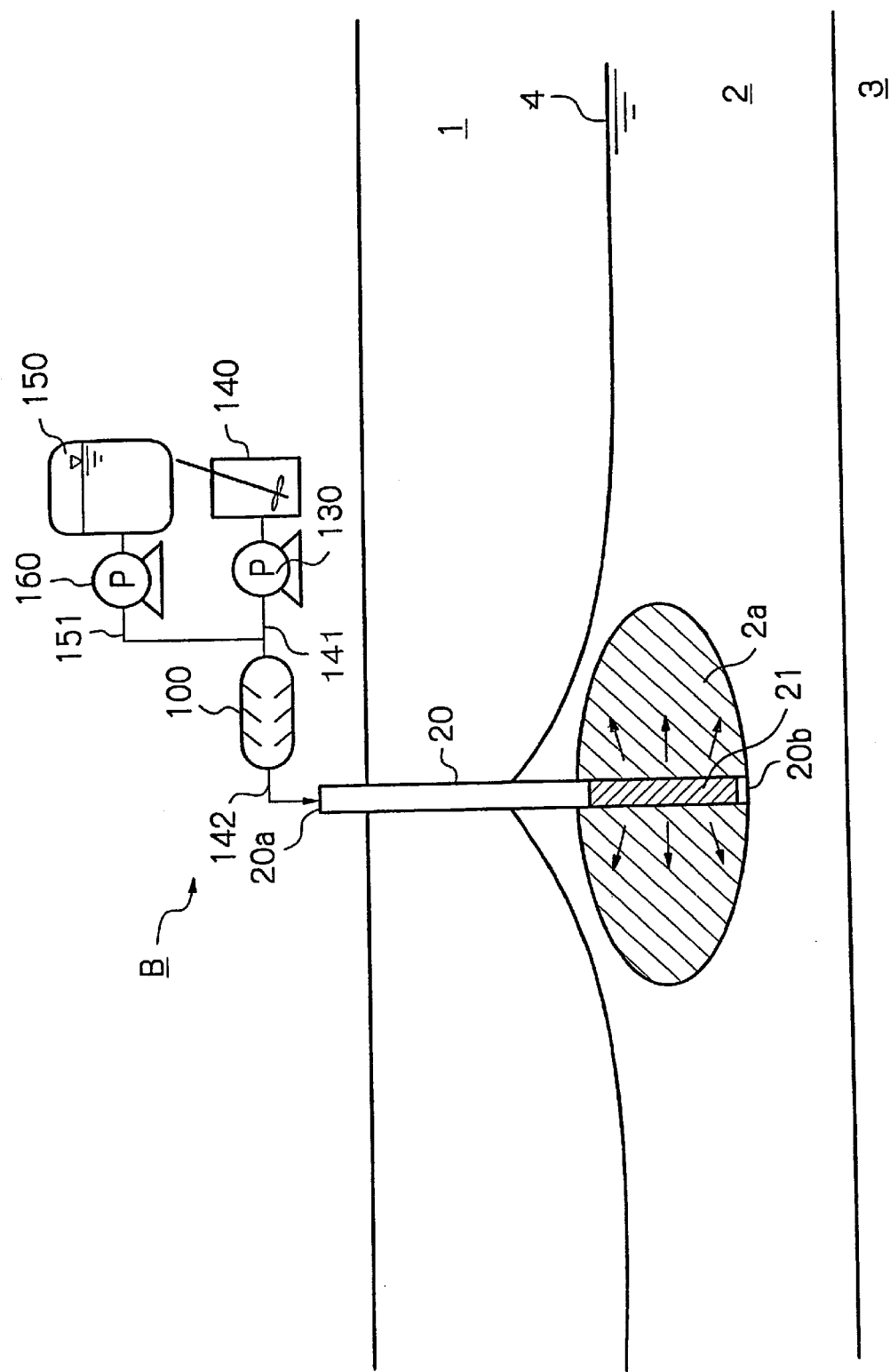

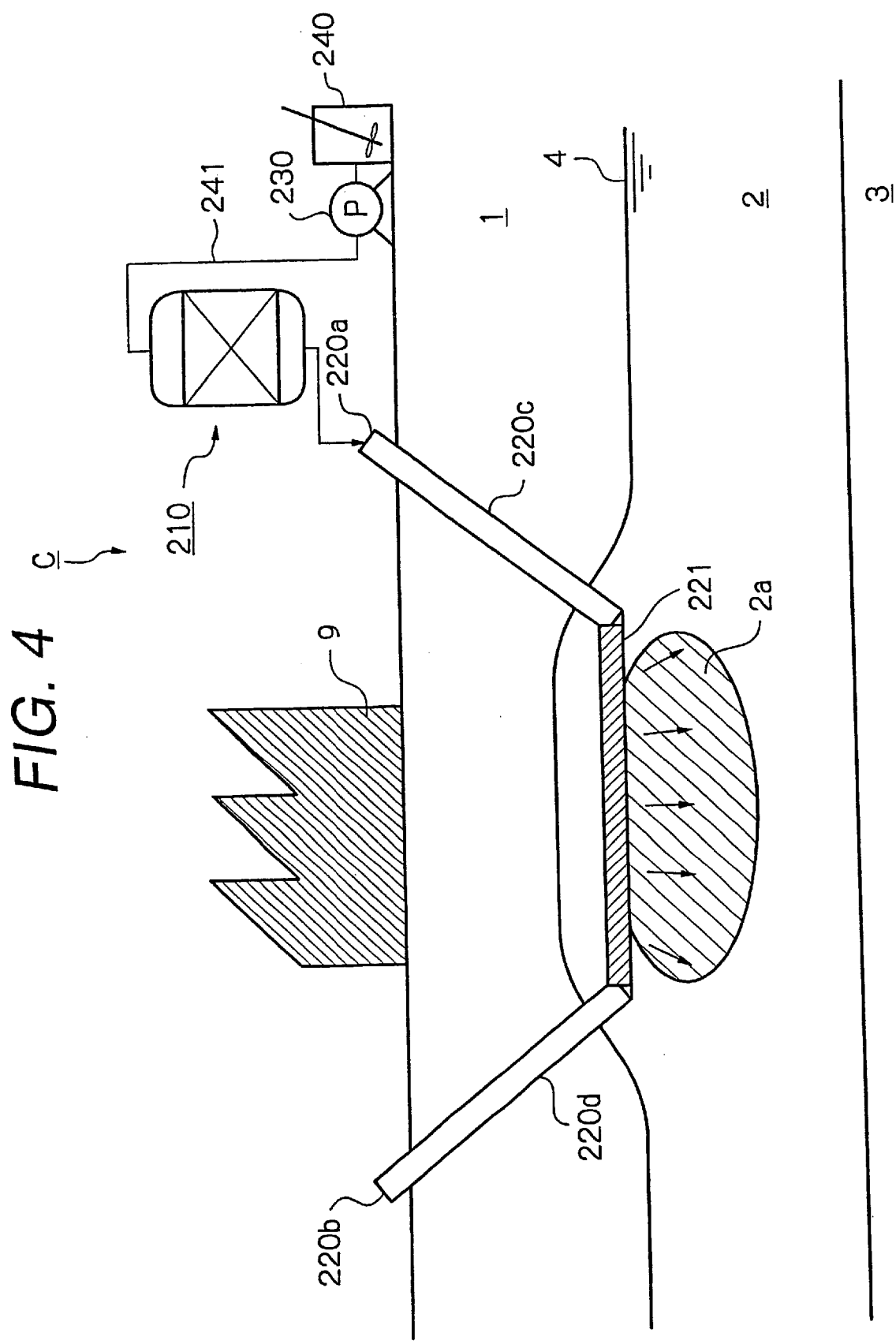

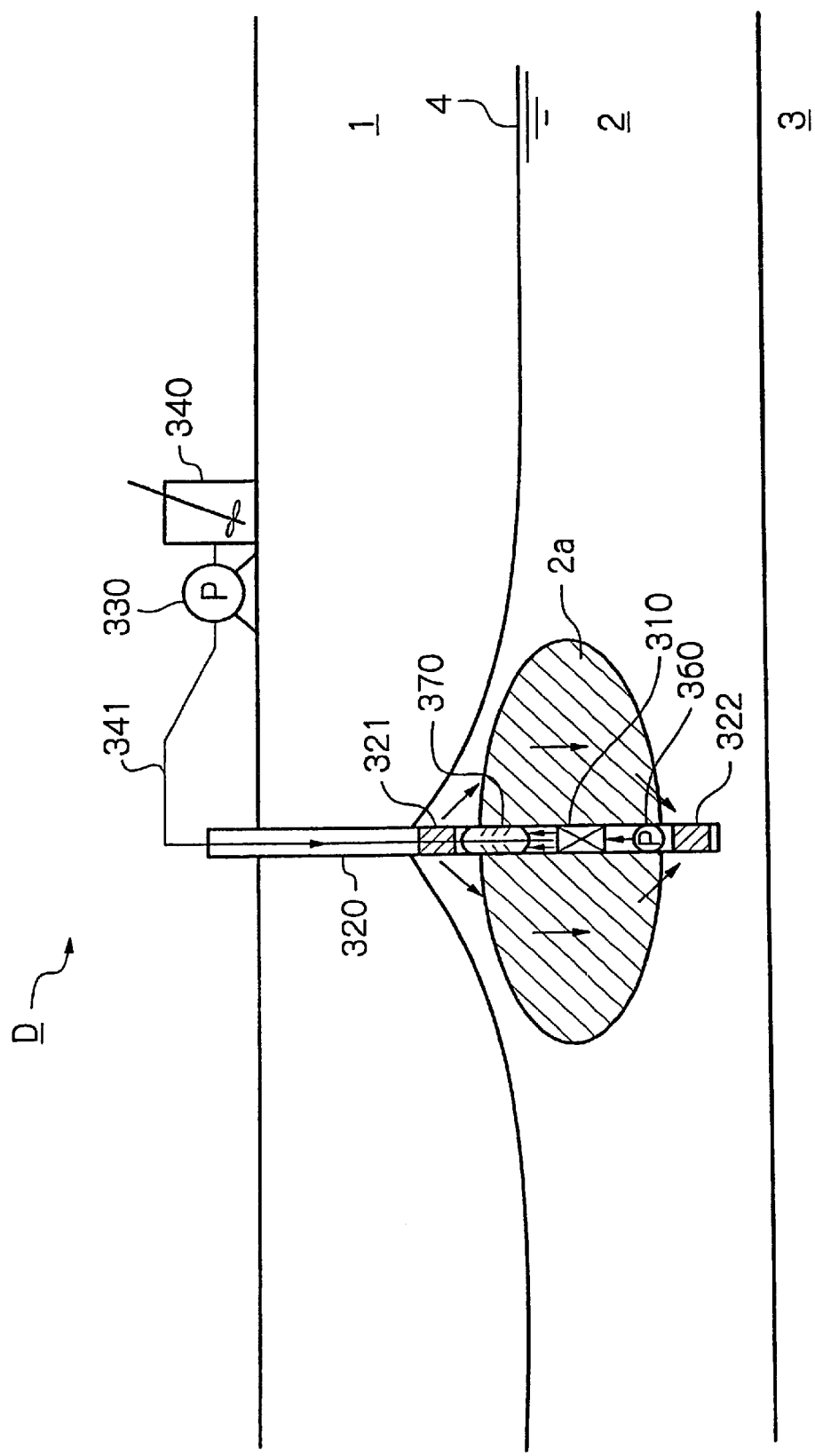

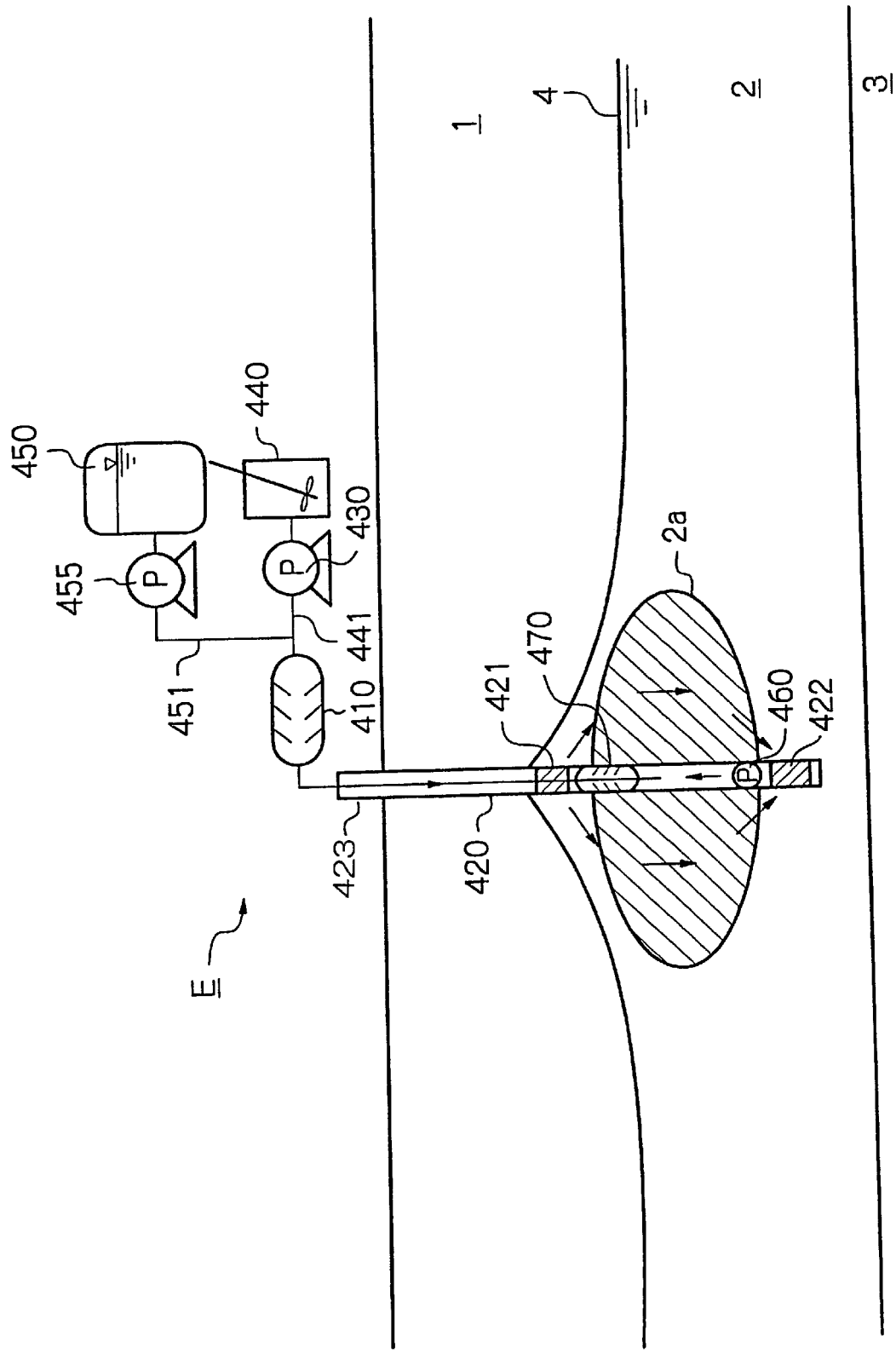

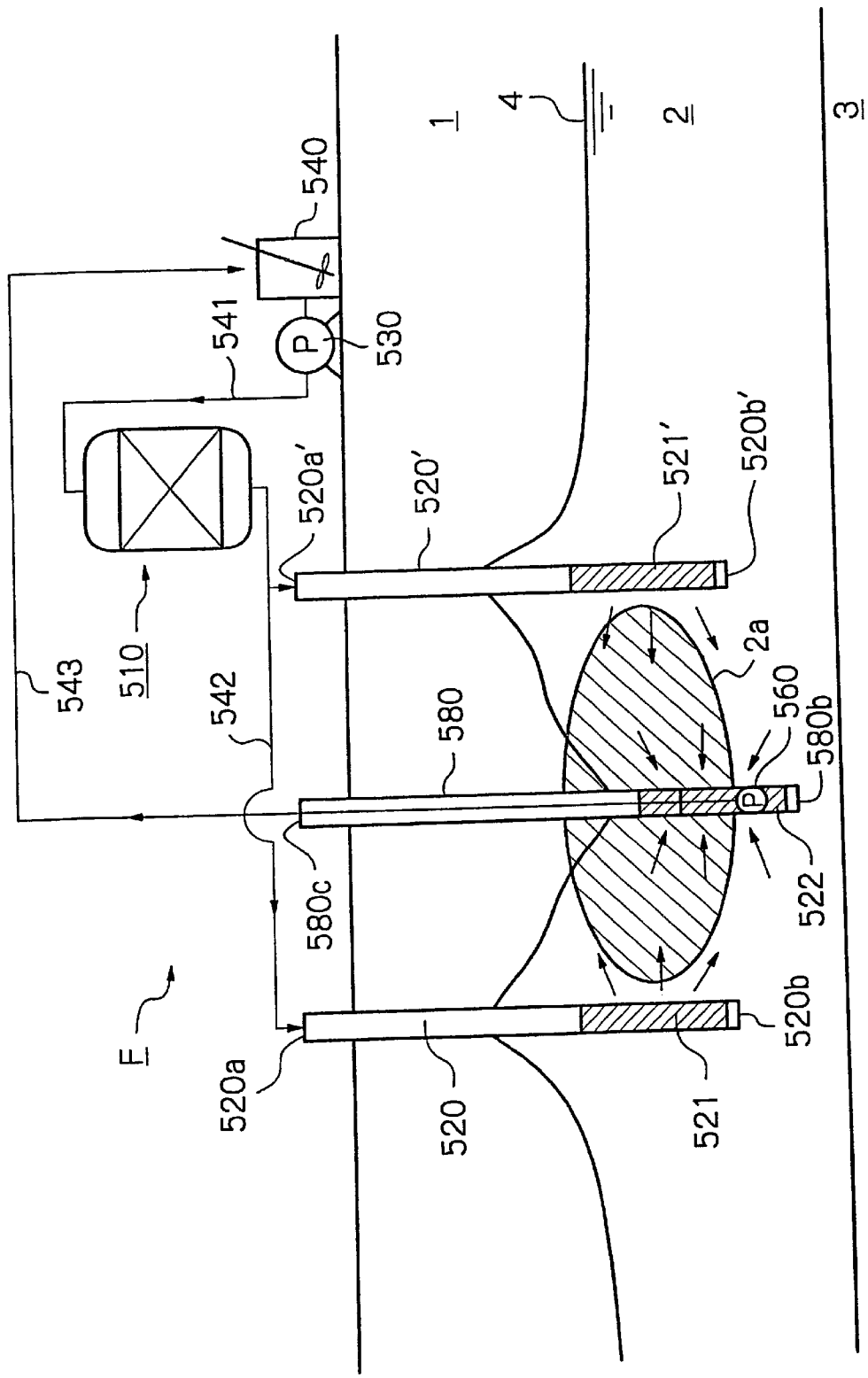

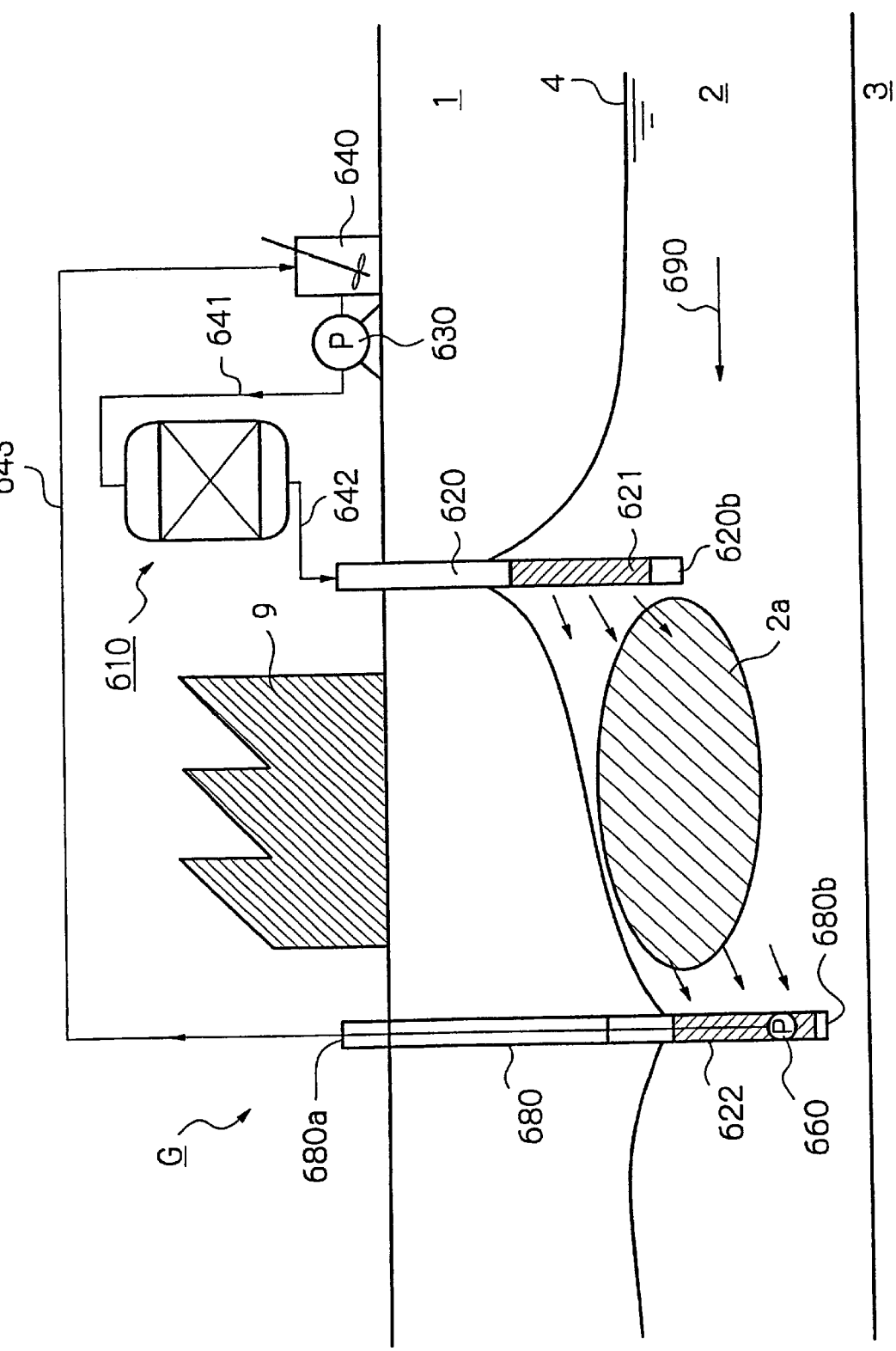

US 6,679,992 B1

METHOD AND APPARATUS FOR PURIFYING POLLUTED SUBSTANCES CONTAINING HALOGENATED ORGANIC COMPOUND

TECHNICAL FIELD OF THE INVENTION

The present invention relates to a purification method and a purification apparatus capable of effectively purifying a contaminated object containing halogenated organic compounds. More particularly, the invention relates to a purification method and a purification apparatus capable of purifying a contaminated object containing chlorinated organic compounds, such as soil, sediment, sludge, or water, e.g., interstitial water of sludge or groundwater, by a chemical reaction or a reductive dehalogenation reaction comprising a combination of a chemical reaction and a biological reaction, to degrade the halogenated organic compounds efficiently.

RELATED ART

The entire disclosure of an international application PCT/JP/98/00363, filed with the Japanese Patent Office on Jan. 29, 1998, entitled "A Method for Purifying Object Contaminated with Halogenated Organic Compounds," is cited in the present patent application.

In recent years, there have been one report after another on contamination of soil and groundwater with halogenated organic compounds, such as tetrachloroethylene, trichloroethylene, 1,1,1-trichloroethane, and dichloroethylene, which are widely used as degreasing agents for metal components of electronic equipment, and cleaning agents for dry cleaning. Recently, in particular, attention has been attracted to contamination with dioxins discharged from incineration facilities, PCB, etc. These halogenated organic compounds are not easily degraded in the natural world, and sparingly soluble in water. Thus, they tend to be accumulated in the soil and penetrated into groundwater in the contaminated area. The halogenated organic compounds are also known to cause hepatic damage and have carcinogenicity. It is desired, therefore, that halogenated organic compounds, such as chlorinated organic compounds, contained in the soil, etc. be degraded and rendered harmless.

Recently, bioremediation has attracted attention as a method of purifying soil, groundwater, etc. contaminated with halogenated organic compounds. The bioremediation method is highly cost-effective and has high safety. Bioremediation, however, has the problems that treatment requires a long time, and the types and concentrations of substances which can be degraded are restricted, as will be described below.

Aerobic degradation of trichloroethylene by methane assimilating organisms, toluene or phenol degrading organisms, ammonia oxidizing bacteria, or alkene assimilating organisms is known as an example of bioremediation. However, this method has the following drawbacks: 1) Degradation reaction is unstable. 2) The scope of substances to be degraded is very narrow. 3) It has no degrading action on highly chlorinated substances such as tetrachloroethylene and carbon tetrachloride.

Many anaerobic microorganisms, on the other hand, can degrade highly chlorinated organic compounds, such as tetrachloroethylene, trichloroethylene, and carbon tetrachloride, and have a broad range of applications. However, they are defective, for example, in that 1) growth of the microorganisms is very slow, and 2) strongly toxic intermediary metabolites are formed and accumulated during the anaerobic degradation process (Uchiyama HIROO and Yagi OSAMI, Bioscience and Industry, 1994, Vol. 52, No. 11, 879–884).

As a technique for decomposing halogenated organic compounds by a chemical reaction, reductive treatment of chlorinated organic compounds with metallic iron has been reported (Yazaki TETSUO, Treatment of Organochlorine Compound Contaminated Groundwater—Technology for Treatment at Low Temperatures with Metallic Iron Deposited Activated Carbon, "PPM", 1995, Vol. 26, No. 5, 64–70). Thus, the inventor of the present invention attempted to conduct dechlorination experiments by adding metallic iron into the soil in the absence of a carbon source for microorganisms. However, no dechlorination reaction was observed under conditions under which no microorganisms were cultured, particularly when a reductive atmosphere and neutral conditions were not maintained. Nor was any dechlorination reaction noted when an iron salt, such as $FeCl_2$, $FeCl_3$ or $FeSO_4$, was added instead of metallic iron.

Furthermore, there is a report of a method for treating halogenated organic compounds to become harmless, which comprises injecting metallic iron and high pressure air into contaminated soil to react the halogenated organic compounds with an iron powder to make it inorganic (Japanese Unexamined Patent Publication No. 1996-257570). This method involves a problem about air injection facilities, and a risk of vaporization of the halogenated organic compounds. The method is also impractical, since the use of high pressure air causes the problem of cost.

There is also a report of a method for removing organochlorine compounds, which have contaminated soil or groundwater, by combining a natural substance having a dehalogenation catalytic action and bioremediation ("Nikkei Biotech" (Nikkei BP), published Oct. 7, 1996, No. 361, 14–15). However, this report is silent on concrete natural substances and microorganisms.

U.S. Pat. No. 5,411,664 describes a method for degradation of halogenated organic compounds by addition of a fibrous organic material and polyvalent metal particles, e.g., iron, to a contaminated object. However, this U.S. patent does not describe a reducing agent, such as reduced iron, cast iron, an alloy, or a water-soluble reducing agent. Nor does this patent describe that the contaminated object is held in a reducing atmosphere after addition of a reducing agent.

In the laboratory, it is easy to mix a reducing agent, a nutrient source, and a contaminated object uniformly. To purify a contaminated object, such as soil, actually in situ, on the other hand, large amounts of a reducing agent and a nutrient source are mixed, thus requiring construction work. Moreover, uniform mixing is not necessarily easy. In addition, the conditions during kneading may affect the degradation ratio of halogenated organic compounds. To purify a contaminated object of a volume of 1 $m^3$ or more, particularly, a volume of 10 $m^3$ or more, an ingenious idea is needed for the kneading method.

Besides, to purify a contaminated object, such as soil, in situ, it has been common practice to perform a small amount of pumping downstream from a contaminated aquifer, apply purification treatment for the contaminated object to the pumped groundwater, then dissolve a nutrient source for microorganisms, which degrade the contaminant, in the treated groundwater, and inject the groundwater again into an upstream unsaturated soil or aquifer. With this method, however, the pumped contaminated water cannot be reinjected unless it is purified below the concentration complying with the ban on the permeation of effluent into the ground. Thus, it is necessary to install purification facilities on the ground, posing the problem of an increased cost. Also, the injected normal water brings about a phenomenon of a detour formed in the flow of the contaminated groundwater. This phenomenon poses the problem that the injected nutrient source does not thoroughly mix with the groundwater.

SUMMARY OF THE INVENTION

Therefore, the object of the present invention is to provide a contaminated object purification method and purification apparatus which can efficiently and easily purify a contaminated object containing halogenated organic compounds. Particularly, its object is to provide a purification method and a purification apparatus which can efficiently and easily purify a contaminated object containing halogenated organic compounds, especially soil and groundwater, in situ.

According to one aspect of the present invention, water is circulated so as to pass through the contaminated object, for example, the contaminated object in the soil. According to another aspect of the present invention, circulation of water in this manner is not required.

According to an aspect of the present invention, there is provided a purification method for purifying a contaminated object containing halogenated organic compounds, including a reduction step in which a reducing agent having a standard electrode potential, relative to a standard hydrogen electrode at 25° C., of from 300 mV to −2400 mV reduces a nutrient solution containing a nutrient source for heterotrophic anaerobic microorganisms and water, and an introduction step in which the reduced nutrient solution is introduced into the contaminated object after the reduction step. Preferably, the introduction step is performed after, preferably immediately after, the reduction step.

The purification method according to this aspect of the present invention combines a chemical reaction and a biodegradation reaction, and can degrade the halogenated organic compounds to purify the contaminated object containing the halogenated organic compounds. By introducing the reduced nutrient solution into the contaminated object after, preferably immediately after, the reduction step, the reduced state of the nutrient solution can be maintained, and the activity of the microorganism can be enhanced to purify the contaminated object more efficiently. Here, "immediately after the reduction step" refers to "after a lapse of a sufficiently short time to maintain the reduced state of the nutrient solution."

In the introduction step, a well, an underground wall, a permeation gutter, a trench, or an indentation is preferably used.

The reduction step preferably includes a contact step of bringing the nutrient solution into contact with the reducing agent which is in a solid state and is insoluble or sparingly soluble in water.

Alternatively, the reduction step preferably includes a mixing step of mixing the nutrient solution with an aqueous solution containing the reducing agent which is water soluble.

In the introduction step, the reduced nutrient solution is preferably introduced into the contaminated object via a deep indentation provided in the ground surface, for example, a well, or an underground wall. In the ground with high permeability, however, the reduced nutrient solution may be introduced via a shallow indentation.

It is preferred to further have a step of circulating groundwater containing the halogenated organic compounds and provide the reduction step and the introduction step while circulating the groundwater.

Herein, the halogenated organic compounds refer to fluorinated organic compounds, chlorinated organic compounds, brominated organic compounds, or iodinated organic compounds. Particularly, the invention is targeted at, but not limited to, aliphatic compounds such as tetrachloroethylene, trichloroethylene, 1,1,1-trichloroethane or dichloroethylene, and aromatic compounds such as pentachlorophenol, which present problems as contamination sources for groundwater and soil.

The contaminated object includes, for example, groundwater, soil, sediment, sludge, compost, manured organic substances, waste, and drainage.

The ratio between the nutrient source for the heterotrophic anaerobic microorganisms and water that are contained in the nutrient solution is not restricted. The nutrient source for the heterotrophic anaerobic microorganisms can be selected, as desired, according to the properties of the microorganisms in the contaminated object to be purified.

Preferred examples of the heterotrophic anaerobic microorganisms are methane-forming bacteria (e.g., the genus Methanosarcina, the genus Methanothrix, the genus Methanobacterium, the genus Methanobrevibacter), sulfate-reducing bacteria (e.g., the genus Desulfovibrio, the genus Desulfotomaculum, the genus Desulfobacterium, the genus Desulfobacter, the genus Desulfococcus), nitrate-reducing bacteria (e.g., the genus Bacillus, the genus Lactobacillus, the genus Aeromonas, the genus Streptococcus, the genus Micrococcus), acid-forming bacteria (e.g., the genus Clostridium, the genus Acetivibrio, the genus Baceroides, the genus Ruminococcus), and facultative anaerobic bacteria (e.g., the genus Bacillus, the genus Lactobacillus, the genus Aeromonas, the genus Streptococcus, the genus Micrococcus). Particularly, the genera Bacillus, Pseudomonas, Aeromonas, Streptococcus and Micrococcus are preferred, because they have oxide form nitrogen reducing activity.

Examples of the nutrient source which can be used preferably when the heterotrophic anaerobic microorganisms are methane-forming bacteria are shown in Tables 1 and 2 below.

TABLE 1

Culture medium for methane-forming microorganisms

| Constituent | Formulation |
|---|---|
| Tap water | 800 ml |
| Mineral 1 solution* | 50 ml/l |
| Mineral 2 solution* | 50 ml/l |
| Trace mineral solution* | 10 ml/l |
| Trace vitamin solution* | 10 ml/l |
| $NaHCO_3$ | 5.0 g/l |
| Yeast Extract | 1.0 g/l |
| Polypeptone | 20 g/l |
| Glucose | 25 g/l |
| Sodium citrate | 25 g/l |
| Methanol | 50 ml/l |
| L-cysteine hydrochloride solution | 5.0 ml/l |
| $Na_2S.9H_2O$ solution | 5.0 ml/l |
| pH | 6.9–7.2 |

The mineral 1 solution refers to a solution containing 6 g of $K_2HPO_4$ in 1 liter of distilled water.

The mineral 2 solution refers to a solution containing 6 g of $KH_2PO_4$, 6 g of $(NH_4)_2SO_4$, 12 g of NaCl, 2.6 g of $MgSO_4.7H_2O$, and 0.16 g of $CaCl_2.2H_2O$ in 1 liter of distilled water.

The trace mineral solution refers to a solution containing 1.5 g of nitrilotriacetic acid, 3.0 g of $MgSO_4.7H_2O$, 0.5 g of $MnSO_4\ 2H_2O$, 1.0 g of NaCl, 0.1 g of $FeSO_4.7H_2O$, 0.1 g of $CoSO_4$ or $CoCl_2$, 0.1 g of $CaCl_2.2H_2O$, 0.1 g of $ZnSO_4$, 0.01 g of $CuSO_4.5H_2O$, 0.01 g of $AlK(SO_4)_2$, 0.01 g of $H_3BO_3$, and 0.01 g of $Na_2MoO_4.2H_2O$ in 1 liter of distilled water. First, nitrilotriacetic acid is dissolved while being adjusted to pH 6.5 with KOH, and then the other minerals are added. Finally, the solution is adjusted to pH 7.0 with KOH.

The trace vitamin solution refers to a solution containing 2 mg of biotin, 2 mg of folic acid, 10 mg of pyridoxine hydrochloride, 5 mg of thiamine hydrochloride, 5 mg of riboflavin, 5 mg of nicotinic acid, 5 mg of calcium DL-pantothenate, 0.1 mg of vitamin $B_{12}$, 5 mg of p-aminobenzoic acid, and 5 mg of lipoic acid in 1 liter of distilled water.

TABLE 2

Culture medium for methane-forming microorganisms

| Constituent | Amount |
| --- | --- |
| L-cysteine hydrochloride | 0.1 g/l |
| Polypeptone | 2.0 g/l |
| Glucose | 2.5 g/l |
| Sodium citrate | 2.5 g/l |
| Methanol | 5.0 ml/l |
| Sodium bicarbonate | 5.0 g/l |
| Sodium sulfide nonahydrate | 0.1 g/l |
| Yeast extract | 1.0 g/l |
| Dilution water | Tap water |
| pH | 6.9–7.2 |

An example of the nutrient source which can be used preferably when the heterotrophic anaerobic microorganisms are sulfate-reducing bacteria is shown in Table 3 below.

TABLE 3

Culture medium for sulfate-reducing microorganisms

| Constituent | Formulation |
| --- | --- |
| Tap water | 1000 ml |
| $K_2HPO_4$ | 0.5 g/l |
| $NH_4Cl$ | 1.0 g/l |
| $Na_2SO_4$ | 1.0 g/l |
| $CaCl_2.2H_2O$ | 0.1 g/l |
| $MgSO_4.7H_2O$ | 2.0 g/l |
| Yeast Extract | 1.0 g/l |
| $FeSO_4.7H_2O$ | 0.2 g/l |
| Trace vitamin solution* | 10 ml/l |
| Sodium lactate | 25 ml/l |
| Sodium acetate | 25 ml/l |
| Sodium thioglycolate | 0.1 g/l |
| Ascorbic acid | 0.1 g/l |
| pH | 6.6–7.0 |

*The trace vitamin solution is the same as the trace vitamin solution in Table 1.

An example of the nutrient source which can be used preferably when the heterotrophic anaerobic microorganisms are nitrate-reducing bacteria is shown in Table 4 below.

TABLE 4

Culture medium for nitrate-reducing microorganisms

| Constituent | Amount |
| --- | --- |
| Potassium nitrate | 4.5 g/l |
| Potassium acetate | 8.5 g/l |
| Sodium bicarbonate | 5.0 g/l |
| Magnesium chloride hexahydrate | 0.2 g/l |
| Yeast extract | 0.1 g/l |
| Dilution water | Tap water |
| pH | 6.9–7.4 |

The use of organic carbon and a culture medium, which contains 20 to 50% by weight of organic carbon, preferably 20 to 30% by weight of oxide form nitrogen, as the nutrient source is preferred, because the microorganism population involved in the aforementioned chemical reaction and biological reaction can be changed to suppress blackening of the soil due to iron sulfide, etc., occurrence of a methane gas, and generation of foul-smelling gases such as mercaptan. Furthermore, a nitrogen gas is generated, producing the advantage that the resulting hydrogen gas is diluted. The oxide form nitrogen is preferably in the form of a nitrate. A preferred example of the nitrate is an alkali metal salt of nitric acid, an alkaline earth metal salt of nitric acid, iron nitrate, titanium nitrate, manganese nitrate, aluminum nitrate, or magnesium nitrate. Particularly, sodium nitrate, potassium nitrate or calcium nitrate can be used preferably. The organic carbon is preferably a water soluble organic carbon source. Preferred examples of the organic carbon source are sugars, organic acids or their derivatives, lower alcohols, molasses waste liquor, fermentation waste liquor, and mixtures of them.

In connection with the reducing agent used in the present invention, its standard electrode potential, relative to a standard hydrogen electrode at 25° C., of higher than 300 mV is not preferred, because a sufficient reducing power is not obtained. The standard electrode potential of less than −2400 mV is not preferred, either, because the reducing power is so strong that a hydrogen gas may be generated, posing a danger. The standard electrode potential (E°) relative to a standard hydrogen electrode at 25° C. is shown in Table 5.

TABLE 5

Standard electrode potential (E °) relative to a standard hydrogen electrode at 25° C.

| Electrode reaction | E ° (mV) |
| --- | --- |
| $Ca^{2+} + 2e^- \leftrightarrow Ca$ | −2865 |
| $Na^+ + e^- \leftrightarrow Na$ | −2714 |
| $Mg^{2+} + 2e^- \leftrightarrow Mg$ | −2363 |
| $Al^{3+} + 3e^- \leftrightarrow Al$ | −1662 |
| $Zn^{2+} + 2e^- \leftrightarrow Zn$ | −763 |
| $Fe^{2+} + 2e^- \leftrightarrow Fe$ | −440 |
| $Cd^{2+} + 2e^- \leftrightarrow Cd$ | −403 |
| $Ni^{2+} + 2e^- \leftrightarrow Ni$ | −250 |
| $Sn^{2+} + 2e^- \leftrightarrow Sn$ | −136 |
| $2H^+ + 2e^- \leftrightarrow H_2$ | 0 |
| Ascorbic acid (ph 7.0) | 58 |
| $CO_3^{2-} + 3H^+ + 2e^- \leftrightarrow HCOO^- + H_2O$ | 311 |
| $2CO_3^{2-} + 4H^+ + 2e^- \leftrightarrow C_2O_4^{2-} + 2H_2O$ | 478 |
| $Au^{3+} + 3e^- \leftrightarrow Au$ | 1520 |

As the reducing agent, a reducing agent which is in a solid state and is insoluble or sparingly soluble in water, or a water soluble reducing agent can be used preferably.

As the reducing agent in solid state, there can be preferably cited at least one reducing agent selected from the group consisting of reduced iron, cast iron, iron-silicon alloy, titanium alloy, zinc alloy, manganese alloy, aluminum alloy, magnesium alloy, calcium alloy, titanium-silicon alloy, titanium-aluminum alloy, zinc-aluminum alloy, manganese-magnesium alloy, aluminum-zinc-calcium alloy, aluminum-tin alloy, aluminum-silicon alloy, and calcium-silicon alloy.

When reduced iron is used as the solid state reducing agent, adsorption of the halogenated organic compounds to the surface of the reduced iron occurs. Simultaneously, polarization into an anode and a cathode takes place on the surface of the reduced iron because of the difference in conditions between the metal side and the environment side to flow an electric current. Accordingly, iron solves out as iron ions on the anode as shown in the following formula 1, and electrons flow into the cathode, causing a reduction reaction:

$$Fe \rightarrow Fe^{2+} + 2e^-$$  Formula 1

When cast iron is used as the reducing agent, graphite contained in the cast iron adheres to the surface. This graphite acts as a cathode, while the iron acts as an anode. When the alloy is used as the reducing agent, polarization into an anode and a cathode occurs according to the standard electrode potentials of the metallic elements making up the alloy. In the case of the alloy, a reducing atmosphere can be maintained more easily, and the potential difference from the halogenated organic compounds becomes greater. Thus, a dehalogenation reaction is promoted.

When the reducing agent in a solid state and insoluble or sparingly soluble in water is used as the reducing agent, it is preferred for the reducing step to include a contact step of contacting the nutrient solution with the reducing agent. Inclusion of the contact step permits a thorough reaction between the reducing agent insoluble or sparingly soluble in water and the nutrient solution, leading to reduction of the nutrient solution.

As the solid state reducing agent, a powder having a particle size of 500 $\mu$m or less can be cited preferably.

As the water soluble reducing agent, there can be preferably named an organic acid or its derivative, hypophosphorous acid or its derivative, or a salt of an organic acid or hypophosphorous acid with iron, titanium, zinc, manganese, aluminum or magnesium, or a sulfide salt.

As the organic acid, a carboxylic acid, a sulfonic acid, a phenolic acid, or a derivative thereof can be cited preferably. Preferred examples of the carboxylic acid are monocarboxylic acids, dicarboxylic acids, tricarboxylic acids and tetracarboxylic acids having 1 to 20 carbon atoms and optionally substituted by hydroxyl groups. Concretely, acetic acid, citric acid and terephthalic acid are preferred, and aliphatic tricarboxylic acids having 2 to 10 carbon atoms, such as citric acid, are particularly preferred. As the derivative of the phenolic acid, a polyhydroxyaryl can be named preferably. As the polyhydroxyaryl, 1,2,3-trihydroxybenzene and 1,4-dihydroxybenzene are preferred. As the derivatives of the organic acid, salts, esters, amides, and acid anhydrides can be preferably cited.

As the derivatives of hypophosphorous acid, salts and esters can be cited preferably, and salts are particularly preferred.

The use of the water soluble reducing agent, compared with the use of the reducing agent in solid state, dramatically increases the efficiency of contact with the halogenated organic compounds, thereby promoting the dehalogenation reaction. Also, the water soluble reducing agent permeates the soil, etc., and thus can be injected using a conduit, such as a well, or an underground wall. Furthermore, the reduced state can be easily recovered by adding the reducing agent according to the reduced state during the purification operation.

When the water soluble reducing agent is used, it is preferred for the reduction step to include a mixing step of mixing the nutrient solution with an aqueous solution containing the reducing agent. By including the mixing step, the water soluble reducing agent and the nutrient solution can be fully reacted, and the nutrient solution can be reduced.

In the introduction step, the reduced nutrient solution is preferably introduced into the contaminated object via a deep indentation provided in the ground surface. The deep indentation is a concept including a conduit inserted into the ground and set in place, a well, an underground wall, or the like. If the deep indentation is a conduit or well, the conduit or well preferably includes in at least a part thereof a strainer portion comprising many through-holes. The underground wall refers to a deep groove, and typically refers to one formed with a highly water permeable filler, such as sand or gravel, fitted into the groove so that the groove will not collapse. The underground wall has excellent air permeability and water permeability.

In the ground with satisfactory water permeability, the reduced nutrient solution may be introduced via a permeation gutter or a shallow indentation such as a trench. As the ground with satisfactory water permeability, a stratum comprising sand, gravels or pumice, for example, can be cited. The depth of the trench depends on how easily the ground collapses. Near a place where vehicles, etc. pass, for example, the trench may be about 20 to 30 cm deep, or even deeper. At a place where vehicles, etc. do not pass and the ground is stable, the depth may be about 1 m or more. The wall of the trench may be reinforced to prevent collapse, or need not be reinforced.

According to the present invention, there is also provided a purification apparatus for purifying a contaminated object containing halogenated organic compounds, comprising reduction means by which a reducing agent having a standard electrode potential, relative to a standard hydrogen electrode at 25° C., of from 300 mV to −2400 mV reduces a nutrient solution containing a nutrient source for heterotrophic anaerobic microorganisms and water, and introduction means by which the reduced nutrient solution is introduced into the contaminated object via an introduction portion for introducing the reduced nutrient solution into the contaminated object.

As the reducing agent and the nutrient solution, the aforementioned reducing agent and the nutrient solution can be used preferably.

The reduction means preferably includes a contact device for bringing the nutrient solution and the reducing agent into contact with each other, if the reducing agent is in a solid state and is insoluble or sparingly soluble in water. If the reducing agent is water soluble, on the other hand, the reduction means preferably includes a mixing device for mixing the nutrient solution and an aqueous solution containing the reducing agent. In either case, the nutrient solution can be fully reduced with the reducing agent.

The introduction portion is preferably a deep indentation formed in the ground surface. The deep indentation is a concept including a conduit inserted into the ground and set in place, a well, an underground wall, or the like. In the ground with satisfactory water permeability, the reduced nutrient solution may be introduced via a permeation gutter or a shallow indentation such as a trench.

The reduction means preferably includes an underground wall filled with a water permeable filler, and the reducing agent is preferably used as at least a part of the filler.

The reducing agent may be in a particulate form, such as sand or gravel, or need not be particles. For example, a metal powder, such as an iron powder, having a particle size comparable to that of sand or gravel may be used as the filler. Alternatively, the filler may contain sand or gravel, and a metal powder such as an iron powder. Alternatively, the filler may contain a filler such as sand or gravel, and a reducing agent insoluble or sparingly soluble in water. In this case, the filler such as sand or gravel is a main component of the underground wall which retains air permeability and water permeability, and the reducing agent is contained in such an amount as not to impair the air permeability and water permeability. For example, 50% by weight or less of the reducing agent is contained, or 30% by weight or less of the reducing agent may be contained. For example, 20% by weight or less of the reducing agent may be contained. The underground wall may have an upper portion sealed or not sealed. Alternatively, as will be mentioned later, it may be a shallow indentation, rather than a deep indentation.

The introduction means preferably has a pump.

Moreover, the purification apparatus preferably has pumping means for introducing the contaminated object into the introduction portion for circulation treatment of the contaminated object. In this case, the contaminated object is mixed in the reduction means a plurality of times, and thereby dehalogenated more fully.

According to another aspect of the present invention, there is provided a purification method for purifying a contaminated object containing halogenated organic compounds, including a water reduction step of reducing water with a reducing agent having a standard electrode potential, relative to a standard hydrogen electrode at 25° C., of 300 mV to −2400 mV, a contact step of bringing the water reduced in the reduction step into contact with a nutrient source for heterotrophic anaerobic microorganisms to obtain a mixture containing the nutrient source, and an addition step of adding the mixture obtained in the contact step to the contaminated object.

According to an embodiment, there is provided a purification method for purifying a contaminated object containing halogenated organic compounds, including a water reduction step of reducing water with a reducing agent having a standard electrode potential, relative to a standard hydrogen electrode at 25° C., of from 300 mV to −2400 mV, a mixing step of mixing the water reduced in the reduction step with a nutrient source for heterotrophic anaerobic microorganisms, and an addition step of adding a mixture obtained in the mixing step to the contaminated object.

The nutrient source may be a liquid, namely, water containing a nutrient source, or may be a solid. In the case of the solid, there can be used, for example, a solid organic material such as compost, manure, excess sludge, sludge with a high organic matter content, or organic waste.

An embodiment in which the nutrient source is a nutrient solution will be mainly described. In the present invention, it is preferred to include a nutrient solution reduction step of adding water reduced in the reduction step to a nutrient solution containing a nutrient source for heterotrophic anaerobic microorganisms to reduce the nutrient solution, and a step of adding the nutrient, solution reduced in the nutrient solution reduction step to the contaminated object. However, reduced water and a nutrient source in the form of a solid, such as powder, a sol or a gel may be mixed or contacted with each other. As the solid nutrient source, an organic waste such as compost, bean curd refuse, or beer cake, or humus soil can be used as such, or any of them which has been compacted into a solid or semisolid form can be used.

When the nutrient source is a solid, water, or water which has already been reduced by passage through a reducing agent may be contacted with the solid nutrient source to dissolve the nutrient source into water. For example, water may be passed through a tank holding the solid nutrient source, or a packed column packed with the solid nutrient source.

As the reducing agent and the nutrient solution, the above-mentioned reducing agent and nutrient solution can be used preferably.

It is preferred that a well, an underground wall, a permeation gutter, a trench or an indentation is used in the water reduction step, the contact step, or the addition step.

According to another aspect of the present invention, there is provided a purification method for purifying a contaminated object containing halogenated organic compounds, including a circulation step of circulating water so as to pass through the contaminated object, and a reduction step of reducing the circulating water with a reducing agent having a standard electrode potential, relative to a standard hydrogen electrode at 25° C., of 300 mV to −2400 mV.

Herein, the aforementioned "contaminated object" includes soil, groundwater, sludge, sediment, compost, manured organic substances, waste, drainage (each containing a contamination source), and all other contaminated objects contaminated with halogenated organic compounds. Particularly, this term includes soil, groundwater, sludge (each containing a contamination source), and all other contaminated objects contaminated with halogenated organic compounds.

The aforementioned "water" includes water containing a contamination source such as halogenated organic compounds, and water after reduction in the reduction step. Concretely, the term "water" includes not only groundwater, but also free water in sludge, soil, paddy field or bottom mud, and water as an aqueous solution supplied to the contaminated object from outside a system, such as a ground surface portion.

The purification method according to this aspect of the present invention involves circulating water, especially groundwater, and repeatedly performing the reduction step for the circulating water with the use of the reducing agent, whereby water, and the contaminated object in contact with water, especially sludge or solid, can be purified merely by a reducing action.

The reduction step is preferably performed in the soil. By performing the reduction step in the soil, there is no need to pump contaminated groundwater above the ground, permitting purification at a low cost. Secondary contamination, which may occur as a result of pumping of the contaminated groundwater, can also be prevented.

The circulation step preferably has a step of taking in water in the soil, and a step of discharging water into the soil. This circulation step can gradually purify contaminated groundwater without causing a rapid change in the composition of groundwater.

The reducing agent is preferably in a solid state, and insoluble or sparingly soluble in water. The use of such reducing agent makes it possible to reduce circulated contaminated water repeatedly, without inducing a marked decrease in the reducing agent. Thus, contaminated water can be purified in the soil at a low cost. During this circulation, moreover, the contaminated object is cleaned physically, and can be purified thereby.

Alternatively, the reducing agent is preferably a water soluble reducing agent. When the water soluble reducing agent is used, permeation of the reducing agent through the soil is expected.

In the purification method of the present invention, it is preferred to include a reducing agent addition step of adding the reducing agent. Furthermore, the reducing agent addition step is preferably performed on the ground surface, because handling is easy on the ground surface. Alternatively, this step may be performed in the soil. For example, the reducing agent may be mixed with the filler of the underground wall, as has been stated earlier.

It is further preferred to have a nutrient source contact step of bringing a nutrient source for heterotrophic anaerobic microorganisms into contact with water before being circulated.

There may be provided a nutrient source contact step of further bringing a nutrient source for heterotrophic anaerobic microorganisms into contact with water being circulated.

It is preferred in handling that the nutrient source is added as a nutrient solution containing a nutrient source. An embodiment of adding the nutrient source as a nutrient solution will be mainly described. However, the nutrient source in the form of a solid, such as powder, a sol or a gel may be added to water being circulated.

In an embodiment using the nutrient source in this manner, water, especially groundwater, is circulated, and the reducing agent and the nutrient solution are added to water being circulated. By so doing, a chemical reaction by the reducing agent, and a biodegradation reaction by anaerobic microorganisms activated by the nutrient solution are repeatedly performed. Thus, water, and the contaminated object in contact with water, especially, sludge or soil, can be efficiently purified.

In the addition step, which of the addition of the reducing agent and the addition of the nutrient solution may be performed first. What is important is that the nutrient solution is maintained in a reduced state when contacted with the contaminated object. By so maintaining the nutrient solution in the reduced state, the microbial activity can be enhanced, and the contaminated object can be purified with higher efficiency.

The proportion of the nutrient source for heterotrophic anaerobic microorganisms and water incorporated into the nutrient solution is not restricted. The nutrient source for heterotrophic anaerobic microorganisms can be selected, as desired, according to the properties of microorganisms in the contaminated object to be purified. As the heterotrophic anaerobic microorganisms, those stated above can be used.

In the above step of taking in water present in the soil, it is preferred that a well, an underground wall, a permeation gutter, a trench or an indentation is used.

It is also preferred that a well, an underground wall, a permeation gutter, a trench or an indentation is used in the step of discharging water into the soil.

The use of the water soluble reducing agent, compared with the use of the reducing agent in solid state, dramatically increases the efficiency of contact with the halogenated organic compounds, thereby promoting the dehalogenation reaction. Also, the water soluble reducing agent permeates the soil, etc., and thus can be injected using a conduit, such as a well, an underground wall, a permeation gutter, a trench, or a shallow indentation. Furthermore, the reduced state can be easily recovered by adding the reducing agent according to the reduced state during the purification operation.

When the water soluble reducing agent is used, moreover, it is preferred to mix the nutrient solution with an aqueous solution containing the reducing agent in the addition step. By so doing, the water soluble reducing agent and the nutrient solution can be fully reacted, and the nutrient solution can be maintained in a fully reduced state.

In the addition step, the reduced nutrient is preferably introduced into the contaminated object via a deep indentation provided in the ground surface. The deep indentation is a concept including a conduit inserted into the ground and set in place, a well, an underground wall, or the like. If the deep indentation is a conduit or well, the conduit or well preferably includes in at least a part thereof a strainer portion comprising many through-holes. The underground wall refers to a deep groove, and typically refers to one formed with a highly water permeable substance, such as sand or gravel, filled into the groove so that the groove will not collapse. Thus, the underground wall has excellent air permeability and water permeability. On this occasion, the reducing agent in solid state, may be used as a filler for the underground wall, as stated earlier. Alternatively, a permeation gutter, a trench, or a shallow indentation may be used during introduction of the nutrient solution.

According to another aspect of the present invention, there is provided a purification apparatus for purifying a contaminated object containing halogenated organic compounds, characterized by having a reducing agent having a standard electrode potential, relative to a standard hydrogen electrode at 25° C., of from 300 mV to −2400 mV, a water intake portion located in the contaminated object or downstream from the contaminated object, and a water discharge portion located upstream from the water intake portion and located in the contaminated object or upstream from the contaminated object, and characterized in that water is circulated among the water intake portion, the reducing agent, and the water discharge portion to purify the contaminated object. For example, water flows through the water intake portion, the reducing agent, and the water discharge portion in this order. From the water discharge portion, water is discharged into the soil, flows under gravity or along the flow of groundwater, and is taken in again from the water intake portion. The water intake portion is preferably disposed in an aquifer.

The reducing agent preferably includes a reducing agent in a solid state and insoluble or sparingly soluble in water.

The reducing agent preferably includes a water soluble reducing agent.

The reducing agent is preferably located between the water intake portion and the water discharge portion. This is because groundwater is first taken in from the water intake portion, then transported to the reducing agent by a pump or the like, and then reduced with the reducing agent, whereafter the reduced groundwater is discharged from the water discharge portion. The discharged water can be moved to the water intake portion by gravity or the flow of groundwater.

The reducing agent is preferably held in a reducing agent tank. The reducing agent tank may be provided in the soil, or may be provided on the ground surface.

The water intake portion or the water discharge portion is preferably provided in a well, an underground wall, a permeation gutter, a trench or an indentation. It is preferred to have a pump in relation to circulation of water. For example, the pump may be disposed between the water intake portion and the water discharge portion. Alternatively, the pump may be disposed above the water intake portion.

It is preferred to further have a nutrient source for heterotrophic anaerobic microorganisms. It is preferred that water before being circulated is contacted with the nutrient source. It is preferred to circulate water among the water intake portion, the reducing agent, the nutrient source, and the water discharge portion, thereby purifying the contaminated object. For example, water flows through the water intake portion, the reducing agent, the nutrient source, and the water discharge portion in this order, or flows through the water intake portion, the nutrient source, the reducing agent, and the water discharge portion in this order, is discharged from the water discharge portion into the soil, flows by gravity or along the flow of groundwater, and is taken in again from the water intake portion.

It is preferred to further have a nutrient source tank holding a nutrient source.

According to another aspect of the present invention, there is provided a purification apparatus for purifying contaminated soil containing halogenated organic compounds, which includes an indentation formed in the ground surface above or upstream from the contaminated soil, a reducing agent disposed in the indentation and having a standard electrode potential, relative to a standard hydrogen electrode at 25° C., of 300 mV to −2400 mV, and a nutrient source for heterotrophic anaerobic microorganisms which is disposed above the reducing agent.

For example, a shallow indentation, such as a trench, may be dug in the ground surface, a reducing agent may be filled as a first layer into a lower part of the indentation, and a nutrient source for heterotrophic anaerobic microorganisms may be filled as a second layer into an upper part of the indentation. In this case, the indentation is provided above or upstream from the contaminated object containing the halogenated organic compounds in the soil. Groundwater or tap water may be sprinkled over the second layer. Alternatively, rainwater may be allowed to flow into the second layer, without performing the sprinkle. As a result, the sprinkled water or the rainwater passes through the nutrient source, turning into water containing the nutrient source, and then the water is reduced with the reducing agent. The reduced water seeps into the soil, reaching the contaminated object in the soil and purifying it.

The reducing agent is preferably a solid. The nutrient source is preferably a solid. As the solid nutrient source, it is preferred to use a solid organic material such as compost, manure, excess sludge, sediment with a high organic matter content, or organic waste.

The reducing agent and the nutrient source may be each arranged in a layer, and the layer comprising the nutrient source covers the layer comprising the reducing agent. Since the solid nutrient source covers the reducing agent, the reducing agent can be prevented from being consumed by reducing oxygen in the air.

BRIEF DESCRIPTION OF THE DRAWINGS

FIG. 1 is a schematic view showing a first embodiment of the present invention using a solid reducing agent.

FIGS. 2(a) and 2(b) are schematic views showing the internal structure of a solid reducing agent contact tank.

FIG. 3 is a schematic view showing a second embodiment of the present invention using a water soluble reducing agent.

FIG. 4 is a schematic view showing a third embodiment of the present invention applied when there is an obstacle on the ground.

FIG. 5 is a schematic view showing a fourth embodiment of the present invention using a purification apparatus of a circulation treatment type.

FIG. 6 is a schematic view showing a fifth embodiment of the present invention using a purification apparatus of a circulation treatment type.

FIG. 7 is a schematic view showing a sixth embodiment of the present invention using a purification apparatus of a pumping-up circulation type.

FIG. 8 is a schematic view showing a seventh embodiment of the present invention in which a purification apparatus of a pumping-up circulation type is applied when there is an obstacle on the ground.

REFERRED EMBODIMENTS OF THE INVENTION

Figure 4A:
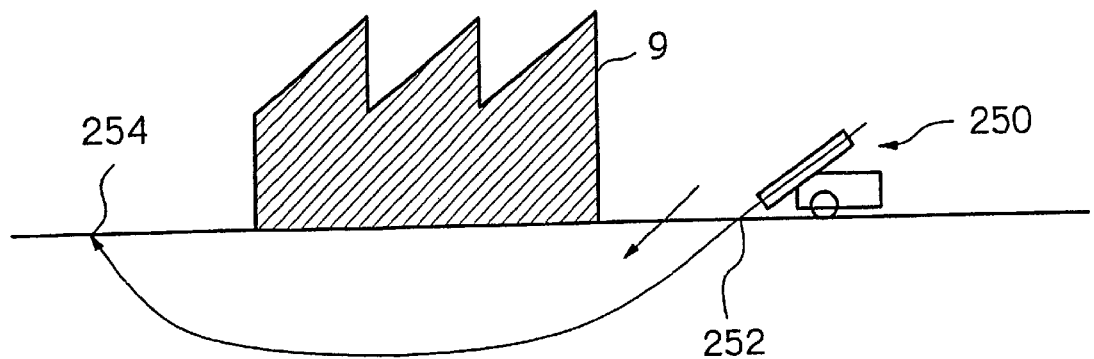
FIGS. 4A and 4B are schematic views showing a method for forming a horizontal well.

The present invention will now be described in further detail with reference to the accompanying drawings, but the present invention is not restricted thereby.

FIGS. 1 and 2(a) and 2(b) are schematic views showing a state in which a purification apparatus according to an embodiment of the present invention is installed.

In FIG. 1, the soil has a vadose zone 1 above a groundwater table 4, and an aquifer 2 below the groundwater table 4. Below the aquifer 2, an aquitard 3 is located.

Part of the aquifer 2 is a soil 2a contaminated with halogenated organic compounds, and groundwater contained in the soil 2a is also contaminated with the halogenated organic compounds.

A purification apparatus A shown in FIG. 1 is equipped with reduction means 10 in which a reducing agent having a standard electrode potential, relative to a standard hydrogen electrode at 25° C., of 300 mV to −2400 mV reduces a nutrient solution containing a nutrient source for heterotrophic anaerobic microorganisms and water, and introduction means 30 for introducing the reduced nutrient solution into the contaminated object via an introduction portion 20 for introducing the reduced nutrient solution into the contaminated object. The reducing agent is a reducing agent in a solid state (hereinafter referred to as a solid reducing agent), and an iron powder, for example, can be used preferably. The iron may be in the form of stainless steel, cast iron, carbon steel, or reduced iron.

As the reducing agent in solid state, there can be preferably used at least one reducing agent selected from the group consisting of reduced iron, cast iron, iron-silicon alloy, titanium alloy, zinc alloy, manganese alloy, aluminum alloy, magnesium alloy, calcium alloy, titanium-silicon alloy, titanium-aluminum alloy, zinc-aluminum alloy, manganese-magnesium alloy, aluminum-zinc-calcium alloy, aluminum-tin alloy, aluminum-silicon alloy, and calcium-silicon alloy.

As the nutrient source, a suitable nutrient source can be used according to the properties of microorganisms in the contaminated object to be purified. An example of the nutrient source which can be used preferably when the heterotrophic anaerobic microorganisms are methane-forming bacteria is shown in each of Tables 6 and 7 below.

TABLE 6

| Culture medium for methane-forming microorganisms | |
|---|---|
| Constituent | Formulation |
| Tap water | 800 ml |
| Mineral 1 solution* | 50 ml/l |
| Mineral 2 solution* | 50 ml/l |
| Trace mineral solution* | 10 ml/l |
| Trace vitamin solution* | 10 ml/l |
| $NaHCO_3$ | 5.0 g/l |
| Yeast Extract | 1.0 g/l |
| Polypeptone | 20 g/l |
| Glucose | 25 g/l |
| Sodium citrate | 25 g/l |
| Methanol | 50 ml/l |
| L-cysteine hydrochloride solution | 5.0 ml/l |
| $Na_2S.9H_2O$ solution | 5.0 ml/l |
| pH | 6.9–7.2 |

The mineral 1 solution refers to a solution containing 6 g of $K_2HPO_4$ in 1 liter of distilled water.

The mineral 2 solution refers to a solution containing 6 g of $KH_2PO_4$, 6 g of $(NH_4)_2SO_4$, 12 g of NaCl, 2.6 g of $MgSO_4.7H_2O$, and 0.16 g of $CaCl_2.2H_2O$ in 1 liter of distilled water.

The trace mineral solution refers to a solution containing 1.5 g of nitrilotriacetic acid, 3.0 g of $MgSO_4.7H_2O$, 0.5 g of $MnSO_4.2H_2O$, 1.0 g of NaCl, 0.1 g of $FeSO_4.7H_2O$, 0.1 g of $CoSO_4$ or $CoCl_2$, 0.1 g of $CaCl_2.2H_2O$, 0.1 g of $ZnSO_4$, 0.01 g of $CuSO_4.5H_2O$, 0.01 g of $AlK(SO_4)_2$, 0.01 g of $H_3BO_3$, and 0.01 g of $Na_2MoO_4.2H_2O$ in 1 liter of distilled water. First, nitrilotriacetic acid is dissolved while being adjusted to pH 6.5 with KOH, and then the other minerals are added. Finally, the solution is adjusted to pH 7.0 with KOH.

The trace vitamin solution refers to a solution containing 2 mg of biotin, 2 mg of folic acid, 10 mg of pyridoxine hydrochloride, 5 mg of thiamine hydrochloride, 5 mg of riboflavin, 5 mg of nicotinic acid, 5 mg of calcium DL-pantothenate, 0.1 mg of vitamin $B_{12}$, 5 mg of p-aminobenzoic acid, and 5 mg of lipoic acid in 1 liter of distilled water.

TABLE 7

| Culture medium for methane-forming microorganisms | |
|---|---|
| Constituent | Amount |
| L-cysteine hydrochloride | 0.1 g/l |
| Polypeptone | 2.0 g/l |
| Glucose | 2.5 g/l |
| Sodium citrate | 2.5 g/l |
| Methanol | 5.0 ml/l |
| Sodium bicarbonate | 5.0 g/l |
| Sodium sulfide nonahydrate | 0.1 g/l |
| Yeast extract | 1.0 g/l |
| Dilution water | Tap water |
| pH | 6.9–7.2 |

An example of the nutrient source which can be used preferably when the heterotrophic anaerobic microorganisms are sulfate-reducing bacteria is shown in Table 8 below.

TABLE 8

Culture medium for sulfate-reducing microorganisms

| Constituent | Formulation |
|---|---|
| Tap water | 1000 ml |
| $K_2HPO_4$ | 0.5 g/l |
| $NH_4Cl$ | 1.0 g/l |
| $Na_2SO_4$ | 1.0 g/l |
| $CaCl_2.2H_2O$ | 0.1 g/l |
| $MgSO_4.7H_2O$ | 2.0 g/l |
| Yeast Extract | 1.0 g/l |
| $FeSO_4.7H_2O$ | 0.2 g/l |
| Trace vitamin solution* | 10 ml/l |
| Sodium lactate | 25 ml/l |
| Sodium acetate | 25 ml/l |
| Sodium thioglycolate | 0.1 g/l |
| Ascorbic acid | 0.1 g/l |
| pH | 6.6–7.0 |

An example of the nutrient source which can be used preferably when the heterotrophic anaerobic microorganisms are nitrate-reducing bacteria is shown in Table 9 below.

TABLE 9

Culture medium for nitrate-reducing microorganisms

| Constituent | Amount |
|---|---|
| Potassium nitrate | 4.5 g/l |
| Potassium acetate | 8.5 g/l |
| Sodium bicarbonate | 5.0 g/l |
| Magnesium chloride hexahydrate | 0.2 g/l |
| Yeast extract | 0.1 g/l |
| Dilution water | Tap water |
| pH | 6.9–7.4 |

The use of organic carbon and a culture medium, which contains 20 to 50% by weight of organic carbon, preferably 20 to 30% by weight of oxide form nitrogen, as the nutrient source is preferred, because the microorganism population involved in the aforementioned chemical reaction and biological reaction can be changed to suppress blackening of the soil due to iron sulfide, etc., occurrence of a methane gas, and generation of foul-smelling gases such as mercaptan. Furthermore, a nitrogen gas is generated, so that the resulting hydrogen gas is diluted. The oxide form nitrogen is preferably in the form of a nitrate. As the nitrate, there can be preferably used an alkali metal salt of nitric acid, an alkaline earth metal salt of nitric acid, iron nitrate, titanium nitrate, manganese nitrate, aluminum nitrate, or magnesium nitrate. Particularly, sodium nitrate, potassium nitrate or calcium nitrate can be used preferably. The organic carbon is preferably a water soluble organic carbon source. Preferably usable examples of the organic carbon source are sugars, organic acids or their derivatives, lower alcohols, molasses waste liquor, fermentation waste liquor, and mixtures of them.

The reduction means 10 is a solid reducing agent contact tank 10 containing the solid reducing agent and located above the ground. The introduction portion 20 is a conduit 20 installed underground which receives a nutrient solution in a reduced form (hereinafter referred to as a reduced nutrient solution) from the solid reducing agent contact tank 10, and which introduces the reduced nutrient solution into the contaminated object. Typically, the conduit is a well. The introduction means 30 is an injection pump 30 which feeds the reduced nutrient solution into the conduit 20.

Furthermore, the purification apparatus A of the present embodiment has a nutrient solution preparation tank 40 for preparing the nutrient solution according to the properties of microorganisms in the contaminated object to be purified. The nutrient solution preparation tank 40 and the solid reducing agent contact tank 10 are connected by a first nutrient solution supply line 41. The solid reducing agent contact tank 10 and the conduit 20 are connected by a second nutrient solution supply line 42. In a lower part of the conduit 20, a strainer portion 21 is provided for allowing the reduced nutrient solution, which has been fed from the solid reducing agent contact tank 10 via the second nutrient solution supply line 42, to permeate the contaminated object. The conduit 20 is installed underground so that the strainer portion 21 will be located in the underground aquifer 2.

The strainer portion is many through-holes passing through the wall surface of the conduit. The open area ratio of the strainer portion is preferably 10 to 50%, particularly preferably 20 to 40%. The conduit further has a wire netting wrapped round the strainer portion, and a packer (not shown) wound round the wall surface of the conduit other than the strainer portion. The wire netting is designed to prevent penetration of gravel or the like into the conduit. The packer swells when the conduit is fixed underground. The packer is available as a packer swelling by absorbing water, and a packer swelling when a gas is injected.

Installation of the conduit 20 is carried out by the following procedure: The ground is dug with a boring machine to form a deep hole. After completion of digging, the boring machine is pulled out of the hole. Then, the conduit 20, preferably, of stainless steel, which has the strainer portion 21 in its lower part and has an opening top portion 20a and a closed bottom portion 20b, is inserted into the hole. Then, the packer (not shown) wound round the conduit 20 swells, typically, owing to water in the soil. Further, silica sand or the like is put into the hole to fill up the gap around the conduit 20. Finally, cement is poured into an area close to the ground surface, and solidified there, completing the installation of the conduit 20.

The solid reducing agent contact tank 10 may have the top portion 10a connected to the first nutrient solution supply line 41 as shown in FIG. 2(a), or may have the bottom portion 10b connected to the first nutrient solution supply line 41 as shown in FIG. 2(b). The solid reducing agent contact tank 10 includes a support floor 11 provided in a lower part thereof, a solid reducing agent contact portion 12 supported by the support floor 11, a first gap portion 13 above the solid reducing agent contact portion 12, and a second gap portion 14 below the solid reducing agent contact portion 12. The solid reducing agent contact portion 12 includes a support medium such as gravel, and the solid reducing agent coating on or mixed with the support medium. The solid reducing agent is, for example, a powder measuring 500 μm or less. The support floor 11 has many small holes of a size enough to allow passage of the nutrient solution, but allow no passage of the solid reducing agent. The support floor is, for example, a plate-like member composed of stainless steel. The first gap portion 13 and the second gap portion 14 are of a sufficient size such that the nutrient solution fed from the first nutrient solution supply line 41 flows into the solid reducing agent contact portion 12 constantly at a desired speed.

When the first nutrient solution supply line 41 is connected to the top portion 10a of the solid reducing agent contact tank 10, as shown in FIG. 2(a), the nutrient solution fed to the top portion 10a of the solid reducing agent contact tank 10 flows through the solid reducing agent contact portion 12 by its own weight, and is reduced thereby. When the first nutrient solution supply line 41 is connected to the bottom portion 10b of the solid reducing agent contact tank 10, as shown in FIG. 2(b), the nutrient solution needs to be forcibly sucked by a pump or the like provided in the second nutrient solution supply line connected to the top portion 10a of the solid reducing agent contact tank 10.

It is also possible to provide a three-way valve 43 in the second nutrient solution supply line 42 and connect a backwash water flow line 44 via the three-way valve 43, as shown in FIG. 2(a). In this case, cleaning water is passed through the interior of the solid reducing agent contact tank 10 from below to above via the backwash water flow line 44, whereby the solid reducing agent contact portion 12 can be backwashed. As a result, clogging of the solid reducing agent contact portion 12 and the pores of the support floor 11 can be prevented.

The structure of the solid reducing agent contact tank 10 shown in FIG. 2(a) or 2(b) can be used as the structure of a solid nutrient source contact tank. Instead of filling the support medium and the solid reducing agent into the solid reducing agent contact portion 12, a solid nutrient source for heterotrophic anaerobic microorganisms may be filled alone or together with a support medium. By passing water through the solid nutrient source contact tank, water containing the nutrient source for heterotrophic anaerobic microorganisms can be obtained. Such a solid nutrient source contact tank may be used in place of the nutrient solution preparation tank 40 of FIG. 1 or along with the nutrient solution preparation tank 40.

Alternatively, a support medium, the solid reducing agent, and a solid nutrient source for heterotrophic anaerobic microorganisms may be charged into the solid reducing agent contact portion 12. Such a solid reducing agent contact tank may be used in place of the nutrient solution preparation tank 40 of FIG. 1 or along with the nutrient solution preparation tank 40. The solid nutrient source contact tank and the solid reducing agent containing the solid nutrient source for heterotrophic anaerobic microorganisms can be similarly applied to other embodiments of the present invention.

A purification method for a contaminated object, such as groundwater or soil, contaminated with halogenated organic compounds, the purification method using the purification apparatus A of the present embodiment, includes a reduction step in which a reducing agent having a standard electrode potential, relative to a standard hydrogen electrode at 25° C., of from 300 mV to −2400 mV reduces a nutrient solution containing a nutrient source for heterotrophic anaerobic microorganisms and water, and an introduction step in which the reduced nutrient solution is introduced into the contaminated object after, preferably immediately after, the reduction step. The reduction step is performed inside the solid reducing agent contact tank 10, and the introduction step is performed in the conduit 20. In detail, suitable nutrients and water are added to the nutrient solution preparation tank 40, and thoroughly stirred to prepare a nutrient solution. The amount of water added is not restricted, and can be set arbitrarily in such a range as to avoid the situation that the groundwater level near the well rises to reach the surface of the earth.

Then, the prepared nutrient solution is supplied to the solid reducing agent contact tank 10 by the injection pump 30 via the first nutrient solution supply line 41. The nutrient solution fed to the solid reducing agent contact tank 10 contacts the solid reducing agent while passing through the solid reducing agent contact portion 12, and is reduced thereby. The fully reduced nutrient solution passes through the small holes of the support floor 11 and the second gap portion 14, and is then flowed into the conduit 20 via the second nutrient solution supply line 42 while being maintained in the reduced condition. The reduced nutrient solution flowed into the conduit 20 permeates the contaminated object via the strainer portion 21 formed in the lower part of the conduit 20. As a result, the reduced nutrient solution reacts with the halogenated organic substances contained in the contaminated object to dehalogenate them, and simultaneously enhances the activity of the heterotrophic anaerobic microorganisms present in the contaminated object to promote a biodegradation reaction by the microorganisms, thereby purifying the contaminated object.

Next, a second embodiment of the purification apparatus of the present invention is shown in FIG. 3. FIG. 3 is a schematic view showing a state of installation of the purification apparatus using a water soluble reducing agent as the reducing agent. As the water soluble reducing agent, there can be preferably used an organic acid or its derivative, hypophosphorous acid or its derivative, or a salt of an organic acid or hypophosphorous acid with iron, titanium, zinc, manganese, aluminum or magnesium, or a sulfide salt. As the organic acid, a carboxylic acid, a sulfonic acid, a phenolic acid, or a derivative thereof can be used preferably. Preferably used examples of the carboxylic acid are monocarboxylic acids, dicarboxylic acids, tricarboxylic acids and tetracarboxylic acids having 1 to 20 carbon atoms and optionally substituted by hydroxyl groups. Concretely, acetic acid, citric acid and terephthalic acid are preferred, and aliphatic tricarboxylic acids having 2 to 10 carbon atoms, such as citric acid, are particularly preferred.

As previously shown in the Table 5, formic acid and oxalic acid do not have a standard electrode potential, relative to a standard hydrogen electrode at 25° C., of 300 mV to −2400 mV, and do not conform to the reducing agent of the present invention. However, derivatives of formic acid and oxalic acid, for example, their salts, may have a standard electrode potential, relative to a standard hydrogen electrode at 25° C., of 300 mV to −2400 mV, and can conform to the reducing agent of the present invention.

As the derivative of the phenolic acid, a polyhydroxyaryl can be used preferably. As the polyhydroxyaryl, 1,2,3-trihydroxybenzene and 1,4-dihydroxybenzene are preferred. As the derivatives of the organic acid, salts, esters, amides, and acid anhydrides are preferred. As the derivatives of hypophosphorous acid, salts and esters can be used preferably, and salts are particularly preferred.

A purification apparatus B of the present embodiment is the same as in the first embodiment shown in FIG. 1, except that the reduction means is a water soluble reducing agent mixing device 100, and a water soluble reducing agent tank 150, a reducing agent supply line 151, and a pump 160 provided in the reducing agent supply line 151 are included. The same elements as in FIG. 1 are illustrated using the same numerals. The water soluble reducing agent mixing device 100 accepts a first nutrient solution supply line 141 from a nutrient solution preparation tank 140, and a reducing agent supply line 151 from the water soluble reducing agent tank 150. In the present embodiment, the water soluble reducing agent mixing device 100 is a line mixer 100. A second nutrient solution supply line 142 is connected between the water soluble reducing agent mixing device 100 and a conduit 20 installed underground. The conduit 20 has a strainer portion 21 formed in a lower part thereof.

A purification method for a contaminated object using the purification apparatus B of the present embodiment includes a reduction step in which a reducing agent having a standard electrode potential, relative to a standard hydrogen electrode at 25° C., of from 300 mV to −2400 mV reduces a nutrient solution containing a nutrient source for heterotrophic anaerobic microorganisms and water, and an introduction step in which the reduced nutrient solution is introduced into the contaminated object after, preferably immediately after, the reduction step. The reduction step is performed inside the water soluble reducing agent mixing device 100, and the introduction step is performed in the conduit 20. In detail, water and a culture medium suitable for the properties of microorganisms in the contaminated object to be purified are added to the nutrient solution preparation tank 140, and thoroughly stirred. On the other hand, the water soluble reducing agent tank 150 is charged with a water soluble reducing agent suitable for the contaminated object. The resulting nutrient solution is supplied from the nutrient solution preparation tank 140 to the water soluble reducing agent mixing device, i.e., line mixer, 100 by the pump 130 via the first nutrient solution supply line 141. The water soluble reducing agent is supplied from the water soluble reducing agent tank 150 to the water soluble reducing agent mixing device, i.e., line mixer, 100 by the pump P via the reducing agent supply line 151. In the line mixer 100, the nutrient solution and the water soluble reducing agent are thoroughly mixed, whereby the nutrient solution is reduced. The reduced nutrient solution is flowed into the conduit 20 via the second nutrient solution supply line 142, and permeates the contaminated object via the strainer portion 21 formed in the lower part of the conduit 20. As a result, the reduced nutrient solution reacts with the halogenated organic compounds contained in the contaminated object to dehalogenate them, and simultaneously enhances the activity of the microorganisms present in the contaminated object to promote a biodegradation reaction, thereby purifying the contaminated object.

Next, a third embodiment of the present invention is schematically shown in FIG. 4. A purification apparatus C of the present embodiment is in the same configuration as the purification apparatus A shown in FIG. 1, except that an introduction portion 220 having a pair of inclined portions, 220c and 220d, and a strainer portion 221 inserted laterally in an aquifer 2 is provided instead of the conduit 20 of the purification apparatus A shown in FIG. 1. The first inclined portion 220c has an open end 220a located on the ground surface, and accepts a nutrient solution, which has been reduced in a solid reducing agent contact tank 210, from the open end 220a via a second nutrient solution supply line 241. The strainer portion 221 is located horizontally in the aquifer 2, and allows the reduced nutrient solution to pass into the aquifer 2. The second inclined portion 220d has a closed end 220b protruding from the ground surface. Alternatively, the water soluble reducing agent mixing device 100 shown in FIG. 3 may be used in place of the solid reducing agent contact tank 210.

Figure 4B:
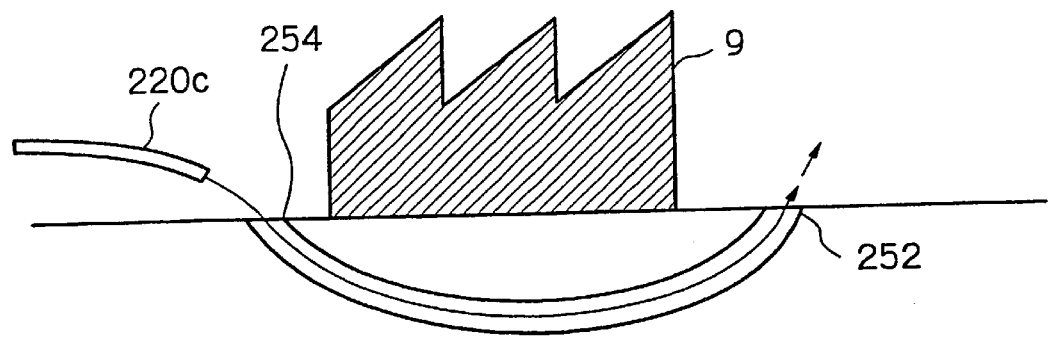

A so-called horizontal well as shown in FIG. 4 can be formed in the manner shown in FIGS. 4A and 4B. First, a hole is dug horizontally from an entrance 252 on the ground surface toward an exit 254 with the use of a horizontal digging machine 250. When digging of the hole is completed, a reamer appears on the ground surface from the exit 254.

Then, as shown in FIG. 4B, a flexible pipe 220c or the like is inserted into the hole from the exit 254, and the reamer used during digging is pulled at the entrance 252. As a result, the reamer is returned to the entrance 252 through the hole to install the flexible pipe in the hole. Finally, the exit 254 may be filled up, if desired.

A purification method for the contaminated object, which uses the purification apparatus C of the present embodiment, is the same as the first or second embodiment, except that the reduced nutrient solution flows out vertically from the strainer portion 221. The purification apparatus C and purification method of the present embodiment are effective when there is a building, such as a plant, on the ground surface directly above groundwater or soil including a contaminated object to be purified.

In FIG. 4, the strainer portion 221 extends horizontally, but the strainer portion may be inclined. Depending on the method of formation, the inclined portion 220d can be omitted.

Figure 4C:
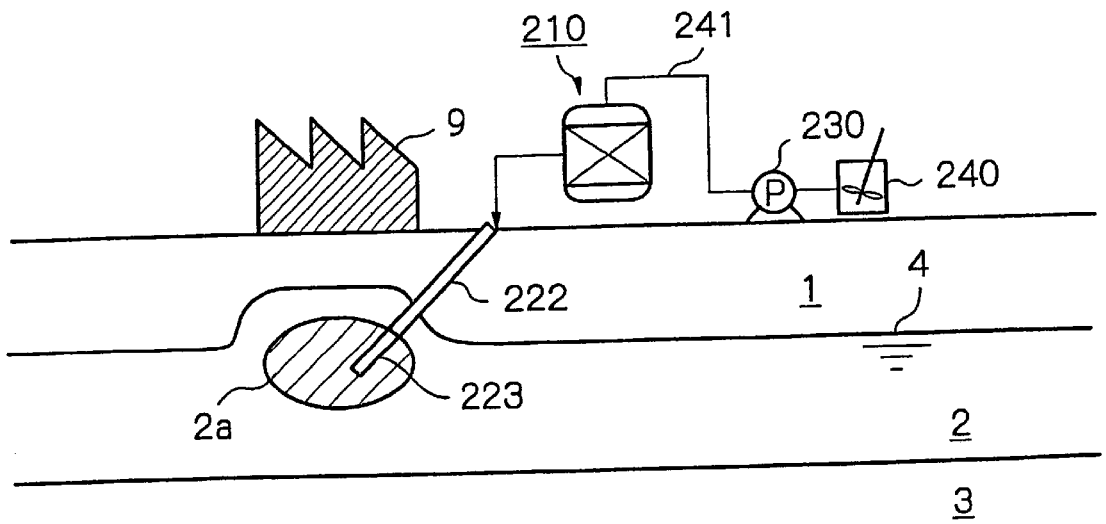
FIG. 4C is a schematic view showing another embodiment of the present invention using an oblique well.

A case in which the strainer portion is inclined is shown in FIG. 4C. The same elements as in FIG. 4 are assigned the same numerals, and their explanations are omitted. When there is a building 9 above a contaminated site 2a, a well cannot be dug vertically from inside the building. In this case, an oblique well 222 may be dug from outside the building toward the contaminated site 2a. A strainer portion 223 is provided at the end of the oblique well 222, and the strainer portion 223 preferably arrives at the contaminated site 2a. A nutrient solution reduced in a reduction tank 210 flows into the contaminated site 2a via the strainer portion 223 of the oblique well 222, and the synergistic effect of a biological dehalogenation reaction associated with the nutrient solution and a chemical dehalogenation reaction associated with the reducing agent purifies the contaminated site.

Next, a fourth embodiment and a fifth embodiment of the present invention are schematically shown in FIGS. 5 and 6. The present embodiment is a purification apparatus D of a reduced nutrient solution circulation treatment type. FIG. 5 shows the use of a solid reducing agent as the reducing agent, while FIG. 6 shows the use of a water soluble reducing agent as the reducing agent.

The purification apparatus D shown in FIG. 5 is equipped with reduction means 310 in which a reducing agent having a standard electrode potential, relative to a standard hydrogen electrode at 25° C., of from 300 mV to −2400 mV reduces a nutrient solution containing a nutrient source for heterotrophic anaerobic microorganisms and water, introduction means 330 for introducing the nutrient solution into the contaminated object via an introduction portion 320 for introducing the reduced nutrient solution into the contaminated object, and pumping means 360 for introducing the contaminated object into the introduction portion 320. As the reducing agent, the aforementioned solid reducing agent can be used. As the nutrient source, a suitable nutrient source can be used according to the microbial activity in the contaminated object to be purified. The reduction means 310 is a solid reducing agent contact portion 310. The introduction portion 320 is a conduit 320 installed underground. The introduction means 330 is an injection pump 330. The pumping means 360 is a submerged pump 360.

A top portion 320a of the conduit 320 is preferably closed to cut off the interior of the conduit 320 from the outside air. If desired, the pressure inside the conduit 320 can be increased.

The purification apparatus D further includes a nutrient solution preparation tank 340 provided on the ground, and a first nutrient solution supply line 341 for feeding the nutrient solution prepared in the nutrient solution preparation tank 340 to the solid reducing agent contact portion 310. The injection pump 330 is provided in the first nutrient solution supply line 341.

In the purification apparatus D, the solid reducing agent contact portion 310 is located in the introduction portion, i.e., the conduit 320. The solid reducing agent contact portion 310 includes a support medium such as gravel, and a solid reducing agent attaching to the support medium. The conduit 320 has an upper strainer portion 321 and a lower strainer portion 322, each comprising a plurality of holes formed in a wall surface. The upper strainer portion 321 and the lower strainer portion 322 are formed at spaced apart locations in the wall surface of the conduit 320, and the lower strainer portion 322 is located in an aquifer 2. The upper strainer portion 321 may be disposed in the aquifer 2, or disposed in a vadose zone 1. When the operation of the purification apparatus D is started, with the upper strainer portion 321 being disposed in the vadose zone 1 slightly above a groundwater table 4, the groundwater table 4 may locally fluctuate, whereupon the position of the upper strainer portion 321 may be in the aquifer 2.

The solid reducing agent contact portion 310 is located between the upper strainer portion 321 and the lower strainer portion 322. The submerged pump 360 is provided in the conduit 320 at a position below the solid reducing agent contact portion 310 and above the lower strainer portion 322, and extracts groundwater from the aquifer 2 into the conduit 320. A line mixer 370 is located above the solid reducing agent contact portion 310 and below the upper strainer portion 321. The lower strainer portion 322 functions as a through-hole for introducing the contaminated object, especially groundwater, into the conduit 320. The upper strainer portion 321 functions as a through-hole for introducing the nutrient solution, reduced in the solid reducing agent contact portion 310, into the contaminated object.

The line mixer 370 mixes the groundwater, which has been pumped up by the submerged pump 360 from the aquifer 2 via the lower strainer portion 322 and reduced in the solid reducing agent contact portion 310, with the nutrient solution injected via the nutrient supply line 341.

A purification method for groundwater, which uses the purification apparatus D of the present embodiment, includes a reduction step in which a reducing agent having a standard electrode potential, relative to a standard hydrogen electrode at 25° C., of 300 mV to −2400 mV reduces a nutrient solution containing a nutrient source for heterotrophic anaerobic microorganisms and water, and an introduction step in which the reduced nutrient solution is introduced into the contaminated object after, preferably immediately after, the reduction step. The reduction step is performed inside the solid reducing agent contact portion 310, and the introduction step is performed in the conduit 320.

In detail, water and a culture medium suitable for the properties of microorganisms in groundwater are thoroughly agitated and mixed in the nutrient solution preparation tank 340 to prepare a nutrient solution. Then, the nutrient solution is supplied to the solid reducing agent contact portion 310 in the conduit 320 via the first nutrient solution supply line 341. Thus, the nutrient solution is contacted with the solid reducing agent, and reduced thereby. The reduced nutrient solution is passed through the line mixer 370, and introduced into the groundwater in the aquifer 2 via the upper strainer portion 321.

Simultaneously, contaminated groundwater is pumped up from the aquifer 2 into the conduit 320 by the submerged pump 360 via the lower strainer portion 322. The pumped up, contaminated groundwater is brought into contact with the solid reducing agent and the reduced nutrient solution in the solid reducing agent contact portion 310, and further sent to the line mixer 370, where the groundwater, the solid reducing agent and the reduced nutrient solution are thoroughly mixed.

Alternatively, the nutrient solution is poured over the solid reducing agent contact portion 310 via the first nutrient solution supply line 341. On the other hand, the extracted, contaminated groundwater is reduced in the solid reducing agent contact portion 310. The nutrient solution and the reduced groundwater are thoroughly mixed in the line mixer 370.

In this manner, the groundwater contaminated with halogenated organic compounds is purified by a dehalogenation reaction by the reducing agent and a biodegradation reaction by the activated microorganisms. The purified groundwater is returned to the aquifer 2 via the upper strainer portion 321. The purified groundwater, discharged from the upper strainer portion 321, moves downward by gravity, and is extracted again from the lower strainer portion 322.

As noted above, groundwater circulates between the aquifer 2 and the conduit 320. Thus, the contaminated site 2a is supplied with the reducing agent and the nutrient source for heterotrophic anaerobic microorganisms, and dehalogenation proceeds through the combination of the chemical reaction by the reducing agent and the biodegradation reaction by the activated heterotrophic anaerobic microorganisms.

Figure 5A:
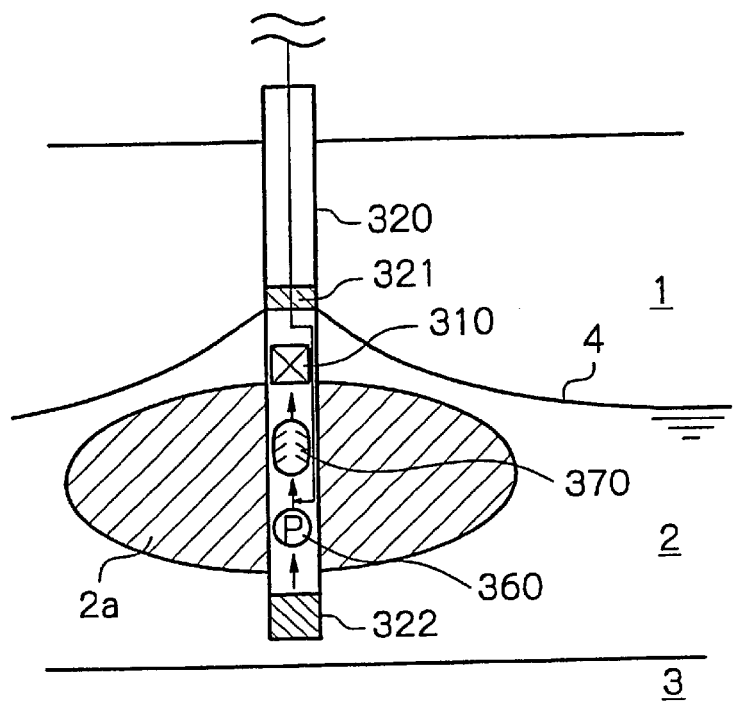
FIGS. 5A and 5B are partial views showing other embodiments of the present invention.

Alternatively, the line mixer 370 may be disposed between the pump 360 and the solid reducing agent contact portion 310, as shown in FIG. 5A. That is, the lower strainer portion 322, pump 360, line mixer 370, solid reducing agent contact portion 310, and upper strainer portion 321 may be arranged in this order from below to above inside the conduit 320. In FIG. 5A, the nutrient solution supply line 341 extends to a region between the pump 360 and the line mixer 370, so that the nutrient solution can be injected between the pump 360 and the line mixer 370.

The pump 360 extracts groundwater from the lower strainer portion 322, the nutrient solution is poured into this groundwater, and the groundwater and the nutrient solution are mixed in the line mixer 370. The groundwater containing the nutrient solution is reduced with the reducing agent, and then discharged from the upper strainer portion 321.

Figure 5B:
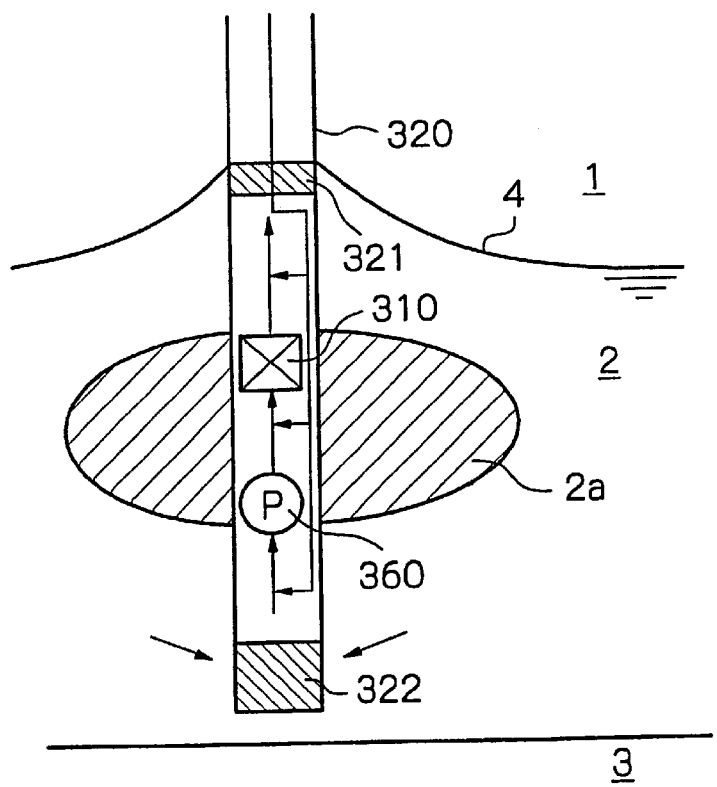

Alternatively, the line mixer may be omitted, as shown in FIG. 5B. That is, the lower strainer portion 322, pump 360, solid reducing agent contact portion 310, and upper strainer portion 321 may be arranged in this order from below to above inside the conduit 320. The nutrient solution supply line 341 may be extended to a region below the pump 360, and the nutrient solution may be injected below the pump 360. In this case, groundwater sucked from the lower strainer portion 322 and the nutrient solution can be mixed inside the pump 360.

Alternatively, the nutrient solution supply line 341 may be extended to a region above or below the solid reducing agent contact portion 310, and the nutrient solution may be injected above or below the solid reducing agent contact portion 310. In this embodiment, the groundwater and the nutrient solution spontaneously mix while they are moving inside the piping. When the nutrient solution is injected above or below the solid reducing agent contact portion 310, especially when the nutrient solution is injected above the pump 360, it is preferred to provide a check valve for preventing reverse flow of the groundwater into the nutrient solution supply line 341.

When the line mixer is omitted, there may be an alternative arrangement in which the lower strainer portion 322, solid reducing agent contact portion 310, pump 360, and upper strainer portion 321 are arranged in this order from below to above inside the conduit 320.

FIG. 6 is a schematic view showing a purification apparatus E of a circulation treatment type using a water soluble reducing agent as a reducing agent. The purification apparatus E differs from the purification apparatus D shown in FIG. 5 in that the solid reducing agent contact portion 310 of the purification apparatus D is not included, but a line mixer 410, a water soluble reducing agent tank 450, and a reducing agent supply line 451 are included. That is, the purification apparatus E is equipped with reduction means 410 in which a reducing agent having a standard electrode potential, relative to a standard hydrogen electrode at 25° C., of from 300 mV to −2400 mV reduces a nutrient solution containing a nutrient source for heterotrophic anaerobic microorganisms and water, introduction means 430 for introducing the reduced nutrient solution into the contaminated object via an introduction portion 420 for introducing the reduced nutrient solution into the contaminated object, and pumping means 460 for introducing the contaminated object into the introduction portion 420. As the water soluble reducing agent, the aforementioned water soluble reducing agent can be used. The nutrient source may be a suitable nutrient source adapted for the microbial activity in the contaminated object. The reduction means 410 is a line mixer 410 provided on the ground surface. The introduction portion 420 is a conduit 420 installed underground. The pumping means 460 is a submerged pump 460 and a lower strainer portion 422 which are provided in the conduit 420.

The purification apparatus E further includes a nutrient solution preparation tank 440 provided on the ground, a first nutrient solution supply line 441 extending from the nutrient solution preparation tank 440, an injection pump 430 provided in the first nutrient solution supply line 441, a water soluble reducing agent tank 450, a reducing agent supply line 451 extending from the water soluble reducing agent tank 450, and an injection pump 455 provided in the reducing agent supply line 451. The first nutrient solution supply line 441 and the reducing agent supply line 451 are connected to the line mixer 410 provided on the ground surface. Inside the conduit 420, reduction means for reducing the nutrient solution is not provided, unlike FIG. 5.

To purify groundwater using the purification apparatus E of the present embodiment, the first step is to prepare water and a culture medium, suitable for the properties of microorganisms in the groundwater, in the nutrient solution preparation tank 440, and place a suitable water soluble reducing agent in the water soluble reducing tank 450. Then, the line mixer 410 is fed with the nutrient solution from the first nutrient solution supply line 441, and the water soluble reducing agent from the reducing agent supply line 451, and the nutrient solution and the water soluble reducing agent are mixed in the line mixer 410. The nutrient solution is reduced with the water soluble reducing agent in the line mixer.

The reduced nutrient solution is supplied via a pipe to a region below a line mixer 470 disposed in the conduit 420. On the other hand, groundwater is introduced into the conduit 420 by the submerged pump 460 via the lower strainer portion 422. The submerged pump 460 introduces the groundwater, which has been introduced into the conduit 420, and the reduced nutrient solution into the line mixer 470, and mixes them in the line mixer 470. A mixture of the groundwater and the reduced nutrient solution permeates an aquifer 2 via the upper strainer portion 421, and is extracted again into the conduit 420 via the lower strainer portion 422 by means of the submerged pump 460. In this manner, circulation of the reduced nutrient solution and the groundwater takes place. During this circulation, the contaminated groundwater is subjected to a dehalogenation reaction by the reducing agent and a biodegradation reaction by the activated heterotrophic anaerobic microorganisms, and purified thereby.

FIG. 7 is a schematic view showing a sixth embodiment of the present invention. This embodiment is the same as the embodiment shown in FIG. 5 or 6, except that a pair of wells each having a strainer portion are provided instead of the upper strainer portion and the lower strainer portion of FIG. 5 or 6. The present embodiment shows a purification apparatus F of a circulation treatment type. The purification apparatus F is equipped with reduction means 510, introduction means 530 for introducing a reduced nutritive material via an introduction portion 520, and pumping means 560. This embodiment uses the use of a solid reducing agent as a reducing agent. The reduction means 510 is a solid reducing agent contact tank 510. The introduction portion 520 is a pair of injection wells 520 and 520'. The nutritive material introduction means 530 is a submerged pump 560 located in a lower part of a pumping well 580.

The purification apparatus F includes a nutrient solution preparation tank 540, an injection pump 530 for feeding a nutrient solution from the nutrient solution preparation tank 540 into the injection wells via the solid reducing agent contact tank 510, a first nutrient solution supply line 541 connecting the nutrient solution preparation tank 540 and the solid reducing agent contact tank 510, a second nutrient solution supply line 542 extending from the solid reducing agent contact tank 510 and accepted by the injection wells 520, 520', the pumping well 580, and a contaminated object introduction line 543 for introducing a contaminated object, which has been extracted by the submerged pump 560 via the pumping well 580, into the nutrient solution preparation tank 540. The structure of the solid reducing agent contact tank 510 is the same as described in FIGS. 2(*a*) and 2(*b*). The injection wells 520, 520', respectively, have open top portions 520*a*, 520*a*', closed bottom portions 520*b*, 520*b*', and strainer portions 521, 521' comprising many openings formed in lower parts thereof. The pumping well 580 has an open top portion 580*c*, a closed bottom portion 580*b*, and a strainer portion 522 comprising many openings formed in a lower part thereof, and includes a submerged pump 560 located at the closed bottom portion 580*b*. The injection wells 520, 520' and the pumping well 580 are installed underground such that their respective strainer portions 521, 521', 522 are located in the aquifer 2, and that the pumping well 580 is located between the pair of injection wells 520.

The strainer portions 521, 521' of the injection wells 520, 520' may be disposed in the vadose zone 1. The strainer portions 521, 521' of the injection wells 520, 520' are preferably arranged upstream from the strainer portion 522 of the pumping well 580. Particularly, it is preferred that when groundwater is pumped up by the pumping means 560, the strainer portions 521, 521' of the injection wells 520, 520' are arranged upstream from the strainer portion 522 of the pumping well 580 with respect to the flow of the groundwater.

In the purification apparatus F of the present embodiment, the reduced nutrient solution introduced into the aquifer 2 via the strainer portions 521, 521' of the pair of injection wells 520, 520' is introduced into the pumping well 580 from the aquifer 2 via the strainer portion 522 of the pumping well 580 located between the injection wells 520 and 520' to produce a great water level gradient, thus increasing the speed of circulation. Moreover, the contaminated object circulates between the pumping well 580 and the injection wells 520, 520', thus preventing spread of the contaminated object. Furthermore, the locations of installation of the injection wells 520, 520' and pumping well 580 can be changed according to the size of the contaminated site.

The present embodiment shows the use of the solid reducing agent. When a water soluble reducing agent is used, a water soluble reducing agent mixing portion 510' may be used in place of the solid reducing agent contact tank 510.

FIG. 8 is a schematic view showing an application example in which a purification apparatus G of a circulation treatment type similar to that in the sixth embodiment shown in FIG. 7 is applied when there is an obstacle, such as a plant, on the soil containing a contaminated object to be purified. The purification apparatus G is equipped with reduction means 610, introduction means 630 for introducing a reduced nutrient solution into the contaminated object via an introduction portion 620, and pumping means 660. The reduction means 610 is a solid reducing agent contact tank or water soluble reducing agent mixing tank 610. The introduction means 620 is an injection well 620 including an open top portion 620a, a closed bottom portion 620b, and a strainer portion 621 comprising many openings formed in a lower part thereof. The introduction means 630 is an injection pump 630. The pumping means 660 is a submerged pump 660. The injection pump 630 is provided in a first nutrient solution supply line 641 for supplying a nutrient solution from a nutrient solution preparation tank 640. The first nutrient solution supply line 641 is connected to the solid reducing agent contact tank or water soluble reducing agent mixing tank 610. The solid reducing agent contact tank or water soluble reducing agent mixing tank 610 is connected to a second nutrient solution supply line 642, and the second nutrient solution supply line 642 is accepted into the injection well 620. A pumping well 680 has an open top portion 680a, a closed bottom portion 680b, and a strainer portion 622 comprising many openings formed in a lower part thereof, and includes a submerged pump 660 located at the closed bottom portion 680b. The pumping well 680 and the nutrient solution preparation tank 640 are connected by a contaminated object supply line 643.

The injection well 620 and the pumping well 680 are installed such that in an aquifer 2, the injection well 620 is located upstream in the flow of groundwater, while the pumping well 680 is located downstream in the flow of groundwater. The distance between the injection well 620 and the pumping well 680 is appropriately selected depending on the size of the obstacle present on the ground.

To purify groundwater by use of the purification apparatus G of the present embodiment, the nutrient solution is supplied from the nutrient solution preparation tank 640 to the solid reducing agent contact tank 610 via the first nutrient solution supply line 641. After reduction of the nutrient solution, the reduced nutrient solution is introduced into the injection well 620 via the second nutrient solution supply line 642, and then introduced into the contaminated object in the aquifer 2 through the strainer portion 621 located in the lower part. In the aquifer 2, groundwater flows from the injection well 620 toward the pumping well 680. Thus, the contaminated object and the purified object are introduced into the pumping well 680 by the submerged pump 660, and then introduced into the nutrient solution preparation tank 640 via the contaminated object supply line 643. In this manner, it becomes possible to purify the contaminated object into which the reduced nutrient solution cannot be directly introduced because of the presence of the obstacle. When the injection well 620 is installed at a relatively shallow position, and the pumping well 680 is installed at a relatively deep position, the following advantage is produced: The reduced nutrient solution flowing out of the injection well 620 flows into the pumping well 680 under its own weight. This flow, coupled with the flow of groundwater, increases the circulation speed of the reduced nutrient solution. The present embodiment is effective when used in a place where the thickness of the aquifer 2 is large.

Figure 9:
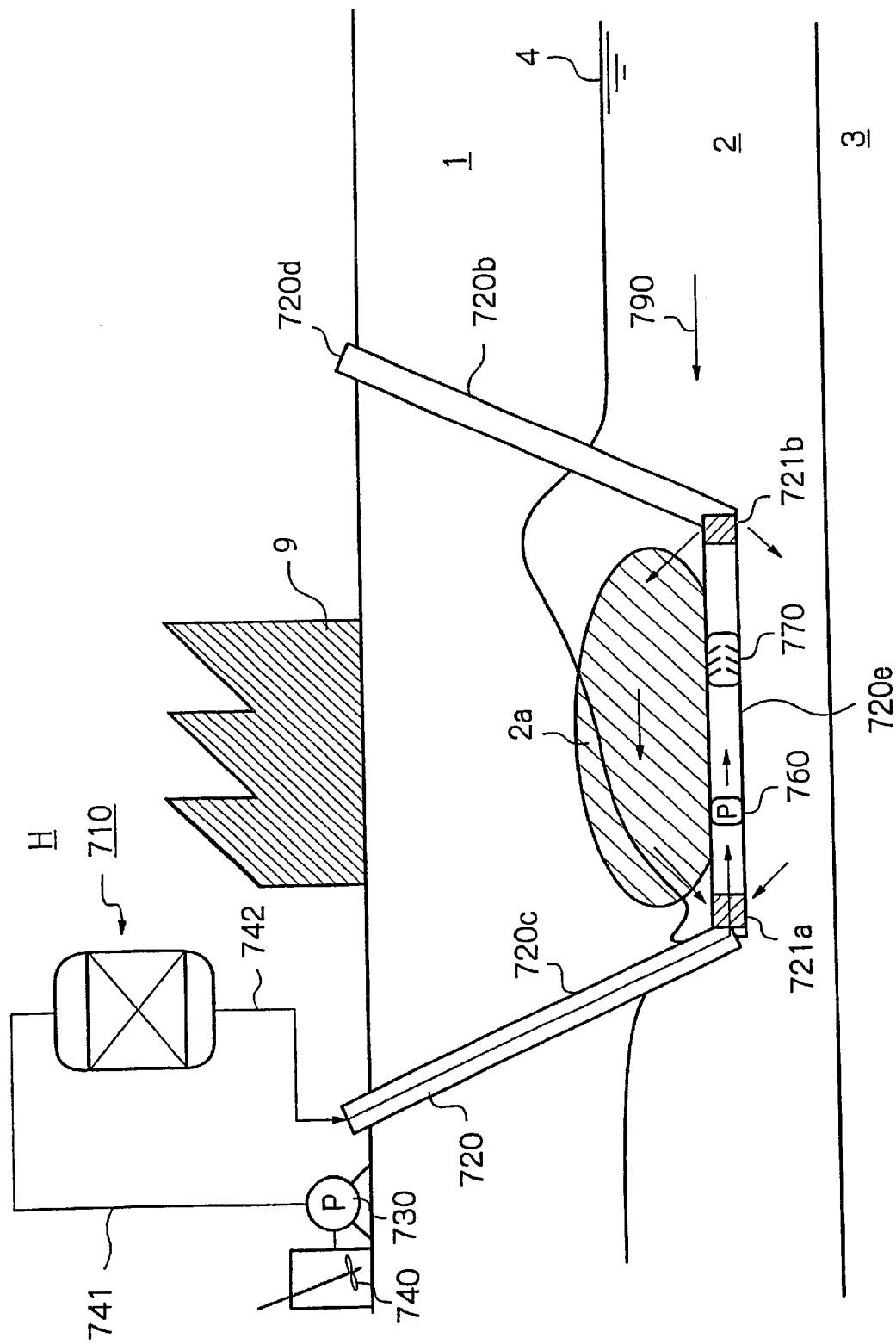
FIG. 9 is a schematic view showing an eighth embodiment of the present invention in which a purification apparatus of a circulation treatment type is applied when there is an obstacle on the ground.

FIG. 9 is a schematic view showing an eighth embodiment of the present invention. FIG. 9 shows an example of application in a place where an obstacle, such as a plant, is present on the ground and the thickness of an aquifer 2 is not very large. A purification apparatus H of the present embodiment is equipped with reduction means 710, and introduction means 730 for introducing a reduced nutrient solution via an introduction portion 720. The reduction means 710 is a solid reducing agent contact tank or a water soluble reducing agent mixing tank. The introduction portion 720 has an open end portion 720a, a first inclined portion 720c extending obliquely from the open end portion 720a into the ground, a horizontal portion 720e connected to the first inclined portion 720c and inserted horizontally in the aquifer 2, a second inclined portion 720d connected to the horizontal portion 720e and extending obliquely toward an above-ground region, and a closed end portion 720b which is an above-ground end portion of the second inclined portion 720d. The open end portion 720a accepts a second nutrient solution supply line 742 extending from the solid reducing agent contact tank 710. The first inclined portion 720c is located downstream in the flow of groundwater in the aquifer 2. The second inclined portion 720d is located upstream in the flow of groundwater in the aquifer 2. The closed end portion 720b is closed above the ground in a protruding state. The horizontal portion 720e includes a downstream strainer portion 721a, a submerged pump 760, a line mixer 770, and an upstream strainer portion 721b in this order. The submerged pump 760 sucks contaminated groundwater from the aquifer 2 into the horizontal portion 720e via the downstream strainer portion 721a, and supplies it to the line mixer 770. The sucked contaminated groundwater is mixed with the reduced nutrient solution, which has been supplied from the second nutrient solution supply line 742, in the line mixer 770, and is purified thereby. The reduced nutrient solution and purified groundwater mixed in the line mixer 770 are returned into the aquifer 2 via the upstream strainer portion 721b. The introduction means 730 is an injection pump 730 provided in a first nutrient solution supply line 741 from a nutrient solution preparation tank 740.

The purification apparatus H of the present embodiment has the following advantages: It is effective when an obstacle, such as a plant, is present on the ground and the thickness of groundwater in the aquifer 2 is small. This apparatus can circulate contaminated groundwater without pumping it, thus obviating the need for pumping treatment.

In FIG. 9, the horizontal portion 720e extends in a horizontal direction, but the horizontal portion may be inclined. Depending on the method of formation, the inclined portion 720d may be omitted.

As shown in FIG. 9, the horizontal portion 720e may be located below a contaminated soil 2a, or the horizontal portion 720e may pass through the center of the contaminated soil 2a in the horizontal direction. Preferably, the horizontal portion 720e passes through the center of the contaminated soil 2a in the horizontal direction. Particularly, the upstream strainer portion 721b and the downstream strainer portion 721a are preferably located upstream and downstream from the contaminated soil 2a with respect to a flow 790 of groundwater. More preferably, they are located slightly upstream and downstream from the contaminated soil 2a.

Figure 10:
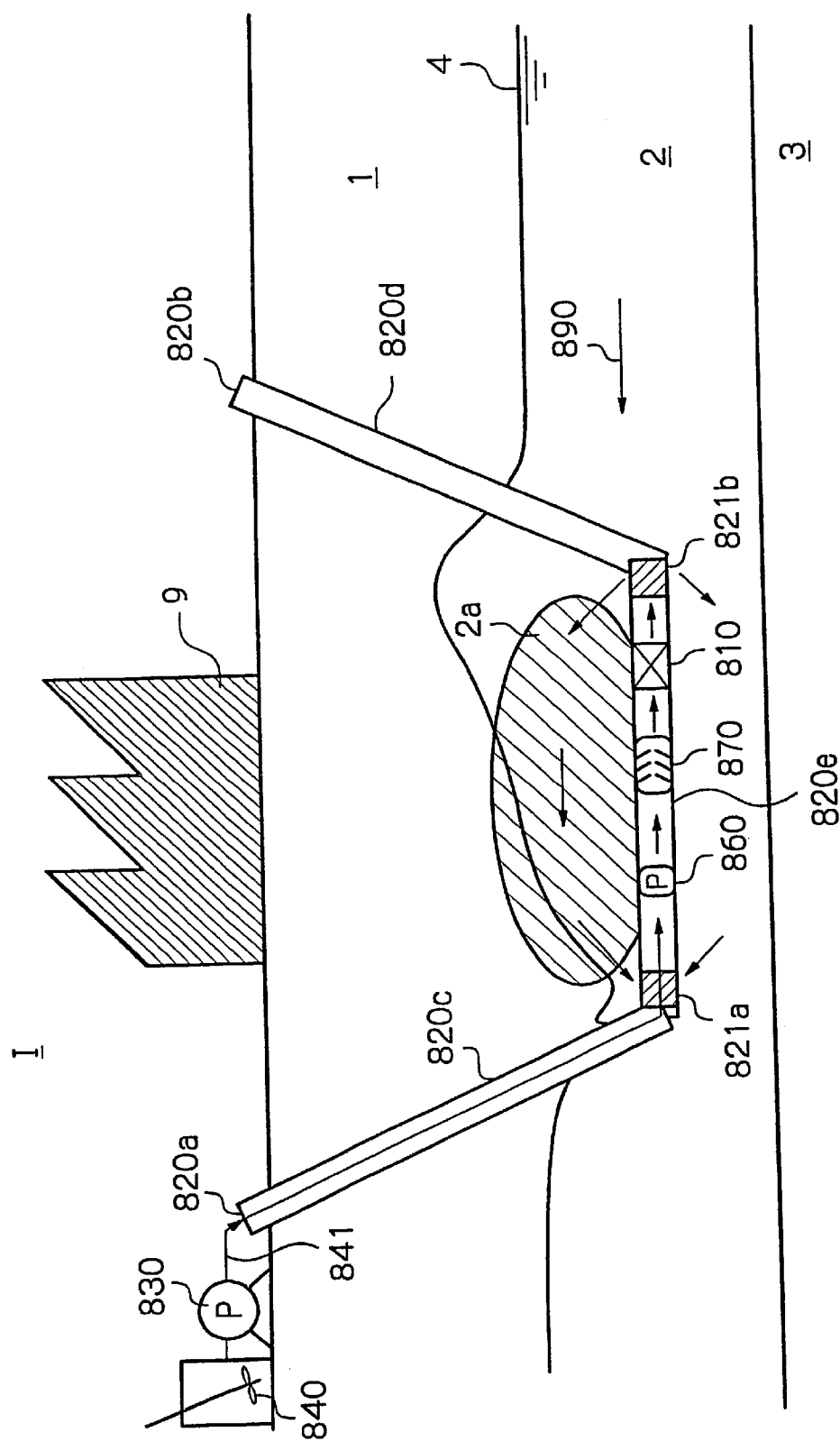
FIG. 10 is a schematic view showing a ninth embodiment of the present invention in which a purification apparatus of a circulation treatment type capable of repeated contact with a solid reducing agent is applied when there is an obstacle on the ground.

FIG. 10 shows a ninth embodiment of the present invention. A purification apparatus I of the ninth embodiment is in the same configuration as the eighth embodiment shown in FIG. 9, except that the reduction means, i.e., solid reducing agent contact portion 810, is located not above the ground, but in a horizontal portion 820e located horizontally in the aquifer 2. That is, the horizontal portion 820e includes a downstream strainer portion 821a, a submerged pump 860, a line mixer 870, and an upstream strainer portion 721b in this order.

The submerged pump 860 sucks contaminated groundwater from the aquifer 2 into the horizontal portion 820e via the downstream strainer portion 821a, and supplies it to the line mixer 870. The sucked contaminated groundwater is mixed with a nutrient solution, which has been supplied from a second nutrient solution supply line 841, in the line mixer 870. The nutrient solution and groundwater mixed in the line mixer 870 are reduced in the solid reducing agent contact portion 810, and then returned into the aquifer 2 via the upstream strainer portion 821b.

In this case, there are the advantage obtained in the eighth embodiment, and also the advantage that a dehalogenation reaction can be performed more sufficiently, since groundwater contacts the reducing agent repeatedly.

As shown in FIG. 10, the horizontal portion 820e may be located below a contaminated soil 2a, or the horizontal portion 820e may pass through the center of the contaminated soil 2a in the horizontal direction. Preferably, the horizontal portion 820e passes through the center of the contaminated soil 2a in the horizontal direction. Particularly, the upstream strainer portion 821b and the downstream strainer portion 821a are preferably located upstream and downstream from the contaminated soil 2a with respect to a flow 890 of groundwater. More preferably, they are located slightly upstream and downstream from the contaminated soil 2a.

Figure 11:
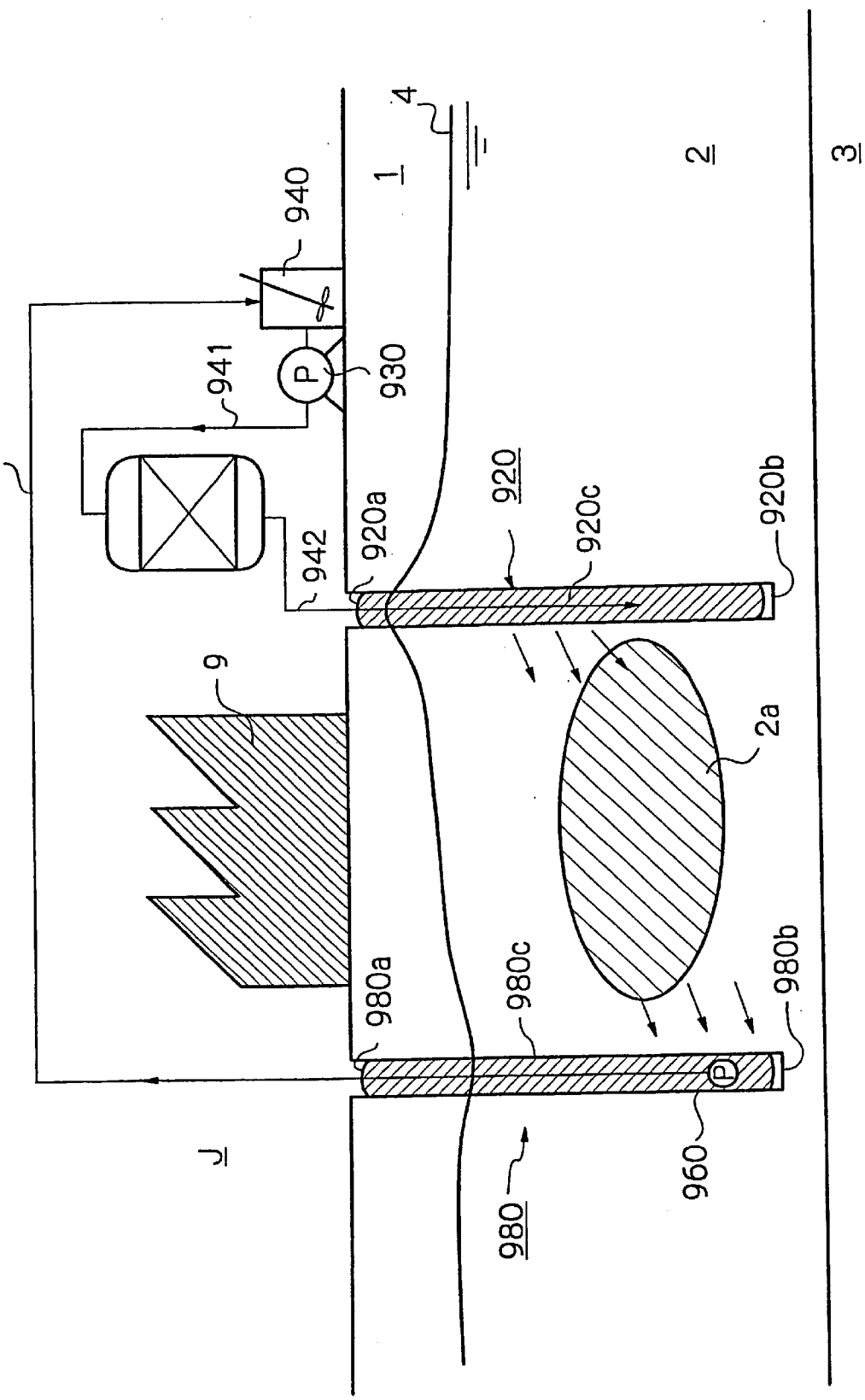
FIG. 11 is a schematic view showing a tenth embodiment of the present invention using an underground wall.

FIG. 11 shows a tenth embodiment of the present invention. A purification apparatus J of the present embodiment is in the same configuration as the seventh embodiment shown in FIG. 8, except that a pair of underground walls comprising an injection wall 920 and a pumping wall 980 are utilized instead of the injection well 620 and the pumping well 680 of the purification apparatus G. Since the underground walls 920 and 980 are the same in structure, the underground wall 920 will be taken as an example to illustrate the structure of the underground wall. The underground wall 920 comprises an open end portion 920a, a deep groove 920c dug in the ground, and a bottom portion 920b. In the deep groove 920c, an element with high permeability to air and liquid, such as sand or gravel, is buried to prevent collapse of the groove. The deep groove 920c of the underground wall 920 forms a side wall of the underground wall, and is formed with a deposition of the element having excellent air and liquid permeability. Thus, the entire wall surface exhibits the same function as that of a strainer portion. Hence, when the underground wall 920 is used as an introduction portion, a nutrient solution is introduced into an aquifer 2 from any part thereof. On the other hand, the underground wall 980 includes at a bottom portion 980b a submerged pump 960 for extracting groundwater from the aquifer 2. Groundwater is introduced into the pumping wall 980 from the neighborhood of the bottom portion 980b. When the underground walls 920 and 980 are used, the reduced nutrient solution is introduced into the aquifer 2 from any part of the injection wall 920, and groundwater is extracted by the submerged pump 960 from the lower part of the pumping wall 980. These features lead to the advantages that the reduced nutrient solution can be diffused over a broad range in the horizontal direction, when the water level of groundwater of the aquifer 2 is high and its water level gradient is small.

Figure 12:
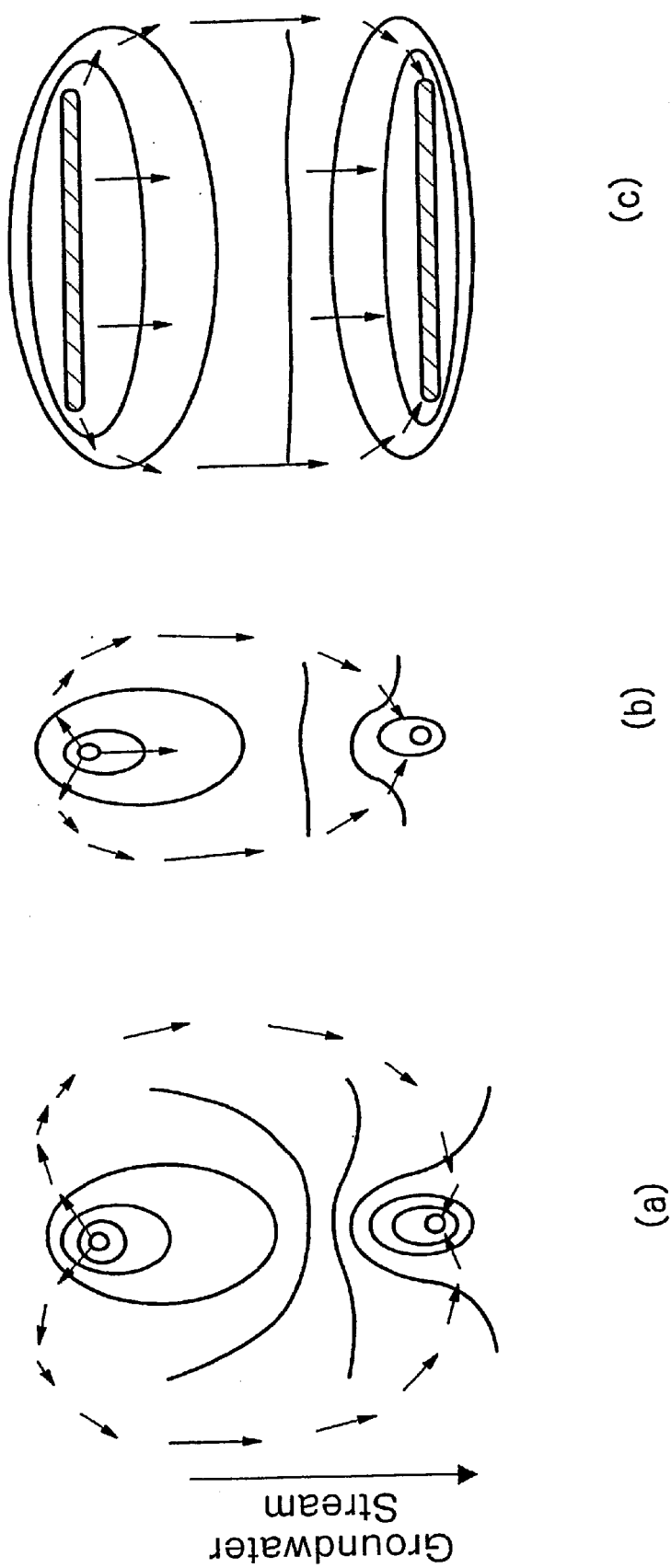
FIGS. 12(a) to 12(c) are explanatory drawings showing the relation between a water level gradient and horizontal diffusion.

FIGS. 12(a), 12(b) and 12(c) show water level contour lines as solid lines, and groundwater stream lines as arrows. FIGS. 12(a) and 12(b) show water level contour lines and groundwater stream lines when wells having strainer portions are used. When the water level gradient is great, the nutrient solution can diffuse widely in the horizontal direction, as shown in FIG. 12(a). When the water level gradient is small, the horizontal diffusion of the nutrient solution is limited, as shown in FIG. 12(b). This is because the amount of outflow from the strainer portion is too small to obtain a horizontal diffusive effect surpassing the water level gradient.

However, even when the water level gradient is small, the use of the underground wall enables the nutrient solution to diffuse horizontally over a wide range. FIG. 12(c) shows water level contour lines and groundwater stream lines when underground walls are used. With the underground wall, outflow of the nutrient solution occurs from the entire underground wall, thus permitting horizontal diffusion over a broad range.

According to an aspect of the purification apparatus and the purification method of the present invention, a contaminated object containing halogenated organic compounds can be purified efficiently and easily. Particularly, a satisfactory biodegradation reaction due to the enhancement of the activity of heterotrophic microorganisms by a reduced nutrient solution, and a dehalogenation reaction by a reducing agent are combined together, whereby the contaminated object containing the halogenated organic compounds can be purified satisfactorily.

According to the purification apparatus and the purification method as an aspect of the present invention, a contaminated object containing halogenated organic compounds can be purified in situ easily and continuously.

Figure 13:
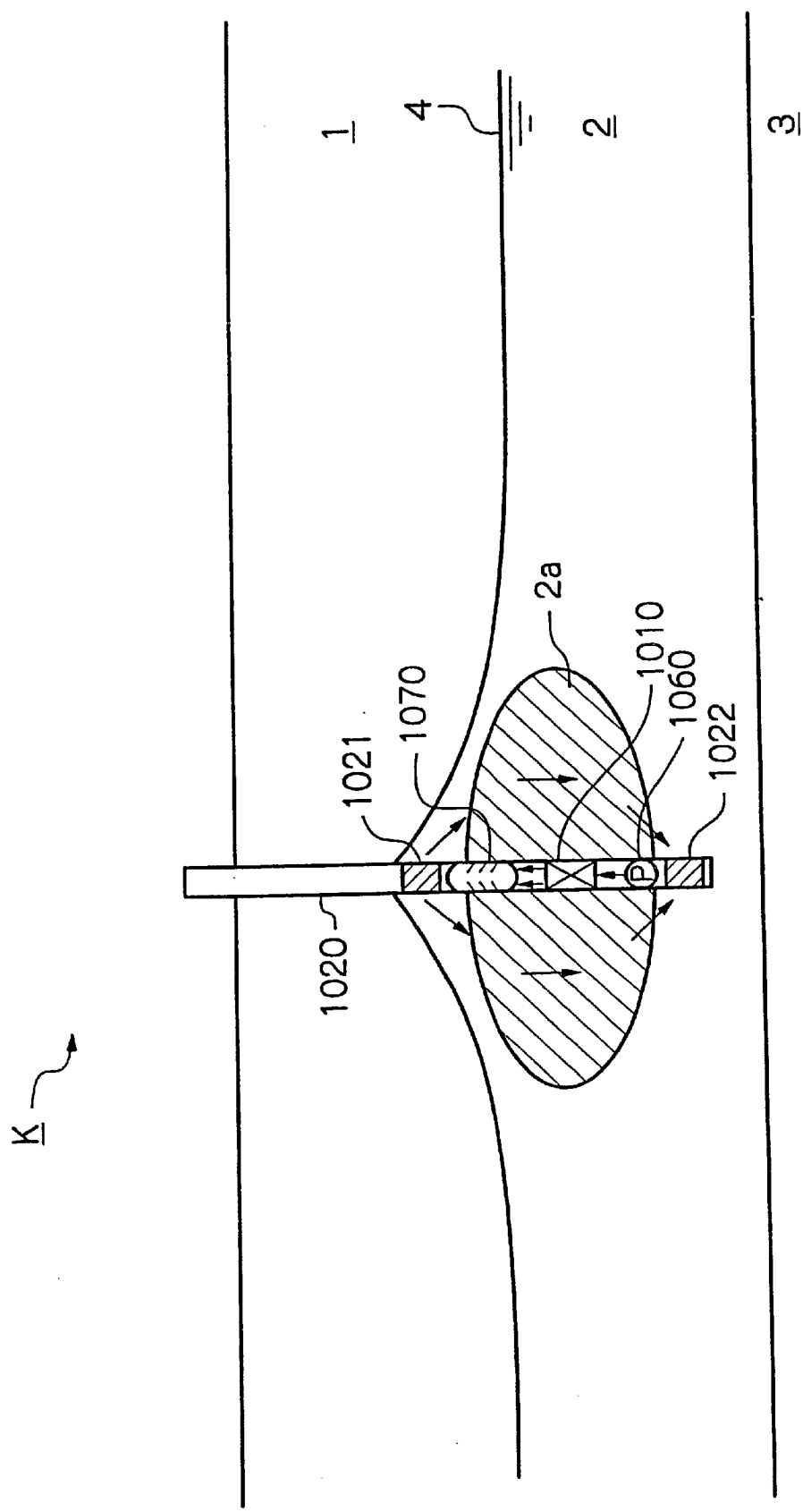
FIG. 13 is a schematic view showing an eleventh embodiment of the present invention using a solid reducing agent.
Figure 14:
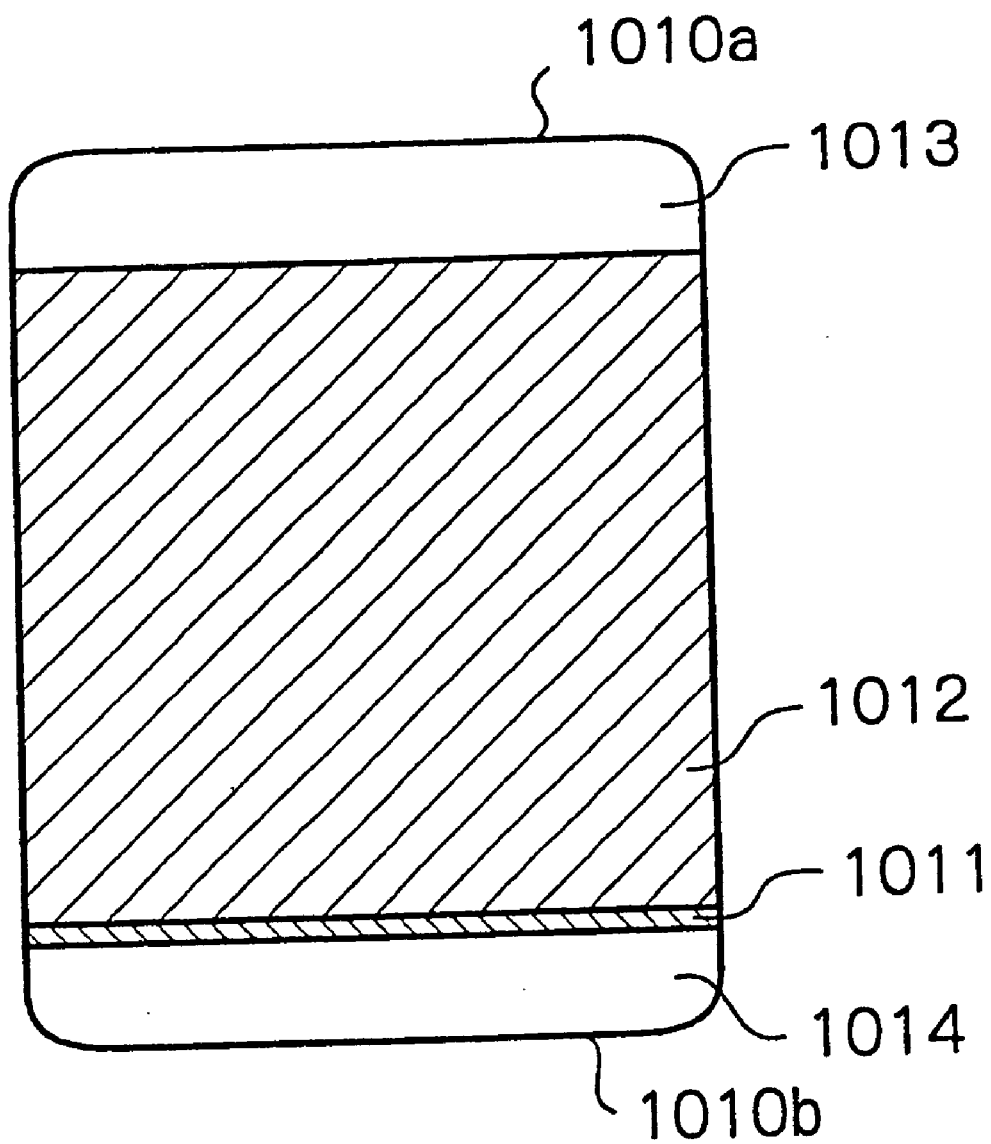
FIG. 14 is a schematic view showing the internal structure of a reduction tank when a solid reducing agent is used.

FIGS. 13 and 14 are schematic views showing a state in which a purification apparatus according to an embodiment of the present invention is installed.

In FIG. 13, the soil has a vadose zone 1 above a groundwater table 4, and an aquifer 2 below the groundwater table 4. Below the aquifer 2, an aquitard 3 is located. Part of the aquifer 2 is a soil 2a contaminated with halogenated organic compounds, and groundwater contained in the soil 2a is similarly contaminated with the halogenated organic compounds.

A purification apparatus K shown in FIG. 13 is equipped with a reduction tank 1010 holding a reducing agent having a standard electrode potential, relative to a standard hydrogen electrode at 25° C., of from 300 mV to −2400 mV, and a housing 1020 which has a water intake portion 1022 and a water discharge portion 1021, and in which at least the water intake portion 1022 is located at a site filled with flowable water in the contaminated object, namely, located in the aquifer 2 in the present embodiment. The purification apparatus K is configured such that groundwater circulates between the aquifer 2 and the housing 1020. The reducing agent is a reducing agent in a solid state (hereinafter referred to as a solid reducing agent), and an iron powder, for example, can be used preferably. The iron may be in the form of stainless steel, cast iron, carbon steel, or reduced iron.

As the reducing agent, there can be preferably used at least one reducing agent selected from the group consisting of reduced iron, cast iron, iron-silicon alloy, titanium alloy, zinc alloy, manganese alloy, aluminum alloy, magnesium alloy, calcium alloy, titanium-silicon alloy, titanium-aluminum alloy, zinc-aluminum alloy, manganese-magnesium alloy, aluminum-zinc-calcium alloy, aluminum-tin alloy, aluminum-silicon alloy, and calcium-silicon alloy.

The water intake portion 1022 is a strainer portion comprising many through-holes provided in a wall surface of a lower part of the housing 1020. The water discharge portion 1021 is a strainer portion comprising many through-holes provided in the wall surface of a nearly middle part of the housing 1020. The location of the water discharge portion 1021 is not restricted to the middle part of the housing 1020. The housing 1020 may be formed such that when the water intake portion 1022 is located in the aquifer 2, the water discharge portion 1021 will be located in an upper part of the aquifer 2 or slightly above the aquifer 2. The open area ratio of the strainer portion is preferably 10 to 50%, particularly preferably 20 to 40%.

The housing 1020 further has wire nettings wrapped round the strainer portions, and a packer (not shown) wound round the wall surface of the conduit other than the strainer portions. The wire netting is designed to prevent penetration of gravel or the like into the housing 1020. The packer absorbs water and swells when the housing 1020 is fixed underground. To install the housing 1020 vertically in the soil, the following procedure is performed: The soil is dug with a boring machine to form a deep hole. After completion of digging, the boring machine is pulled out of the hole. Then, the housing 1020 is inserted into the hole. Then, the packer (not shown) wound round the outer peripheral wall of the housing 1020 swells by absorbing moisture present between the housing 1020 and the soil wall. Further, silica sand or the like is put into the hole to fill up the gap around the housing 1020. Finally, cement is poured into an area close to the ground surface, and solidified there, completing the installation of the housing 1020.

The reduction tank 1010, as shown in FIG. 14, includes a support floor 1011 provided in a lower part thereof, a solid reducing agent contact portion 1012 supported by the support floor 1011, a first gap portion 1013 above the solid reducing agent contact portion 1012, and a second gap portion 1014 below the solid reducing agent contact portion 1012. The solid reducing agent contact portion 1012 includes a support medium such as gravel, and the solid reducing agent carried on the support medium. The solid reducing agent is, for example, a powder measuring 500 μm or less. The support floor 1011 has many small holes of a size enough to allow passage of groundwater, but allow no passage of the solid reducing agent. The support floor is, for example, a plate-like member composed of stainless steel. The first gap portion 1013 and the second gap portion 1014 are of a sufficient size for groundwater to flow into the solid reducing agent contact portion 1012 constantly at a desired speed.

The purification method for purifying groundwater and soil contaminated with halogenated organic compounds, by use of the purification apparatus K of the present embodiment, includes a circulation step of circulating groundwater, and a reduction step of reducing the circulating groundwater with a reducing agent having a standard electrode potential, relative to a standard hydrogen electrode at 25° C., of 300 mV to −2400 mV.

In the circulation step, groundwater in the aquifer 2 is taken up into the housing 1020 by a pump P via the water intake portion 1022 in the lower part of the housing 1020, and discharged into the aquifer 2 via the water discharge portion 1021 in the middle part of the housing 1020. Then, the groundwater moves in the aquifer 2 from its upper region to its lower region by gravity.

In the reduction step, groundwater taken into the housing 1020 is contacted with the reducing agent during its passage through the reduction tank 1010, and reduced thereby. In detail, the groundwater flows from below the reduction tank 1010 into the reduction tank 1010, passes through the second gap portion 1014 and the small holes of the support floor 1011, and reaches the reducing agent contact portion 1012, where the groundwater is reduced. The groundwater reduced in the reducing agent contact portion 1012 passes through the first gap portion 1013, is then returned to the interior of the housing 1020, and flows out of the water discharge portion 1021 into the aquifer 2. In this manner, the reduced groundwater cleans the soil.

Figure 15:
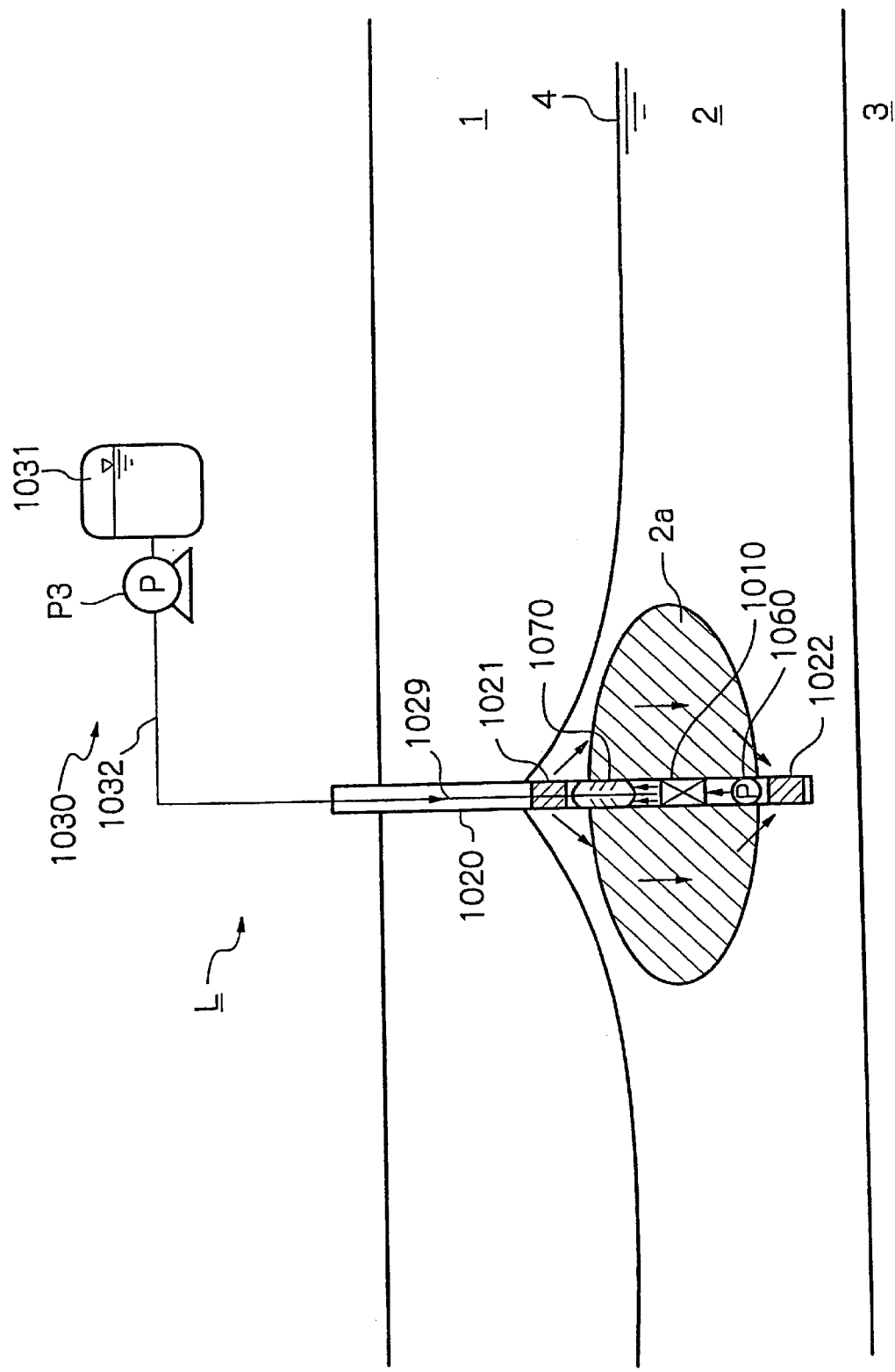
FIG. 15 is a schematic view showing a twelfth embodiment of the present invention using a water soluble reducing agent.

Next, a twelfth embodiment of the purification apparatus of the present invention is shown in FIG. 15. FIG. 15 is a schematic view showing a state of installation of the purification apparatus using a water soluble reducing agent as the reducing agent. As the water soluble reducing agent, there can be preferably used an organic acid or its derivative, hypophosphorous acid or its derivative, or a salt of an organic acid or hypophosphorous acid with iron, titanium, zinc, manganese, aluminum or magnesium, or a sulfide salt. As the organic acid, a carboxylic acid, a sulfonic acid, a phenolic acid, or a derivative thereof can be used preferably. Preferably used examples of the carboxylic acid are mono-carboxylic acids, dicarboxylic acids, tricarboxylic acids and tetracarboxylic acids having 1 to 20 carbon atoms and optionally substituted by hydroxyl groups. Concretely, acetic acid, citric acid and terephthalic acid are preferred, and aliphatic tricarboxylic acids having 2 to 10 carbon atoms, such as citric acid, are particularly preferred.

As shown in the Table 1 offered earlier, formic acid and oxalic acid do not have a standard electrode potential, relative to a standard hydrogen electrode at 25° C., of 300 mV to −2400 mV, and do not conform to the reducing agent of the present invention. However, derivatives of formic acid and oxalic acid, for example, their salts, may have a standard electrode potential, relative to a standard hydrogen electrode at 25° C., of 300 mV to −2400 mV, and can conform to the reducing agent of the present invention.

As the derivative of the phenolic acid, a polyhydroxyaryl can be used preferably. As the polyhydroxyaryl, 1,2,3-trihydroxybenzene and 1,4-dihydroxybenzene are preferred. As the derivatives of the organic acid, salts, esters, amides, and acid anhydrides are preferred. As the derivatives of hypophosphorous acid, salts and esters can be used preferably, and salts are particularly preferred.

A purification apparatus L of the present embodiment is the same as in the embodiment shown in FIG. 13, except that a water soluble reducing agent is used as the reducing agent, and reducing agent addition means 1030 provided on the ground surface is further provided. The same elements as in FIG. 13 are illustrated using the same numerals.

The reducing agent addition means 1030 includes a water soluble reducing agent tank 1031, a reducing agent supply line 1032 extending from the water soluble reducing agent tank 1031 to a reduction tank 1010 inside a housing 1021, and a pump P3 provided on the reducing agent supply line 1032. If desired, a line mixer (not shown) may be provided in the reducing agent supply line 1032.

A purification method for soil water using the purification apparatus L of the present embodiment is the same as the purification method for soil water using the purification apparatus K, except for initially providing the step of adding a water soluble reducing agent from the water soluble reducing agent tank 1031 into the reduction tank 1010 by the pump P3 via the reducing agent supply line 1032.

To purify groundwater and soil using the purification apparatus L of the present embodiment, the water soluble reducing agent is supplied from the reducing agent supply line 1032 to a region below a line mixer 1070, which is disposed inside the housing 1020, via a pipe 1029. Separately, groundwater is introduced into the housing 1020 by a submerged pump 1060 via a lower strainer portion 1022. The submerged pump 1060 introduces the groundwater and water soluble reducing agent, which have been introduced into the housing 1020, into the line mixer 1070. In the line mixer 1070, the groundwater and water soluble reducing agent are mixed to reduce the groundwater. The reduced groundwater permeates the aquifer 2 via the upper strainer portion 1021, and cleans the soil. Then, the groundwater is extracted again into the housing 1020 by the submerged pump 1060 via the lower strainer portion 1022. In this manner, circulation of groundwater takes place. During this circulation, contaminated groundwater is degraded by the reducing agent and purified thereby. This groundwater is given a reducing power.

Figure 16:
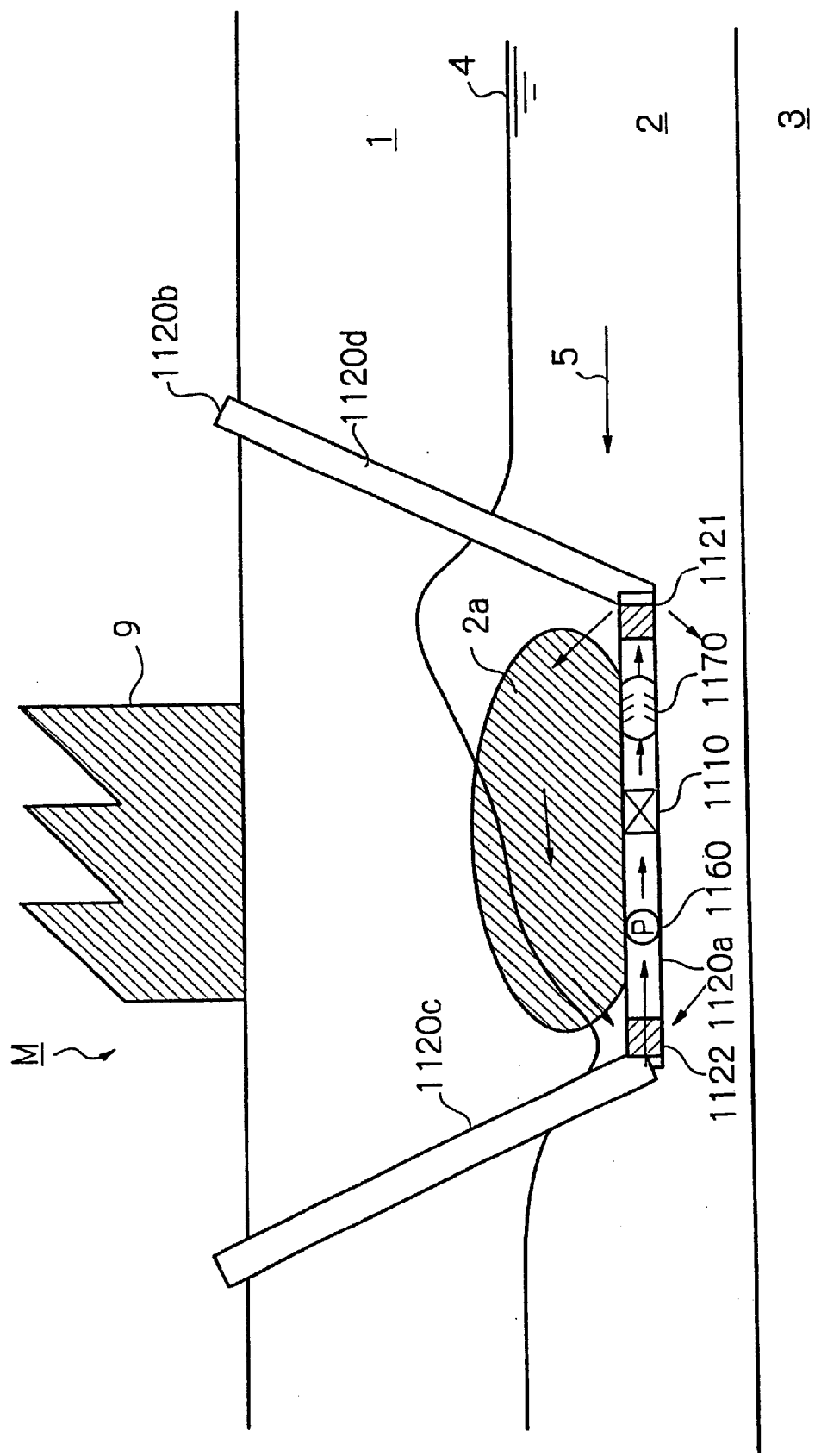
FIG. 16 is a schematic view showing a thirteenth embodiment of the present invention.

Next, a thirteenth embodiment of the present invention is schematically shown in FIG. 16. A purification apparatus M of the present embodiment is effective when there is an obstacle, such as a plant, above contaminated soil or groundwater to be purified. The purification apparatus M is the same as the embodiment shown in FIG. 13, except that a housing 1120a is located horizontally in an aquifer 2. The same elements are assigned the same numerals for illustration.

Herein, the well includes a so-called horizontal well as indicated as the housing 1120a, and the oblique well 222 of FIG. 4C.

In the housing 1120a, a strainer portion 1122 constituting a water intake portion is formed downstream with respect to groundwater, and a strainer portion 1121 constituting a water discharge portion is formed upstream with respect to groundwater. The housing 1120a includes a pump P at a site close to the water intake potion 1122, and a reduction tank 1110 at a site close to the water discharge potion 1121. If desired, communication pipes 1120b and 1120c communicating with the ground surface may be provided at opposite end portions of the housing 1120a.

That is, the strainer portion 1122 for sucking in groundwater, pump 1160, reduction tank 1110 for reducing groundwater, line mixer 1170, and strainer portion 1121 for discharging the reduced groundwater are provided in this order inside the housing 1120a. If groundwater can sufficiently contact the reducing agent inside the reduction tank 1110, the line mixer 1170 can be omitted.

Purification of groundwater and soil by the purification apparatus M of the present embodiment is performed by repeating the step of sucking groundwater via the water intake portion 1122, passing it through the reduction tank 1110, and returning it from the water discharge portion 1121 into the aquifer 2 by the action of the pump P, thereby repetitively reacting the groundwater with the reducing agent inside the reduction tank 1110 during its circulation in the purification apparatus M to cause its reduction, and allowing the reduced groundwater to clean the soil repeatedly.

When the water intake portion 1122 is installed at a relatively low-water level site, and the water discharge portion 1121 is installed at a relatively high water level site, the following advantage is produced: The ions of the reducing agent contained in the groundwater flowing out of the water discharge portion 1121 have their own weight, which, coupled with the flow of groundwater, increases the circulation speed. Also, the present embodiment is effective when used in a place where the aquifer 2 is thick.

Figure 17:
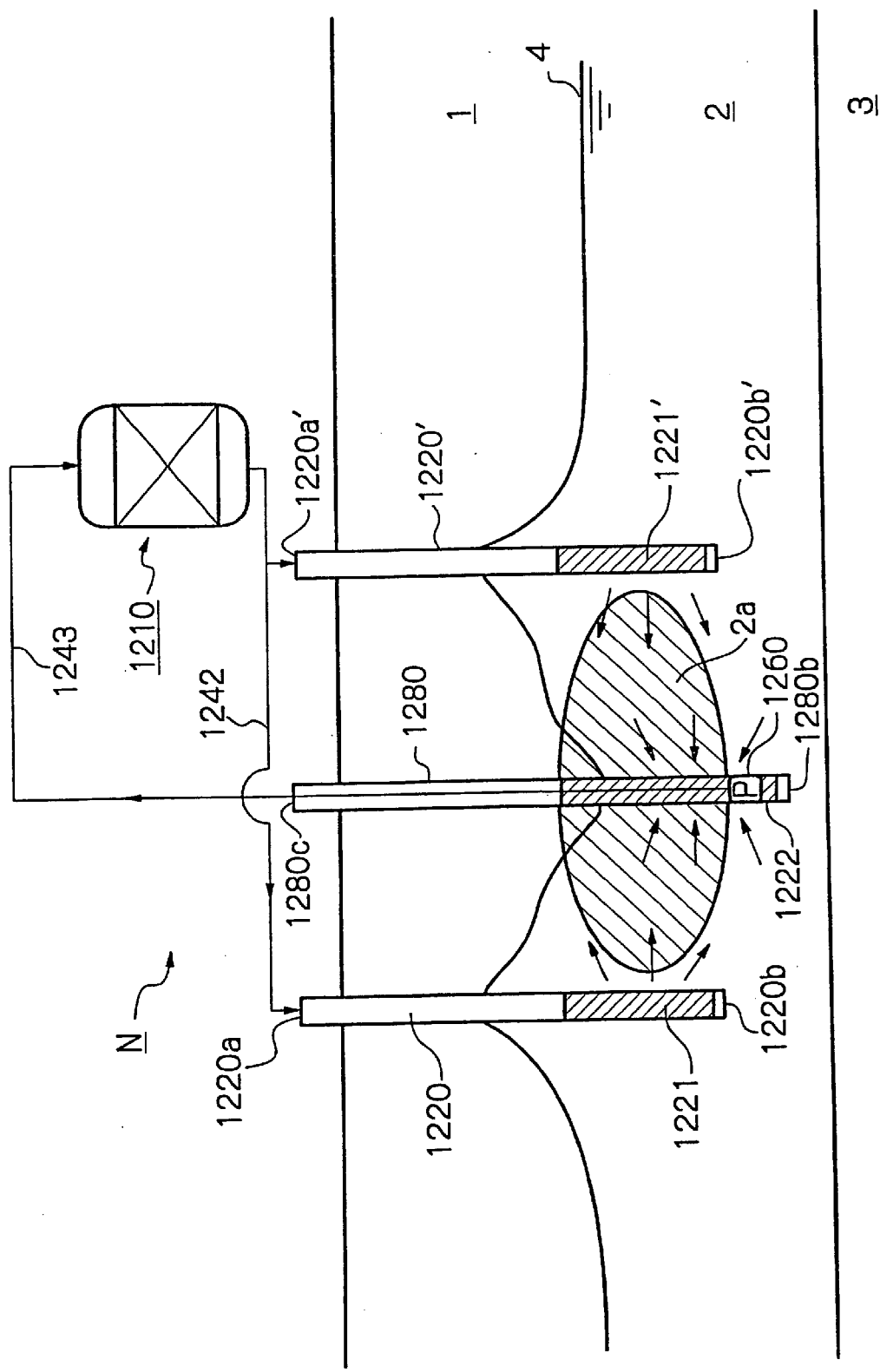
FIG. 17 is a schematic view showing a fourteenth embodiment of the present invention.

Further, a fourteenth embodiment of the present invention is schematically shown in FIG. 17. A purification apparatus N of the present embodiment is equipped with a pumping well 1280 having a strainer portion 1222 constituting a water intake portion and a submerged pump P, a groundwater supply line 1243 for guiding groundwater sucked from the water intake portion, a reduction tank 1210 connected to the groundwater supply line 1243 and provided on the ground surface, a reducing agent supply line 1242 for guiding groundwater containing a reducing agent from the reduction tank 1210, and a pair of injection wells 1220 and 1220' for accepting the reducing agent from the reducing agent supply line 1242 and having water discharge portions, i.e., strainer portions 1221 and 1221'. The pair of injection wells 1220 and 1220' having the water discharge portions are located in a relatively high water level region of an aquifer 2, while the pumping well 1280 having the water intake portion is located in a relatively low water level region of the aquifer 2.

Groundwater sucked via the water intake portion 1222 of the pumping well 1280 is pumped up by the pump P to the reduction tank 1210 provided on the ground surface via the groundwater supply line 1243. The pumped-up groundwater contacts the reducing agent in the reduction tank 1210 to undergo a reducing action, and is then returned into the aquifer 2 through the water discharge portions 1221 and 1221' of the injection wells 1220 and 1220' via the reducing agent supply line 1242. By repeating this process, contaminated groundwater is gradually reduced and purified while circulating among the water intake portion 1222, the reduction tank 1210 and the water discharge portions 1221 and 1221'.

In a place where the layer thickness of the aquifer and the layer thickness of the vadose zone are relatively large, the fourteenth embodiment can produce a particularly great water level gradient. Thus, the speed of circulation increases, and the purification efficiency increases. Moreover, the contaminated groundwater circulates between the pumping well 1280 and the injection wells 1220, 1220', thus preventing spread of the contaminated object. Furthermore, the locations of installation of the injection wells 1220, 1220' and pumping well 1280 can be changed according to the size of the contaminated site.

The present embodiment shows the use of the solid reducing agent. When a water soluble reducing agent is used, a water soluble reducing agent tank, a water soluble reducing agent supply line, and a line mixer as shown in FIG. 15 may be used instead of the reduction tank 1210.

In the embodiment shown in FIG. 17, the pair of injection wells are used, but there may be one, two or more, for example, three or more of the injection wells. Alternatively, an underground wall may be used in place of the injection well. The underground wall refers to something like a well extending laterally to form a wall underground. The underground wall comprises an open end portion, a deep groove dug in the ground, and a bottom portion. In the deep groove, an element with high permeability to air and liquid, typically such as sand or gravel, is buried to prevent collapse of the groove. The deep groove of the underground wall forms a side wall of the underground wall, and is formed with a deposition of the element having excellent air and liquid permeability. Thus, the entire wall surface exhibits the same function as that of a strainer portion.

In the foregoing embodiment, an example of circulating groundwater to purify groundwater and soil has been explained. However, the object to be circulated is not limited to groundwater, and the object to be purified is not restricted to groundwater and soil.

According to a purification apparatus and a purification method as other aspects of the present invention, a contaminated object containing halogenated organic compounds can be purified efficiently and easily. Particularly, water is reduced while being circulated between a site filled with flowable water in the contaminated object and the purification apparatus (in the above-described embodiment, groundwater is circulated between the aquifer 2 and the purification apparatus 1). By this measure, dehalogenated water can be returned into the contaminated object, without a rapid change in the quality of water, whereby the halogen ion concentration in the contaminated object can be decreased gradually, and the contaminated object containing halogenated organic compounds can be purified satisfactorily.

According to a purification apparatus and a purification method as other aspects of the present invention, a contaminated object containing halogenated organic compounds can be purified easily and continuously in situ.

The present invention will be described in further detail with reference to the accompanying drawings, but the present invention is not restricted thereby.

Figure 18:
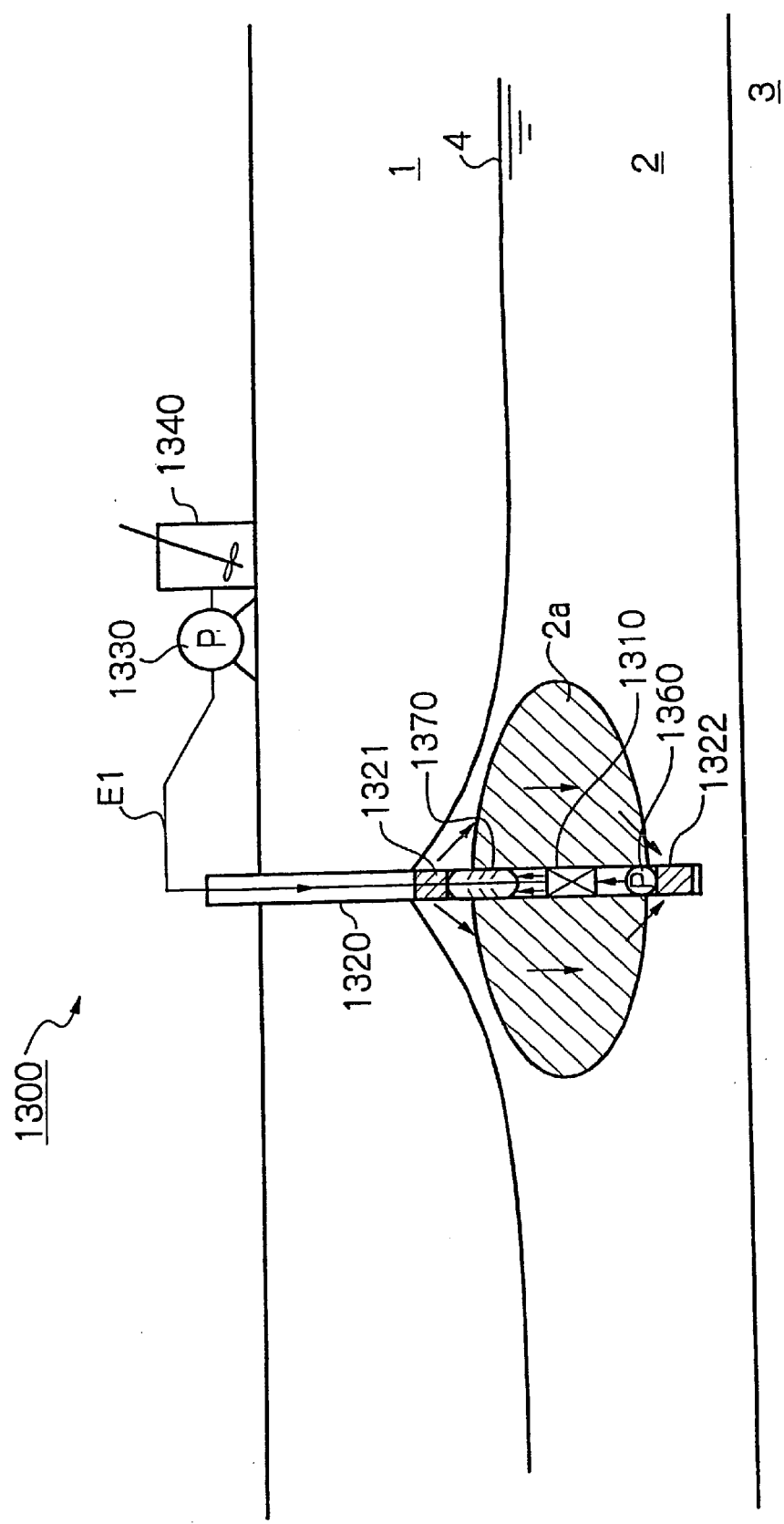
FIG. 18 is a schematic view showing the fourteenth embodiment of the present invention using a solid reducing agent.
Figure 19:
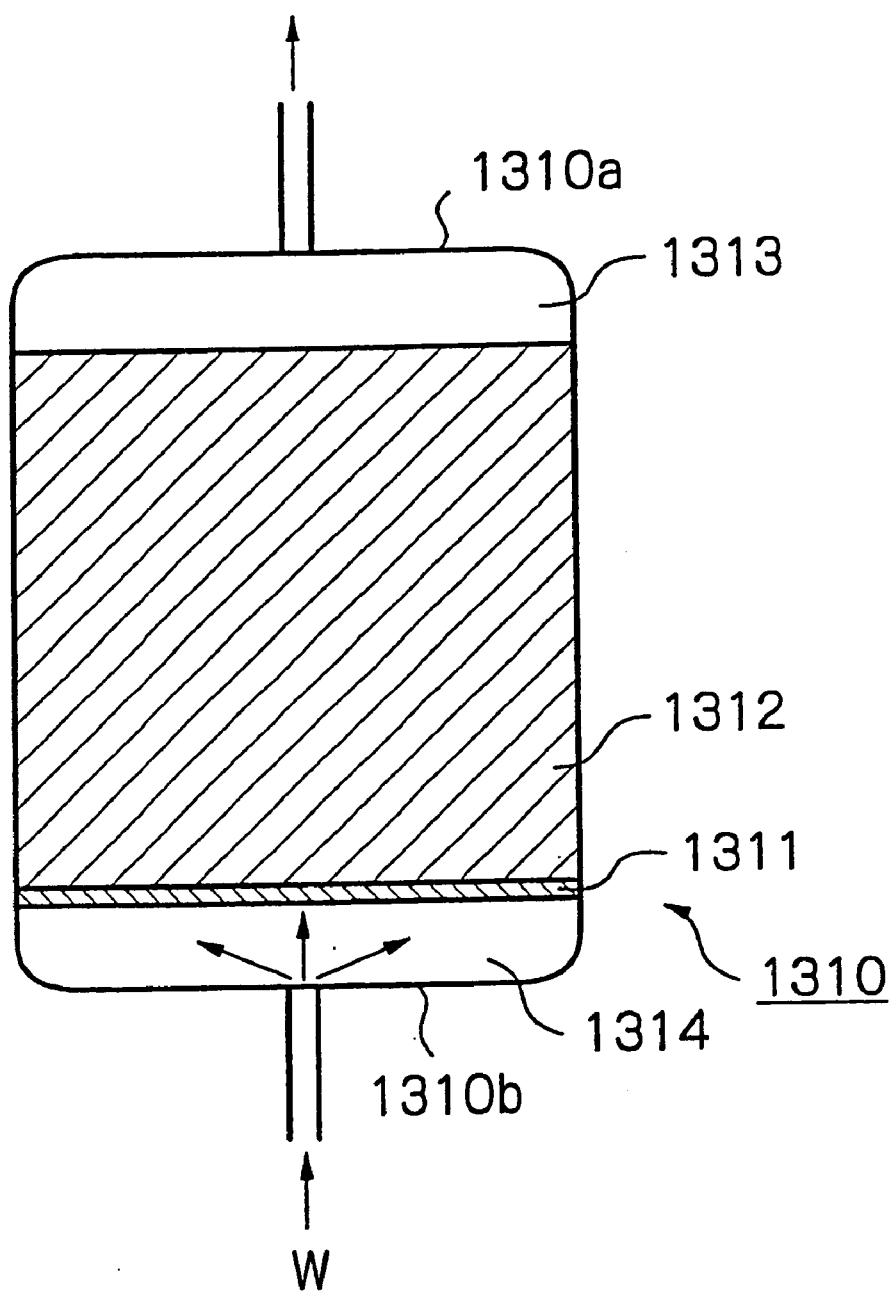
FIG. 19 is a sectional view showing the internal structure of an embodiment of a reduction tank when a solid reducing agent is used.

FIG. 18 is a schematic view showing a state in which a purification apparatus according to an embodiment of the present invention is installed. FIG. 19 is a sectional view of an embodiment of connection between a water supply line and a reducing agent tank in the embodiment of FIG. 18.

In FIG. 18, the soil has a vadose zone 1 above a groundwater table 4, and an aquifer 2 below the groundwater table 4. Below the aquifer 2, an aquitard 3 is located. Part of the aquifer 2 is a soil 2a contaminated with halogenated organic compounds, and groundwater contained in the soil 2a is similarly contaminated with the halogenated organic compounds.

A purification apparatus 1300 shown in FIG. 18 is equipped with a reducing agent tank 1310 holding a reducing agent having a standard electrode potential, relative to a standard hydrogen electrode at 25° C., of 300 mV to −2400 mV, a nutrient solution tank 1340 containing a nutrient source for heterotrophic anaerobic microorganisms, and a purification tank 1320 which has a water intake portion 1322 and a water discharge portion 1321, and in which at least the water intake portion 1322 is located at a site filled with flowable water in the contaminated object, namely, located in the aquifer 2 in the present embodiment. The purification apparatus 1300 is configured such that groundwater circulates between the aquifer 2 and the purification tank 1320. As the nutrient source, there can be used a nutrient source suitable for the properties of microorganisms present in the contaminated object to be purified.

The water intake portion 1322 is a strainer portion comprising many through-holes provided in a wall surface of a lower part of the purification tank 1320. The water discharge portion 1321 is a strainer portion comprising many through-holes provided in the wall surface of a nearly middle part of the purification tank 1320. The location of the water discharge portion 1321 is not restricted to the middle part of the purification tank 1320. The purification tank 1320 may be formed and installed such that when the water intake portion 1322 is located in the aquifer 2, the water discharge portion 1321 will be located in an upper region of the aquifer 2 or slightly above the aquifer 2. The open area ratio of the strainer portion is preferably 10 to 50%, particularly preferably 20 to 40%.

A lifting pump 1360 is installed above the water intake portion 1322 of the purification tank 1320 to suck groundwater from the aquifer 2 into the purification tank 1320 via the water intake portion 1322, and pump up the groundwater along the longitudinal direction of the purification tank 1320.

The reducing agent tank 1310 is provided above the lifting pump 1360. The reducing agent tank 1310, as shown in FIG. 19, includes a support floor 1311 provided in a lower part thereof, a solid reducing agent contact portion 1312 supported by the support floor 1311, a first gap portion 1313 above the solid reducing agent contact portion 1312, and a second gap portion 1314 below the solid reducing agent contact portion 1312. The solid reducing agent contact portion 1312 includes a support medium such as gravel, and a solid reducing agent carried on the support medium. The solid reducing agent is, for example, a powder measuring 500 $\mu$m or less. The support floor 1311 has many small holes of a size enough to allow passage of groundwater, but allow no passage of the solid reducing agent. The support floor is, for example, a plate-like member composed of stainless steel. The first gap portion 1313 and the second gap portion 1314 are of a sufficient size for groundwater to flow into the solid reducing agent contact portion 1312 constantly at a desired speed.

A line mixer 1370 is provided above the reducing agent tank 1310. The line mixer 1370 is provided for mixing groundwater, which has been reduced by passage through the reducing agent tank 1310, with the nutrient solution supplied from the nutrient solution tank 1340. As the line mixer 1370, a line mixer in customary use can be used without any restriction.

The nutrient solution tank 1340 is provided outwardly of the purification tank 1320 and on the ground surface, as shown in FIG. 18. The nutrient solution tank 1340 is provided with ordinary agitation means to agitate and prepare the aforementioned nutrient source, as desired. A nutrient solution supply line E1 for introducing the prepared nutrient solution into the purification tank 1320 is connected to the nutrient solution tank 1340. A pump 1330 for introducing the nutrient solution from the nutrient solution tank 1340 to the purification tank 1320 is provided on the nutrient solution supply line E1.

The purification tank 1320 is a well installed underground in the embodiment shown in FIG. 18. The purification tank 1320 has wire nettings wrapped round the strainer portions, and a packer (not shown) wound round the all surface of the conduit other than the strainer portions. The wire nettings are designed to prevent penetration of gravel or the like into the purification tank 1320. The packer absorbs water and swells when the purification tank 1320 is fixed underground. To install the purification tank 1320, i.e. well, vertically in the soil, the following procedure is performed: The soil is dug with a boring machine to form a deep hole. After completion of digging, the boring machine is pulled out of the hole. Then, the purification tank 1320 is inserted into the hole. Then, the packer (not shown) wound round the outer peripheral wall of the purification tank 1320 swells by absorbing moisture present between the purification tank 1320 and the soil wall. Further, silica sand or the like is put into the hole to fill up the gap around the purification tank 1320. Finally, cement is poured into an area close to the ground surface, and solidified there, completing the installation of the purification tank 1320.

The purification method for purifying groundwater and soil contaminated with halogenated organic compounds, by use of the purification apparatus 1300 of the present embodiment, includes a circulation step of circulating groundwater, and a step of adding a reducing agent and a nutrient solution for heterotrophic anaerobic microorganisms, the reducing agent being adapted to reduce the circulating groundwater and having a standard electrode potential, relative to a standard hydrogen electrode at 25° C., of 300 mV to −2400 mV.

In the circulation step, groundwater in the aquifer 2 is taken up into the purification tank 1320 by the lifting pump 1360 via the water intake portion 1322 in the lower part of the purification tank 1320, and discharged into the aquifer 2 via the water discharge portion 1321 in the middle part of the purification tank 1320. Then, the groundwater moves in the aquifer 2 from its upper region to its lower region by gravity.

Then, groundwater taken into the purification tank 1320 passes through the reducing agent tank 1310, when the reducing agent and the nutrient solution are added to the groundwater. In detail, the groundwater flows from below the reducing agent tank 1310 into the reducing agent tank 1310, passes through the second gap portion 1314 and the small holes of the support floor 1311, and reaches the reducing agent contact portion 1312, where the reducing agent is added to reduce the groundwater. The groundwater reduced in the reducing agent contact portion 1312 passes through the first gap portion 1313, and is then returned to the interior of the purification tank 1320. Then, in the line mixer 1370, the nutrient solution introduced from the nutrient solution supply line E1 to the interior of the purification tank 1320 is added to the reduced groundwater. The groundwater thus incorporating the reducing agent and the nutrient solution flows out of the water discharge portion 1321 into the aquifer 2 to clean the soil. The line mixer 1370 is not an essential element, and can be omitted.

Figure 20:
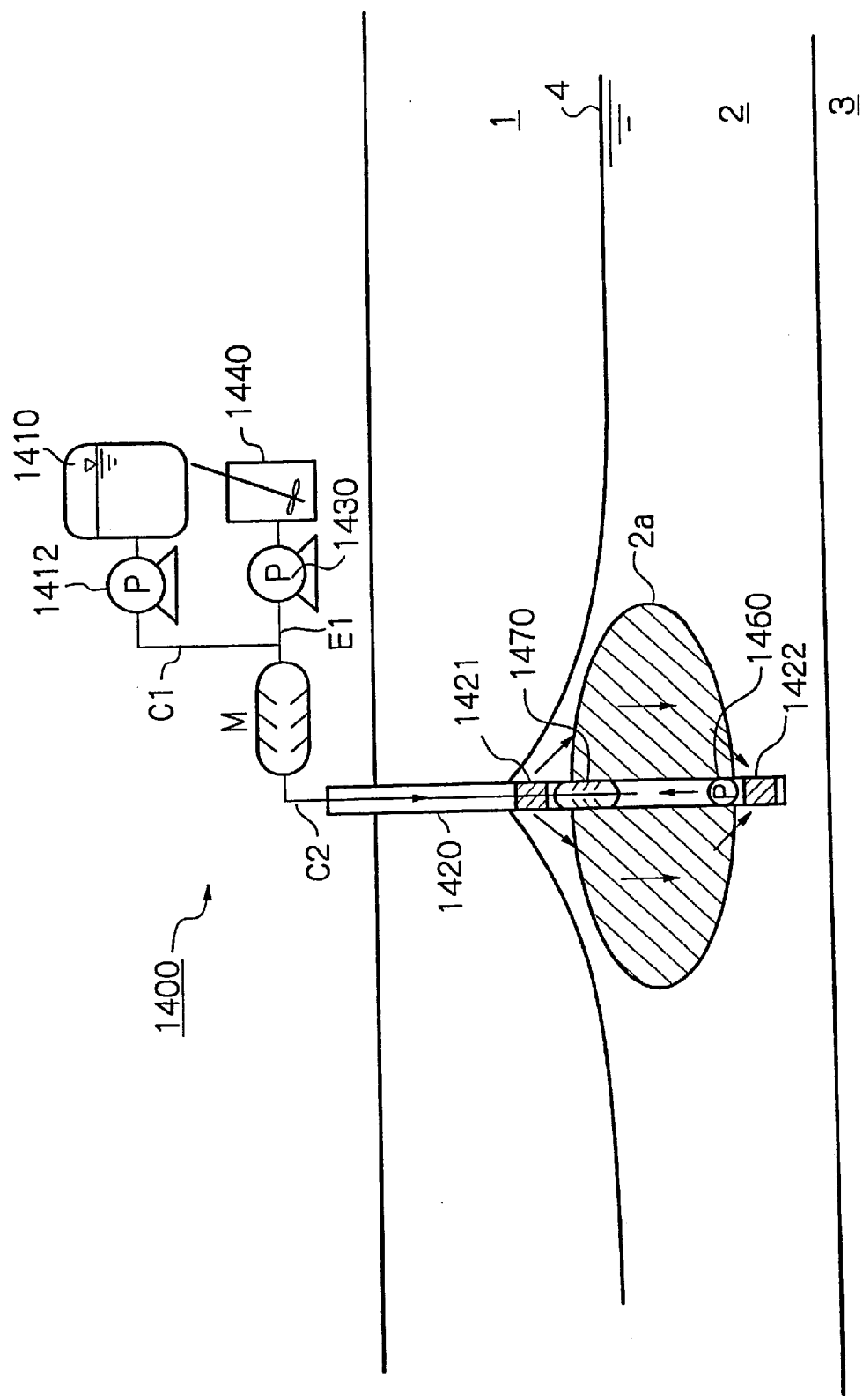
FIG. 20 is a schematic view showing a fifteenth embodiment of the present invention using a water soluble reducing agent.

Next, a fifteenth embodiment of the purification apparatus of the present invention is shown in FIG. 20. FIG. 20 is a schematic view showing a state of installation of the purification apparatus using a water soluble reducing agent as the reducing agent.

As the water soluble reducing agent, there can be preferably used an organic acid or its derivative, hypophosphorous acid or its derivative, or a salt of an organic acid or hypophosphorous acid with iron, titanium, zinc, manganese, aluminum or magnesium, or a sulfide salt. As the organic acid, a carboxylic acid, a sulfonic acid, a phenolic acid, or a derivative thereof can be used preferably. Preferably used examples of the carboxylic acid are monocarboxylic acids, dicarboxylic acids, tricarboxylic acids and tetracarboxylic acids having 1 to 20 carbon atoms and optionally substituted by hydroxyl groups. Concretely, acetic acid, citric acid and terephthalic acid are preferred, and aliphatic tricarboxylic acids having 2 to 10 carbon atoms, such as citric acid, are particularly preferred.

As previously shown in the Table 1, formic acid and oxalic acid do not have a standard electrode potential, relative to a standard hydrogen electrode at 25° C., of 300 mV to −2400 mV, and do not conform to the reducing agent of the present invention. However, derivatives of formic acid and oxalic acid, for example, their salts, may have a standard electrode potential, relative to a standard hydrogen electrode at 25° C., of 300 mV to −2400 mV, and can conform to the reducing agent of the present invention.

As the derivative of the phenolic acid, a polyhydroxyaryl can be used preferably. As the polyhydroxyaryl, 1,2,3-trihydroxybenzene and 1,4-dihydroxybenzene are preferred. As the derivatives of the organic acid, salts, esters, amides, and acid anhydrides are preferred. As the derivatives of hypophosphorous acid, salts and esters can be used preferably, and salts are particularly preferred.

A purification apparatus 1400 of the present embodiment is the same as the embodiment shown in FIG. 18, except that a water soluble reducing agent is used as the reducing agent, and a reducing agent tank 1410 is provided on the ground surface. The same elements as in FIG. 18 are assigned the same numerals in the 1400 range.

A reducing agent supply line C1 including a pump P is connected to a reducing agent tank 1410. A nutrient solution supply line E1 including a pump 1430 is connected to a nutrient solution tank 1440. In the present embodiment, a line mixer M for connecting the reducing agent supply line C1 and the nutrient solution supply line E1 is provided so that a reducing agent and a nutrient solution are mixed there. However, the line mixer M may be omitted.

A purification method for a contaminated object, which uses the purification apparatus 1400 of the present embodiment, is the same as the purification method for a contaminated object using the purification apparatus 1300, except that after the reducing agent and the nutrient solution are mixed in the ground surface portion, the resulting mixture is added to circulating water. That is, water introduced from an aquifer 2 into a purification tank 1420 via a water intake portion 1422 of the purification tank 1420 is pumped up by a lifting pump 1460 in the longitudinal direction of the purification tank 1420, and returned into the aquifer 2 via a water discharge portion 1421. At the ground surface portion, a water soluble reducing agent is supplied from the reducing agent tank 1410 to the line mixer M via the reducing agent supply line C1, while a nutrient solution is supplied from the nutrient solution tank 1440 to the line mixer M via the nutrient solution supply line E1. Thus, the reducing agent and the nutrient solution are mixed in the line mixer M. The mixed reducing agent and nutrient solution are introduced to a site below a line mixture 1470 inside the purification tank 1420 via a purifying solution supply line C2. There, the reducing agent and nutrient solution are added to groundwater which is circulating. The groundwater incorporating the reducing agent and nutrient solution is given a reducing power and a nutrient source, and returned into the aquifer 2 via the water discharge portion 1421. Thus, the contaminated object can be purified by a reduction reaction and a biodegradation reaction. The line mixer 1470, for example, is not an essential element and can be omitted.

Figure 21:
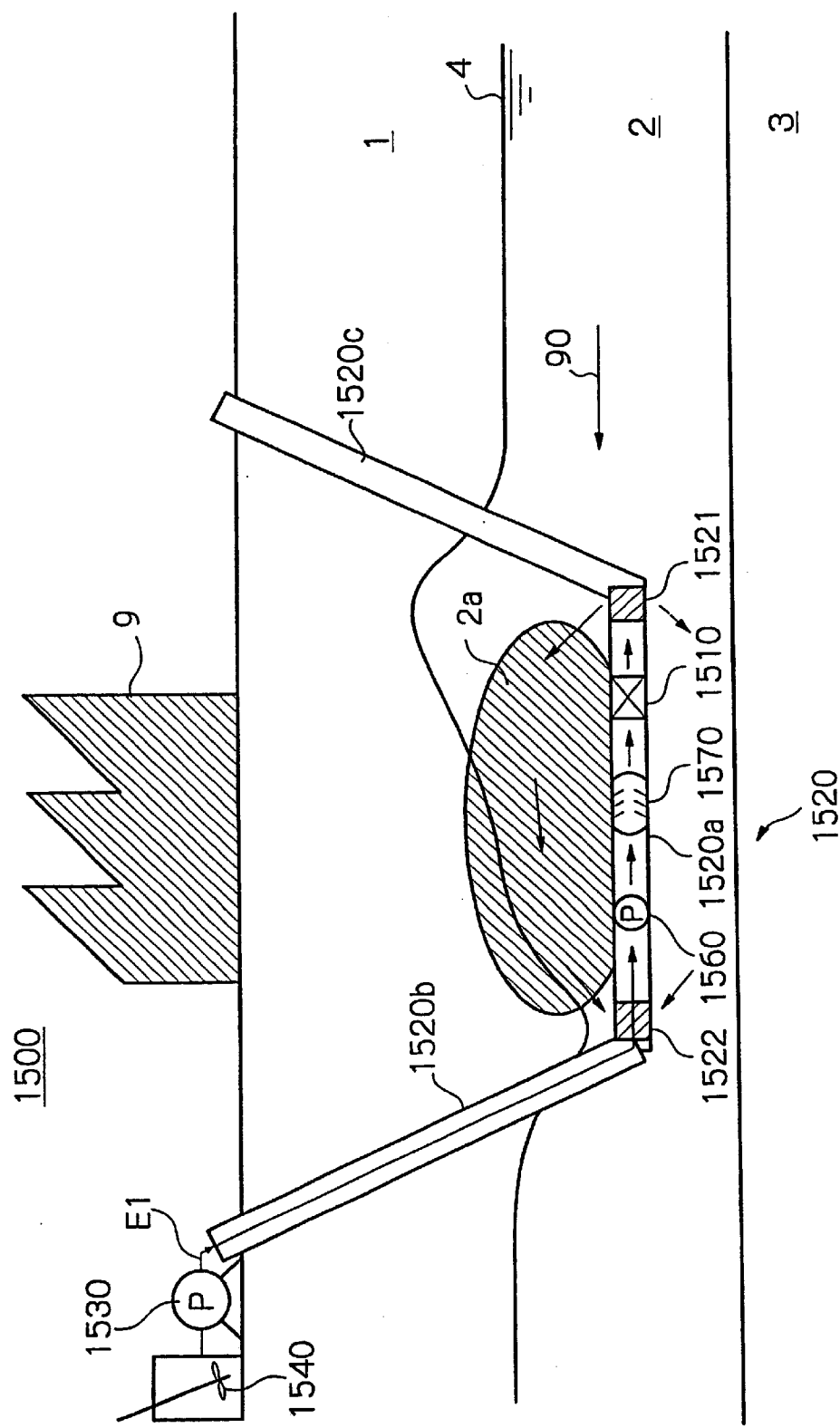
FIG. 21 is a schematic view showing a sixteenth embodiment of the present invention.

Next, a sixteenth embodiment of the present invention is schematically shown in FIG. 21. A purification apparatus 1500 of the present embodiment is effective when there is an obstacle, such as a plant, above contaminated soil and groundwater to be purified. The purification apparatus 1500 is the same as the embodiment shown in FIG. 18, except that a purification tank 1520 has a purification portion 1520*a* located horizontally in an aquifer 2, a first communication portion 1520*b* for guiding a nutrient solution supply line E1, and a second communication portion 1520*c*. The same elements are assigned the same numerals in the 1500 range for the purpose of illustration.

In the purification portion 1520*a* of the purification tank 1520, a strainer portion 1522 constituting a water intake portion is formed downstream with respect to groundwater, and a strainer portion 1521 constituting a water discharge portion is formed upstream with respect to groundwater. The purification portion 1520a of the purification tank 1520 includes a submerged pump 1560 at a site close to the water intake potion 1522, and a reducing agent tank 1510 at a site close to the water discharge potion 1521.

That is, the strainer portion 1522 for sucking in groundwater, pump 1560, line mixer 1570, reducing agent tank 1510 for reducing groundwater, and strainer portion 1521 for discharging the reduced groundwater are provided in this order inside the purification tank 1520. However, the reducing agent tank 1510 and the line mixer 1570 may be installed in the reverse order. If groundwater can sufficiently contact the reducing agent inside the reducing agent tank 1510, moreover, the line mixer 1570 can be omitted.

Supply of the nutrient solution is performed via the nutrient solution supply line E1 extending from a nutrient solution tank 1540 provided on the ground surface. In the illustrated embodiment, the nutrient solution supply line E1 is guided by the first communication portion 1520b of the purification tank 1520, but may be configured to be guided by the second communication portion 1520c. When the nutrient solution is supplied via the first communication portion 1520b, it is fed near the water intake portion 1522. Thus, the nutrient solution is directly added to the sucked-in groundwater, and then the reducing agent is added to the groundwater containing the nutrient solution. When the nutrient solution is supplied via the second communication portion 1520c, it is fed near the water discharge portion 1521. Thus, the nutrient solution is added after the reducing agent is added to the groundwater.

Purification of groundwater and soil by the purification apparatus 1500 of the present embodiment is performed by repeating a process which comprises sucking in groundwater via the water intake portion 1522, flowing it longitudinally of the purification tank 1520 by the pump 1560 as a reverse flow relative to the flow 90 of groundwater inside the aquifer 2, adding the nutrient solution, which has been supplied from the nutrient solution supply line E1, to the extracted groundwater, passing the mixture through the reducing agent tank 1510 to add the reducing agent, and returning the groundwater containing the nutrient solution and the reducing agent from the water discharge portion 1521 into the aquifer 2. That is, while groundwater is circulating in the purification apparatus 1500, the nutrient solution and the reducing agent in the reducing agent tank 1510 are repeatedly added. The groundwater thus reduced and given the nutrient solution is circulated, whereby the soil can be purified repeatedly.

When the water intake portion 1522 is installed at a relatively low-water level site, and the water discharge portion 1521 is installed at a relatively high water level site, the following advantage is produced: The circulation speed is increased under the own weight of the ions of the reducing agent contained in the groundwater flowing out of the water discharge portion 1521, in addition to the flow 90 of groundwater.

Figure 22:
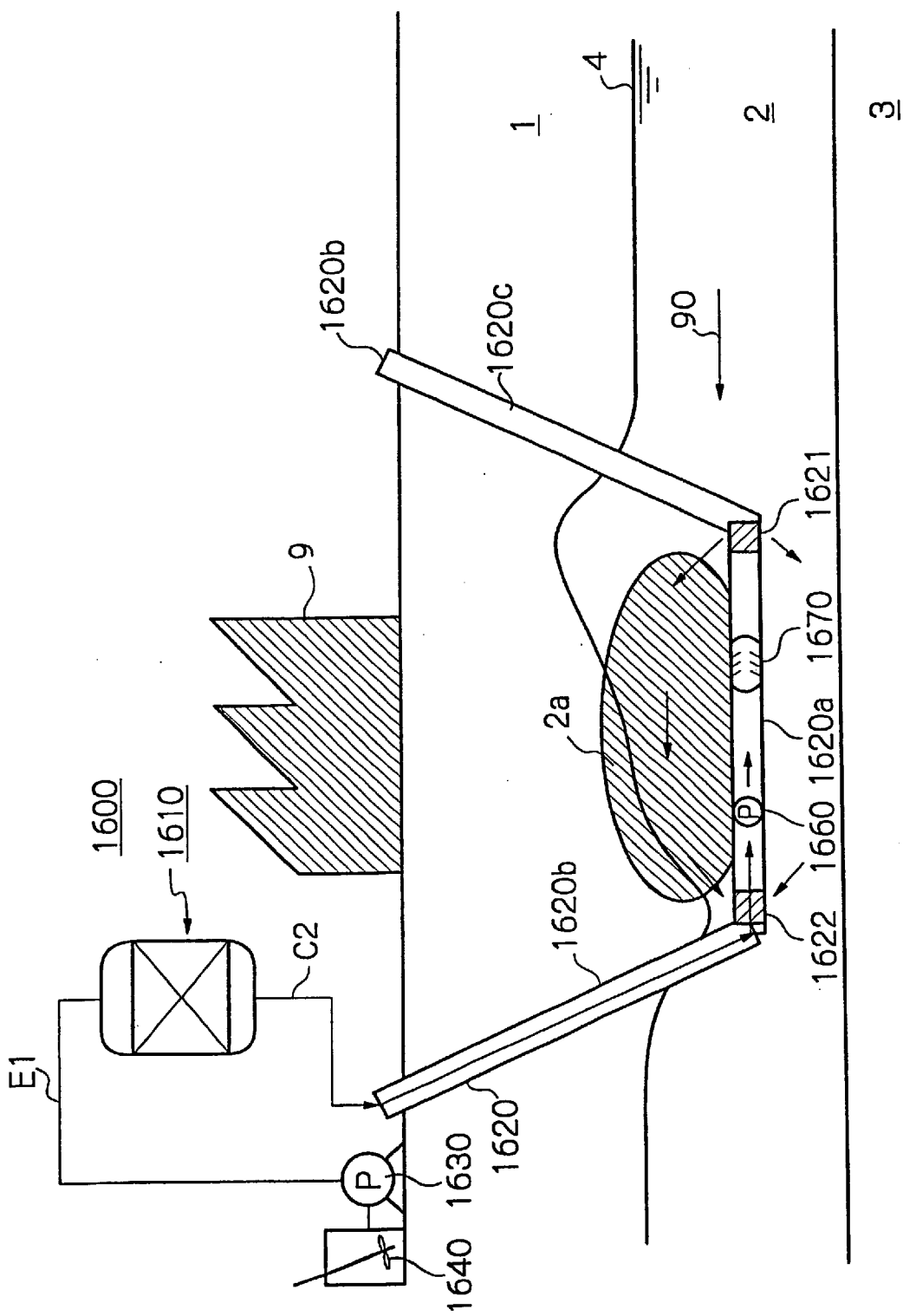
FIG. 22 is a schematic view showing a seventeenth embodiment of the present invention.

Further, a seventeenth embodiment of the present invention is schematically shown in FIG. 22. A purification apparatus 1600 of the present embodiment is the same as the sixteenth embodiment shown in FIG. 21, except that a reducing agent tank 1610 is provided at a ground surface portion. The same elements are assigned the same numerals in the 1600 range for the purpose of illustration.

In the illustrated embodiment, the reducing agent tank 1610 accepts a nutrient solution supply line E1 from a nutrient solution tank 1640 for holding a nutrient solution, and is connected to a purifying solution supply line C2 for introducing the nutrient solution and a reducing agent into a purification tank 1620. The purifying solution supply line C2 is provided along a first connection portion 1620b, and guides the nutrient solution and the reducing agent to a purification portion 1620a of the purification tank 1620.

Purification of the contaminated object by use of the purification apparatus 1600 of the present embodiment is performed in the same manner as the purification method in the aforementioned sixteenth embodiment, except that the nutrient solution and the reducing agent are added together to groundwater circulating between the purification portion 1620a and the aquifer 2.

In the embodiment of FIG. 22, the nutrient solution in the nutrient solution tank 1640 provided on the ground surface is introduced into the reducing agent tank 1610 by a pump 1630. However, this order may be reversed. That is, the nutrient solution or a nutrient source may be added to water which has been reduced by passing through the reducing agent tank. Such an embodiment is described, for example, in FIG. 29.

Figure 23:
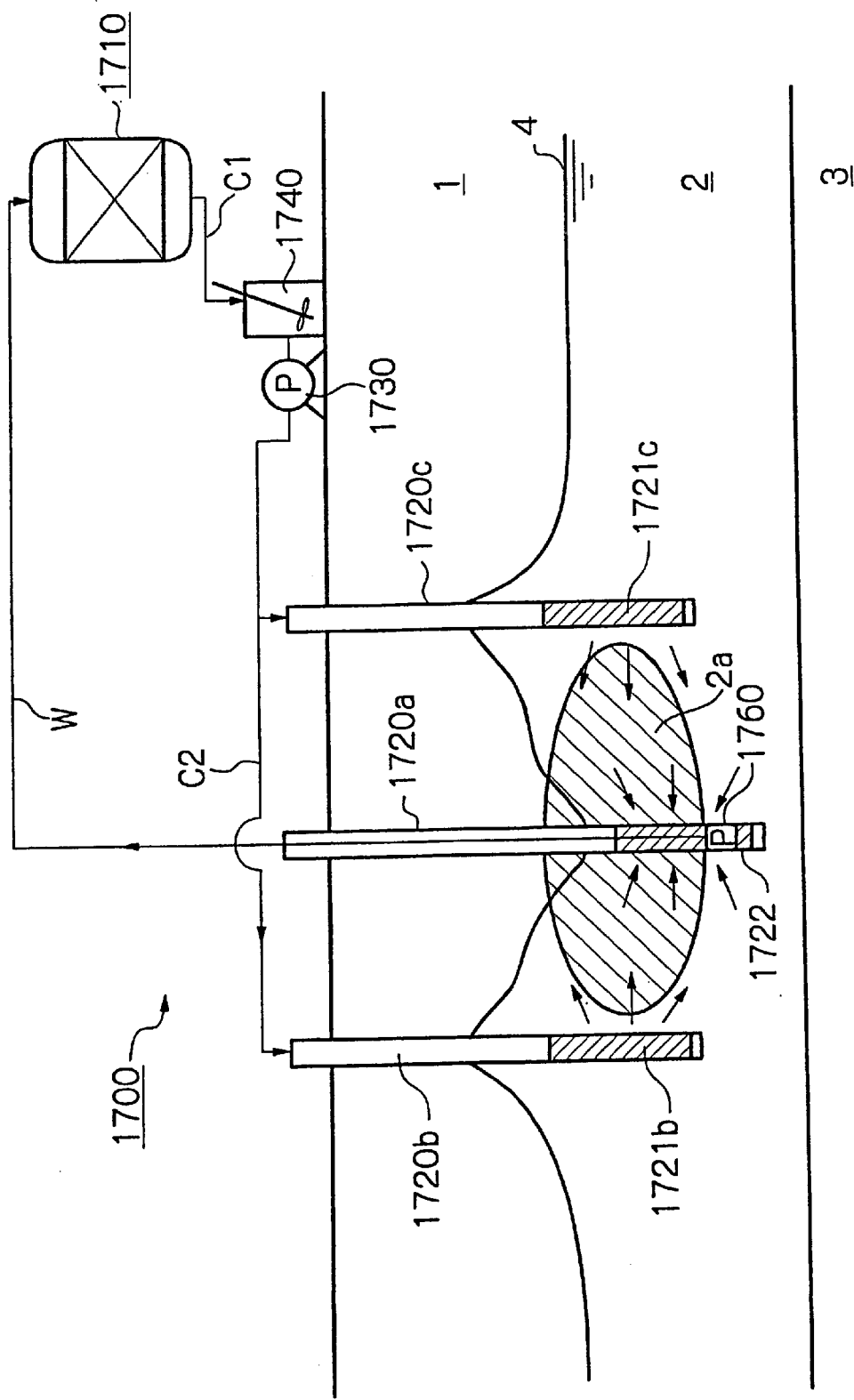
FIG. 23 is a schematic view showing an eighteenth embodiment of the present invention.

Next, an eighteenth embodiment of the present invention is schematically shown in FIG. 23. A purification apparatus 1700 of the present embodiment is equipped with a purification tank 1720 which has a pumping well 1720a having a strainer portion 1722 constituting a water intake portion and a submerged pump 1760, and a pair of injection wells 1720b and 1720c having water discharge portions, i.e., strainer portions 1721b and 1721c; a reducing agent tank 1710 and a nutrient solution tank 1740 provided in a ground surface portion; a groundwater supply line W for guiding groundwater sucked from the water intake portion 1722 to the reducing agent tank 1710; a reducing agent supply line C1 for introducing groundwater containing a reducing agent from the reducing agent tank 1710 to the nutrient solution tank 1740; and a purifying solution supply line C2 for introducing the reducing agent and the nutrient solution from the nutrient solution tank 1740 into the injection wells 1720b and 1720c of the purification tank 1720. The pair of injection wells 1720b and 1720c having the water discharge portions are located in a relatively high water level region of an aquifer 2, while the pumping well 1720a having the water intake portion is located in a relatively low water level region of the aquifer 2.

In the eighteenth embodiment, purification of the contaminated object is performed in the following manner:

Groundwater sucked via the water intake portion 1722 of the pumping well 1720a is pumped up by the pump 1760 to the reducing agent tank 1710 via the groundwater supply line W. The pumped-up groundwater incorporates the reducing agent in the reducing agent tank 1710 and simultaneously undergoes a reducing action, and is then introduced into the nutrient solution tank 1740 via the reducing agent supply line C1 to incorporate the nutrient solution. Then, the groundwater is returned into the aquifer 2 through the water discharge portions 1721b and 1721c of the injection wells 1720b and 1720c of the purification tank 1720 via the purifying solution supply line C2. The nutrient solution arrives at a contaminated site 2a around the pumping well 1720a according to the water level gradient of the aquifer 2.

The contaminated site 2a is also purified by physical cleaning with the purifying solution. Moreover, the purifying solution has a reducing action, so that halogenated compounds in the contaminated object 2a are also degraded by a reduction reaction, i.e., a chemical reaction.

Furthermore, the purifying solution contains the nutrient solution. Thus, microorganisms which degrade halogenated compounds grow, degrading the halogenated compounds microbiologically.

In a place where the layer thickness of the aquifer 2 and the layer thickness of the vadose zone 1 are relatively large, the eighteenth embodiment can produce a particularly great water level gradient. Thus, the speed of circulation increases, and the purification efficiency increases. Moreover, the contaminated groundwater circulates between the pumping well 1720a and the injection wells 1720b, 1720c, thus preventing spread of the contaminated object. Furthermore, the locations of installation of the injection wells 1720b, 1720c and pumping well 1720a can be changed according to the size of the contaminated site.

Figure 24:
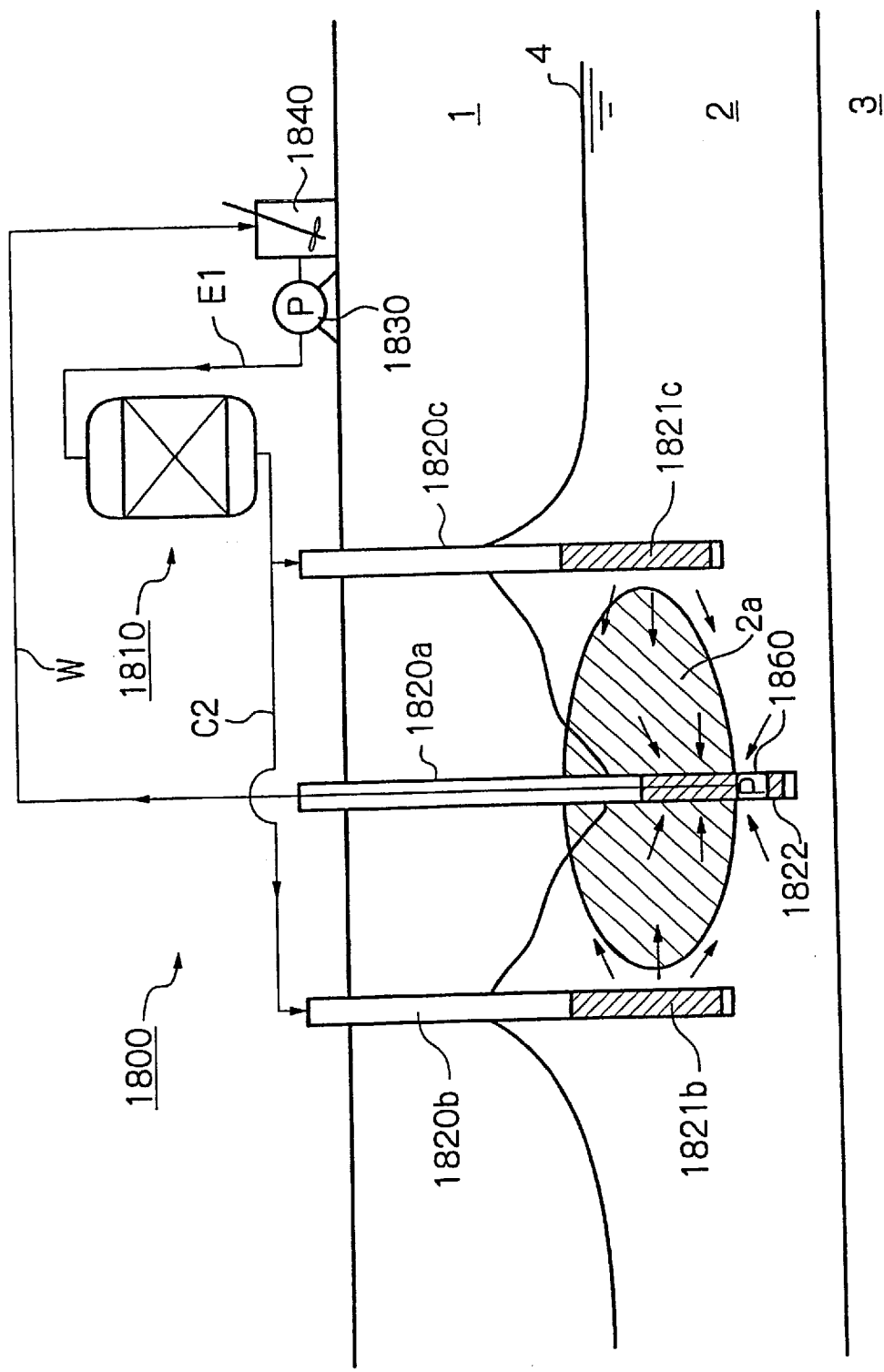
FIG. 24 is a schematic view showing a nineteenth embodiment of the present invention.

FIG. 24 shows a nineteenth embodiment of the present invention. A purification apparatus 1800 in the present embodiment is the same as the eighteenth embodiment shown in FIG. 23, except that the order of arrangement of a reducing agent tank 1810 and a nutrient solution tank 1840 is reversed. In the eighteenth and nineteenth embodiments, a reducing agent and a nutrient solution are circulated along with groundwater. In such a case, as circulation proceeds, the importance of order concerning which of the reducing agent and the nutrient solution should be added first is decreased.

The same elements will be assigned the same numerals in the 1800 range for purpose of illustration. Hereinbelow, an explanation for a configuration different from that in FIG. 23 will be offered, and the description of the same constitution will be omitted.

Groundwater sucked via a water intake portion 1822 of a pumping well 1820a is introduced by a pump 1860 to the nutrient solution tank 1840 via a groundwater supply line W to incorporate a nutrient solution. Then, the groundwater is introduced into the reducing agent tank 1810 via a nutrient solution supply line E1 to incorporate a reducing agent in the reducing agent tank 1810 and simultaneously undergo a reducing action. Then, the reduced groundwater is returned into the aquifer 2 through water discharge portions 1821b and 1821c of injection wells 1820b and 1820c of a purification tank 1820 via a purifying solution supply line C2.

In the eighteenth and nineteenth embodiments shown in FIGS. 23 and 24, the use of a solid reducing agent is shown. When a water soluble reducing agent is used, a reducing agent tank and a line mixer M as illustrated in FIG. 20 may be used in place of the reducing agent tanks 1710 and 1810.

In the embodiments shown in FIGS. 23 and 24, the pair of injection wells are used. However, the number of the injection wells is not limited, and there may be one, two or more, for example, three or more of the injection wells. Similarly, the number of the pumping wells is not limited, and there may be one, two or more, for example, three or more of the pumping wells. For example, two or more of the pumping wells and one or more of the injection wells may be used. Alternatively, one pumping well and one or more injection wells may be used.

Nor is the positional relationship between the pumping well and the injection well restricted. As shown in FIGS. 23 and 24, the pumping well may be disposed between two or more of the injection wells. Conversely, the injection well may be disposed between two or more of the pumping wells.

Furthermore, three or more of the injection wells may be arranged so as to surround one or more of the pumping wells. Conversely, three or more of the pumping wells may be arranged so as to surround one or more of the injection wells. Here, the description "three or more" is given, because it is difficult to say that "two" wells surround the equivalent wells.

Figure 25:
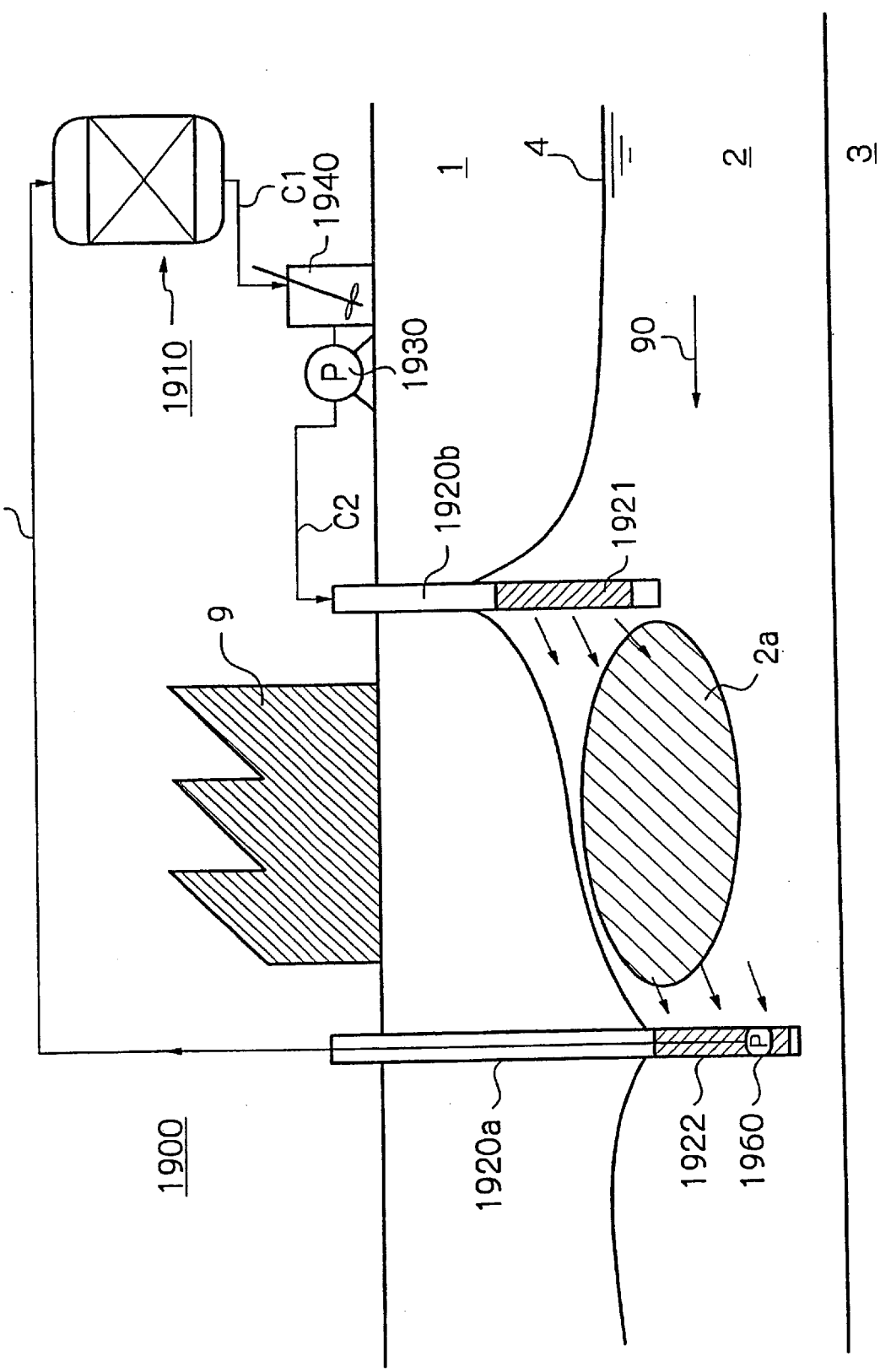
FIG. 25 is a schematic view showing a twentieth embodiment of the present invention.
Figure 26:
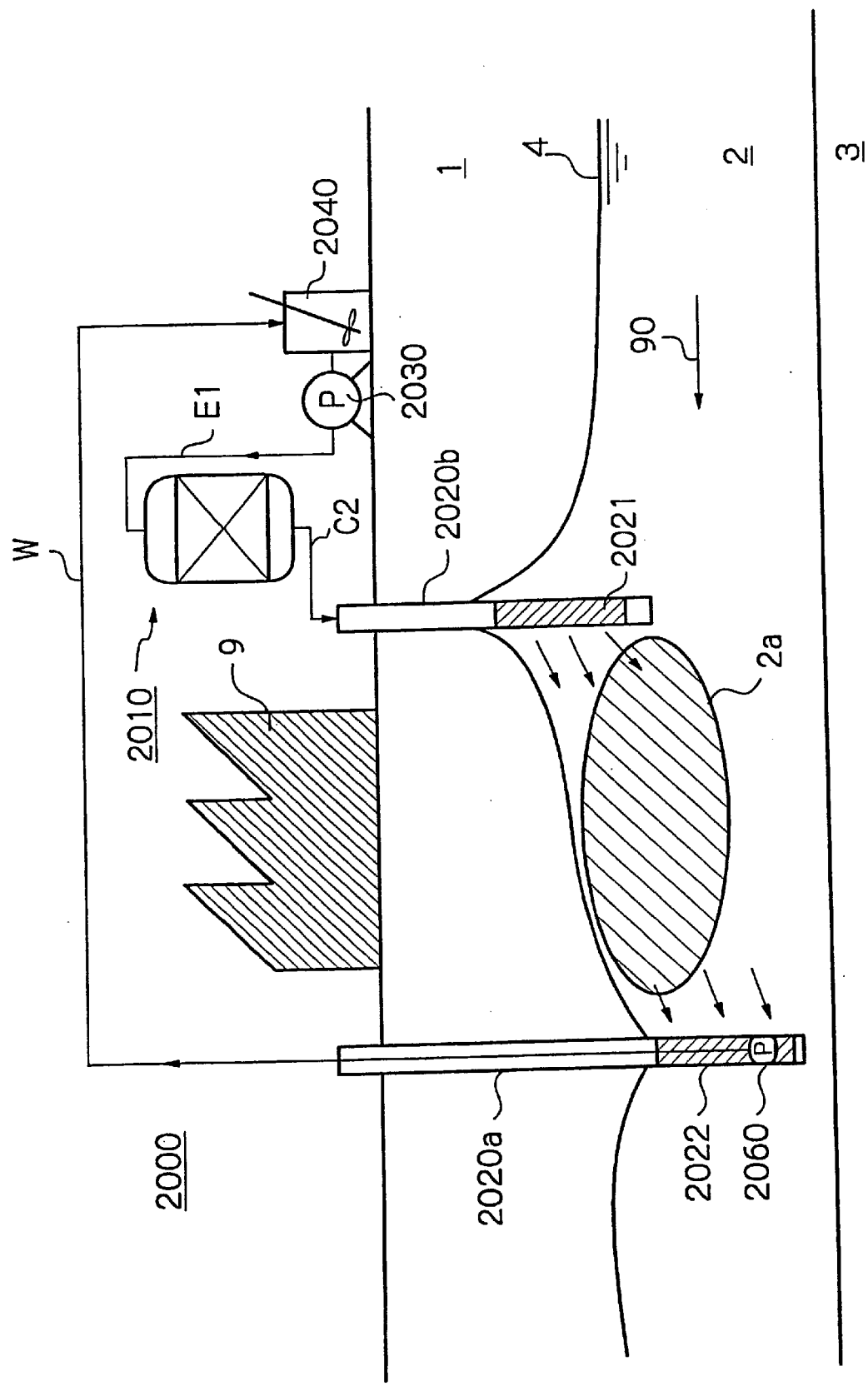
FIG. 26 is a schematic view showing a twenty-first embodiment of the present invention.

FIGS. 25 and 26 show a twentieth embodiment and a twenty-first embodiment, respectively. In each case, groundwater is circulated using one injection well and one pumping well. The same elements are indicated by the equivalent numerals in the 1900 range and the 2000 range, respectively, and explanations are omitted, where necessary. Purification apparatuses 1900 and 2000 shown in FIGS. 25 and 26 are effective particularly when there is an obstacle, such as a plant, on the soil containing a contaminated object to be purified.

In FIG. 25, ground water sucked via a water intake portion 1922 of a pumping well 1920a is introduced by a pump 1960 to a reducing agent tank 1910 via a groundwater supply line W. The groundwater undergoes a reducing action by a reducing agent in the reducing agent tank 1910, and is then introduced into a nutrient solution tank 1940 via a line C1 to incorporate a nutrient solution. The groundwater having the nutrient solution added is returned into an aquifer 2 by a pump 1930 through a water discharge portion 1921 of an injection well 1920 via a purifying solution supply line C2. In the aquifer 2, the purifying solution arrives at a contaminated site 2a along the flow 90 of groundwater.

The contaminated site 2a is also purified by physical cleaning with the purifying solution. Moreover, the purifying solution has a reducing action, so that halogenated compounds in the contaminated object 2a are also degraded by a reduction reaction, i.e., a chemical reaction. Furthermore, the purifying solution contains the nutrient solution. Thus, microorganisms which degrade halogenated compounds grow, degrading the halogenated compounds microbiologically.

The twenty-first embodiment of the present invention shown in FIG. 26 is the same as the twentieth embodiment shown in FIG. 25, except that the order of arrangement of a reducing agent tank 2010 and a nutrient solution tank 2040 is reversed. In the twentieth and twenty-first embodiments, a reducing agent and a nutrient solution are circulated along with groundwater. In such a case, as circulation proceeds, the importance of order concerning which of the reducing agent and the nutrient solution should be added first is decreased.

Figure 27:
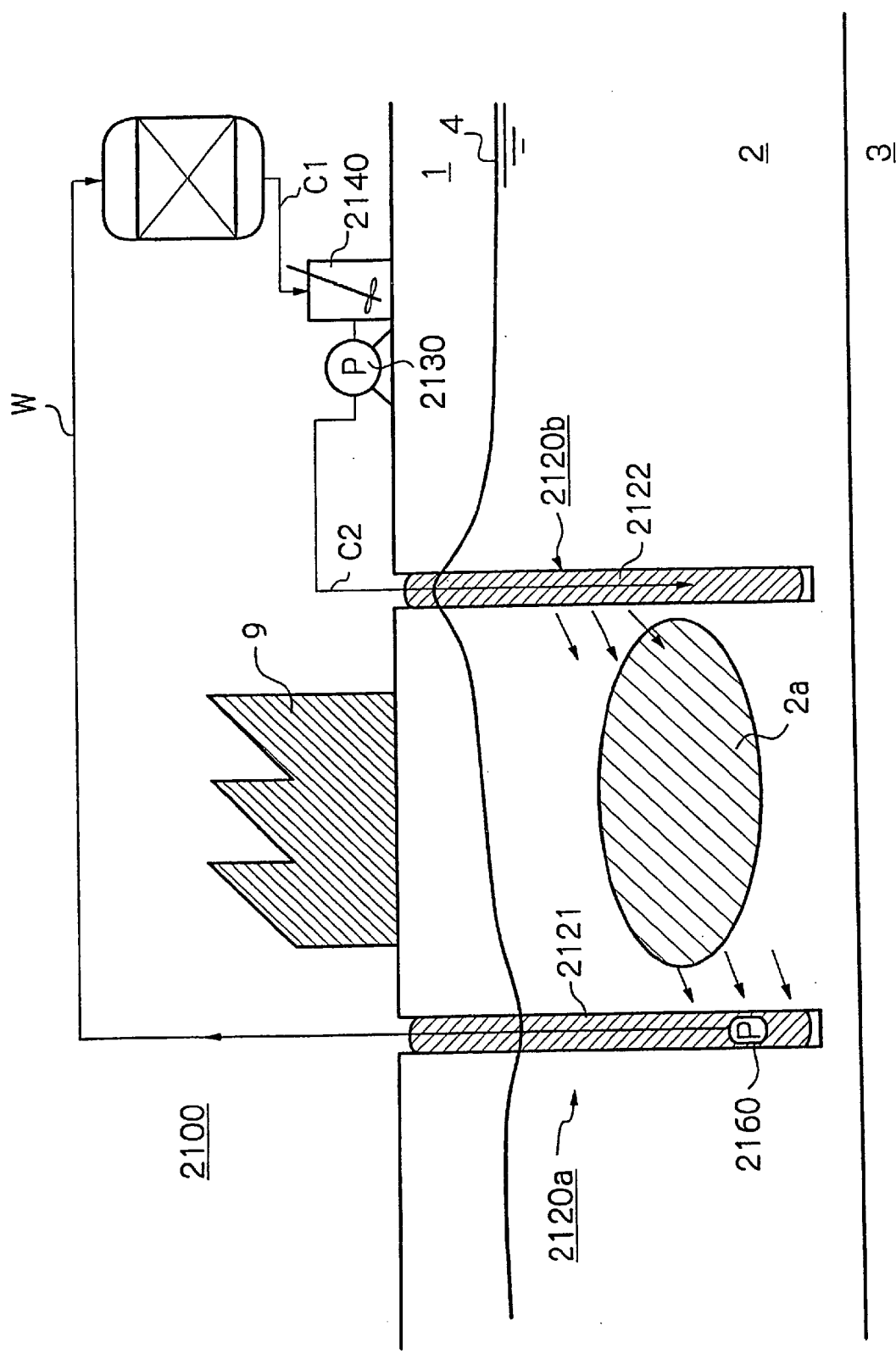
FIG. 27 is a schematic view showing a twenty-second embodiment of the present invention.
Figure 28:
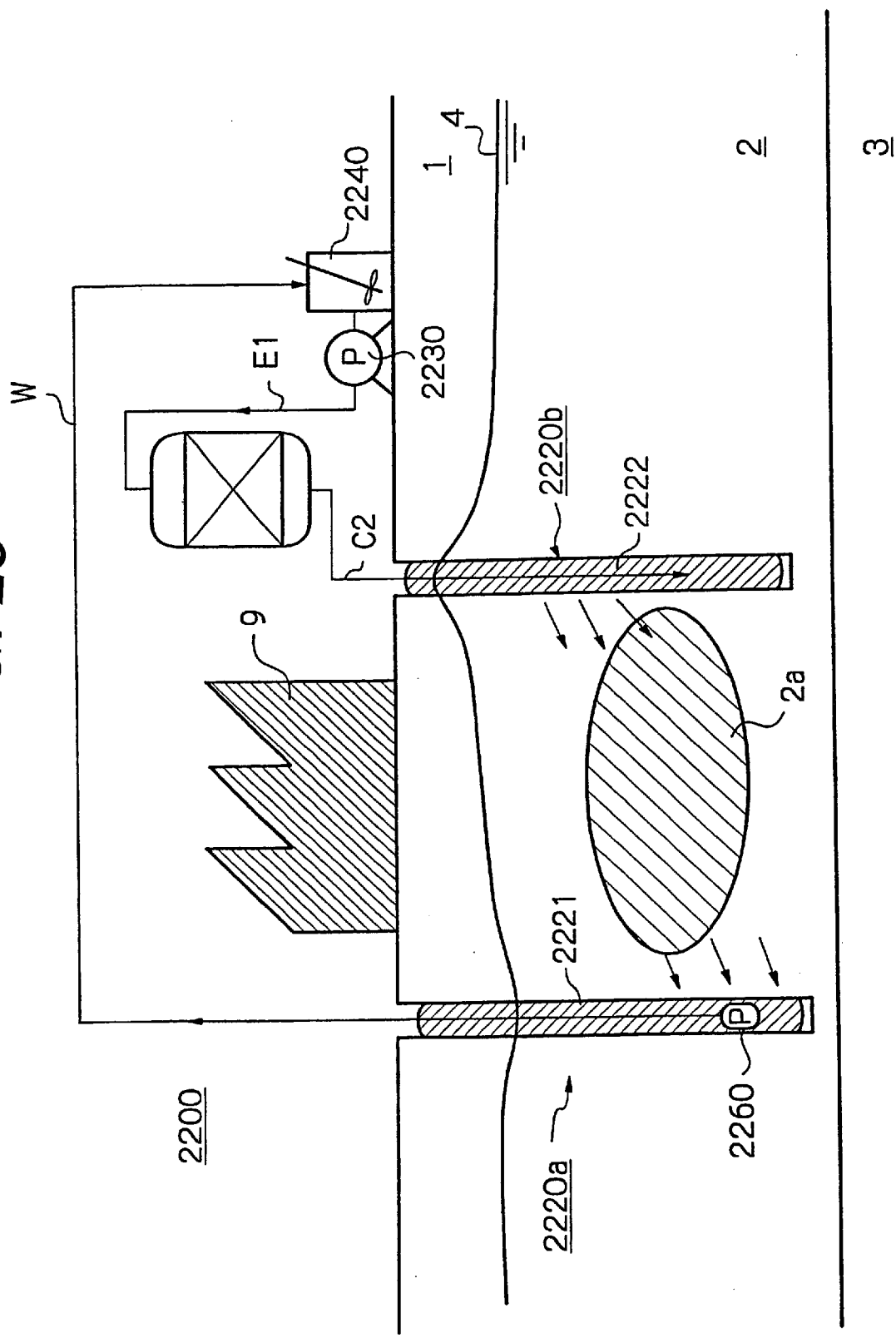
FIG. 28 is a schematic view showing a twenty-third embodiment of the present invention.

Next, twenty-second and twenty-third embodiments using a pair of underground walls instead of a pair of wells are shown in FIGS. 27 and 28. The purification apparatuses of these embodiments are the same as the embodiments shown in FIGS. 25 and 26, except that the underground walls are used. The same elements are indicated by the equivalent numerals in the 2100 and 2200 ranges, respectively, and explanations for the same constituent elements are omitted. The underground wall refers to something like a well extending laterally to form a wall underground. The underground wall comprises an open end portion, a deep groove dug in the ground, and a bottom portion. Inside the deep groove, an element with high permeability to air and liquid, typically such as sand or gravel, is buried to prevent collapse of the groove. The deep groove of the underground wall forms a side wall of the underground wall, and is formed with a deposition of the element having excellent air and liquid permeability. Thus, the entire wall surface exhibits the same function as that of a strainer portion.

In a purification apparatus 2100, one of underground walls, 2120a, acts as a water intake portion, and the other underground wall 2120b acts as a water discharge portion.

The entire wall surface of the underground wall exhibits the same function as that of a strainer portion as stated above. Thus, groundwater can be taken in from any part of the wall surface, and a nutrient solution and a reducing agent can be added in large amounts. The use of the underground wall brings the advantage that when a great water level gradient cannot be formed because of the high water level of the groundwater of the aquifer 2 or the small thickness of the aquifer, the reducing agent and the nutrient solution can be diffused in a horizontally broad range.

A contaminated site 2a is also purified by physical cleaning with the purifying solution. Moreover, the purifying solution has a reducing action, so that halogenated compounds in the contaminated object 2a are also degraded by a reduction reaction, i.e., a chemical reaction. Furthermore, the purifying solution contains the nutrient solution. Thus, microorganisms which degrade halogenated compounds grow, degrading the halogenated compounds microbiologically.

Figure 29:
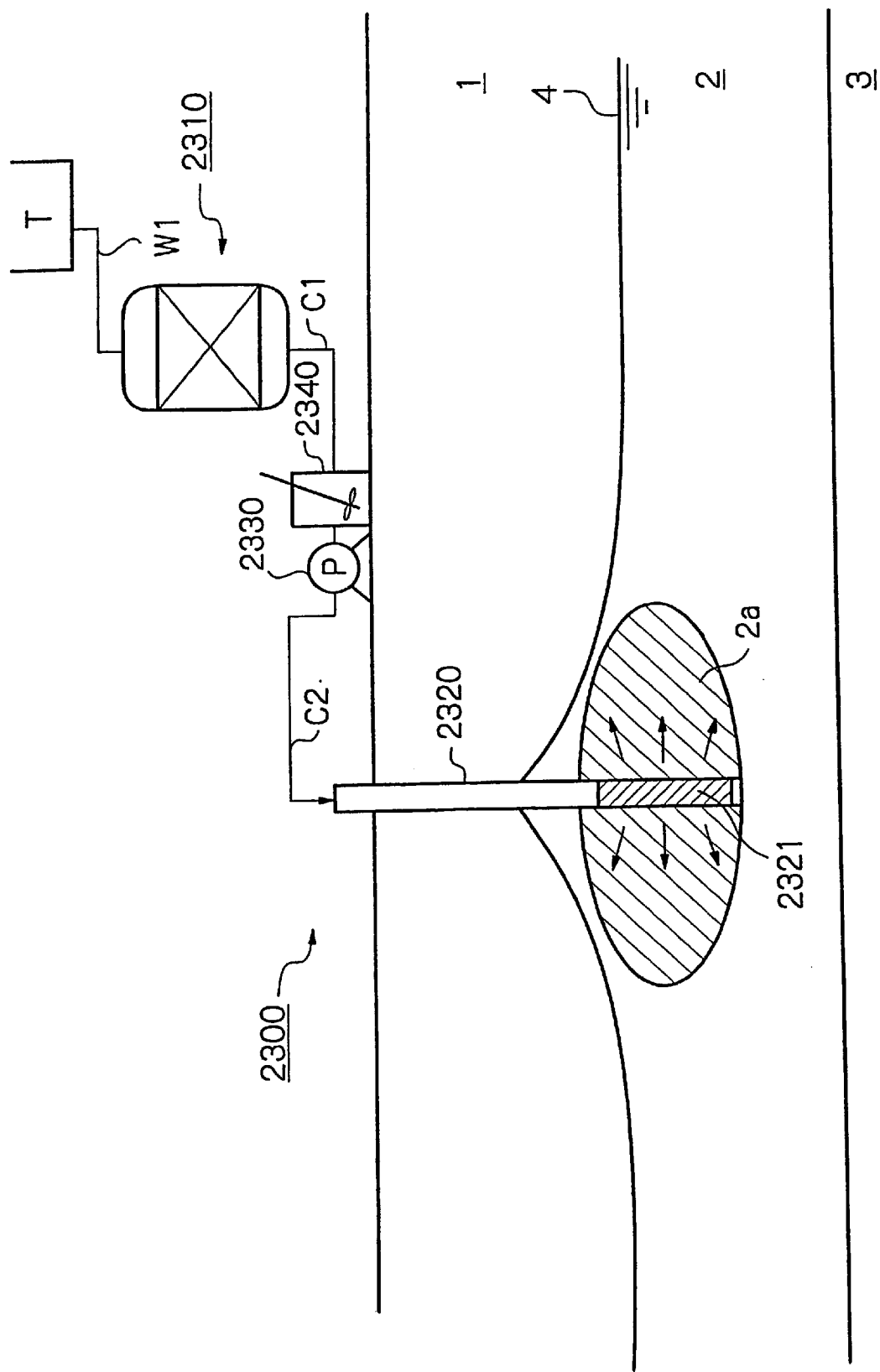
FIG. 29 is a schematic view showing a twenty-fourth embodiment of the present invention.
Figure 30:
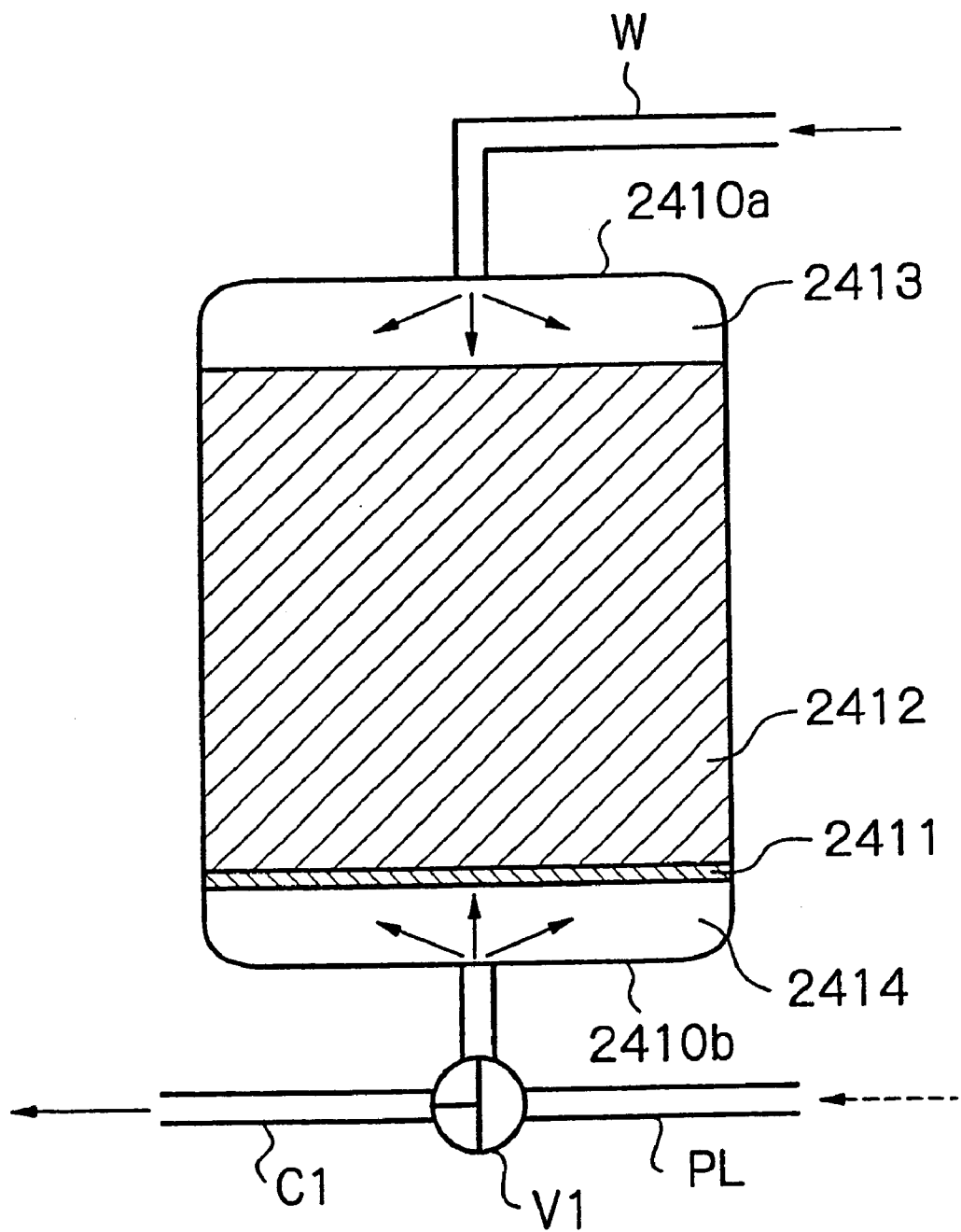
FIG. 30 is a sectional view showing the internal structure of an embodiment of a reduction tank when a solid reducing agent is used.

Next, another embodiment of the present invention is shown in FIGS. 29 and 30. The embodiment shown in FIGS. 29 and 30 is not of the circulation type involving the circulation of groundwater, but is designed to add a reducing agent and a nutrient to an aquifer 2.

A purification apparatus 2300 shown in FIG. 29 has a reducing agent tank 2310, a nutrient solution tank 2340 for preparing a nutrient solution according to the properties of microorganisms in a contaminated object to be purified, and a purification tank 2320. A water supply line W1 for supplying water from a water tank T, and a reducing agent supply line C1 for supplying the nutrient solution tank 2340 with water containing a reducing agent are connected to the reducing agent tank 2310. A nutrient solution supply line E1 for supplying a reduced nutrient solution to the purification tank 2320 is connected to the nutrient solution tank 2340. In a lower part of the purification tank 2320, a strainer portion 2321 is provided for allowing the supplied reducing agent and nutrient solution to permeate the contaminated object. The purification tank 2320 is installed underground so that the strainer portion 2321 will be located in the underground aquifer 2.

For the reducing agent tank 2310, the water supply line W1 may be connected to a top portion 2310a of the reducing agent tank 2310 as shown in FIG. 30, or the water supply line W1 may be connected to a bottom portion 1310b of the reducing agent tank 1310 as shown in FIG. 19.

A reducing agent tank 2410 shown in FIG. 30 includes a support floor 2411 provided in a lower part thereof, a solid reducing agent contact portion 2412 supported by the support floor 2411, a first gap portion 2413 above the solid reducing agent contact portion 2412, and a second gap portion 2414 below the solid reducing agent contact portion 2412. The solid reducing agent contact portion 2412 includes a support medium such as gravel, and the solid reducing agent carried on the medium. The solid reducing agent is, for example, a powder measuring 500 $\mu$m or less. The support floor 2411 has many small holes of a size enough to allow passage of water, but allow no passage of the solid reducing agent. The support floor is, for example, a plate-like member composed of stainless steel. The first gap portion 2413 and the second gap portion 2414 are of a sufficient size for water fed from the water supply line W1 to flow into the solid reducing agent contact portion 2412 constantly at a desired speed.

When the water supply line W1 is connected to the top portion 2410a of the reducing agent tank 2410, as shown in FIGS. 29 and 30, water fed to the top portion 2410a of the reducing agent tank 2410 flows through the solid reducing agent contact portion 2412 by its own weight, and is reduced thereby. When the water supply line W is connected to the bottom portion 1310b of the reducing agent tank 1310, as shown in FIG. 19, water needs to be forcibly sucked by a pump or the like provided on the reducing agent supply line C1 connected to the top portion 1310a of the reducing agent tank 1310.

It is also possible to provide a three-valve valve V1 in the reducing agent supply line C1 and connect a backwash water flow line PL via the three-way valve V1, as shown in FIG. 30. In this case, cleaning water is passed through the interior of the reducing agent tank 2410 from below to above via the backwash water flow line PL, whereby the solid reducing agent contact portion 2412 can be backwashed. As a result, clogging of the solid reducing agent contact portion 2412 and the pores of the support floor 2411 can be prevented.

A purification method for a contaminated object, such as groundwater or soil, contaminated with halogenated organic compounds, the purification method using the purification apparatus 2400 of the present embodiment, includes a water reduction step in which a reducing agent having a standard electrode potential, relative to a standard hydrogen electrode at 25° C., of 300 mV to −2400 mV reduces water; a nutrient solution reduction step of adding water reduced in the reduction step to a nutrient solution containing a nutrient source for heterotrophic anaerobic microorganisms to reduce the nutrient solution; and a step of adding the nutrient solution reduced in the nutrient solution reduction step to the contaminated object. The water reduction step is performed inside the reducing agent tank 2410, while the nutrient solution reduction step is performed inside the nutrient solution tank 2340. The amount of water added to the reducing agent tank 2410 is not restricted, and can be set arbitrarily in such a range as to avoid the situation that the groundwater level near the well rises to reach the surface of the earth.

In detail, water is supplied from the water tank T to the reducing agent tank 2410 via the water supply line W1. The supplied water contacts the reducing agent while passing through the reducing agent tank 2410, and is reduced thereby, or dissolves the reducing agent and incorporates it. The thus reduced water is supplied to the nutrient solution tank 2340 via the reducing agent supply line C1. Then, the reduced water and water containing the reducing agent contacts the nutrient solution in the nutrient solution tank 2340 to reduce the nutrient solution. The reduced nutrient solution is supplied into the purification tank 2320 by an injection pump 2330 via a purifying solution supply line C2. The reduced nutrient solution permeates the contaminated object via the strainer portion 2321 formed in the lower part of the purification tank 2320. As a result, the reduced nutrient solution reacts with the halogenated organic substances contained in the contaminated object to dehalogenate them, and simultaneously enhances the activity of the heterotrophic anaerobic microorganisms present in the contaminated object to promote a biodegradation reaction by the microorganisms, thereby purifying the contaminated object.

Figure 31:
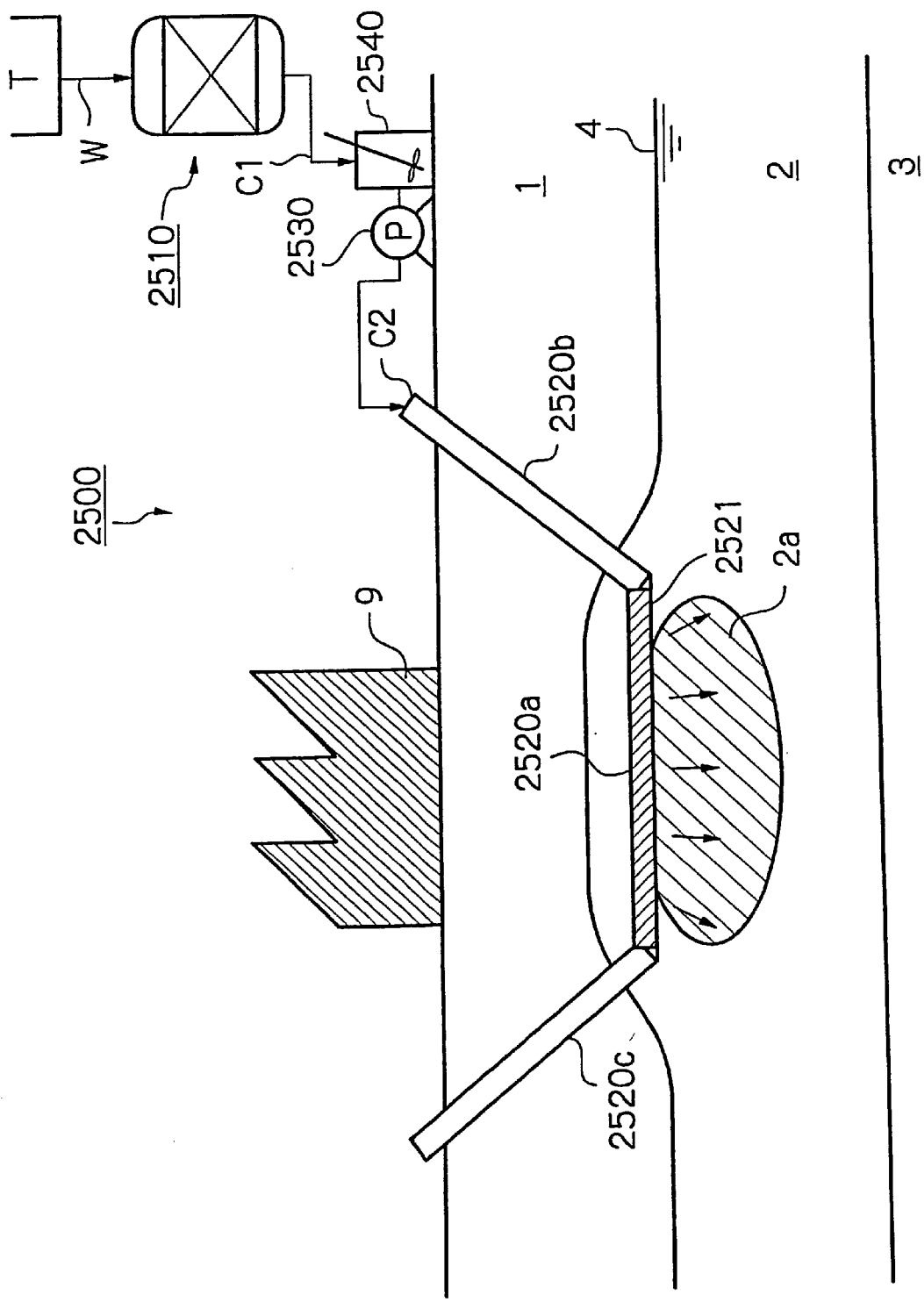
FIG. 31 is a schematic view showing a twenty-fifth embodiment of the present invention.

Next, still another embodiment of the present invention is schematically shown in FIG. 31. The embodiment shown in FIG. 31 is in the same configuration as the embodiment shown in FIG. 29, except that the purification tank is laid horizontally in the aquifer 2. The same elements are indicated by the equivalent numerals in the 2500 range.

In a purification apparatus 2500 of the present embodiment, a purification tank 2520 has a pair of inclined portions, 2520*b* and 2520*c*, and a purification portion 2520*a* having a strainer portion 2521 lying horizontally in the aquifer 2. The first inclined portion 2520*b* accepts a reduced nutrient solution via a purifying solution supply line C2. The strainer portion 2521 is located horizontally in the aquifer 2, and allows the reduced nutrient solution to pass into the aquifer 2. The second inclined portion 2520*d* has a closed end protruding from the ground surface.

In FIG. 31, the strainer portion 2521 extends horizontally, but the strainer portion may be inclined. Depending on the method of formation, the second inclined portion 2520*c* can be omitted.

A purification method for the contaminated object, which uses the purification apparatus 2500 of the present embodiment, is the same as the embodiment shown in FIG. 29, except that the reduced nutrient solution flows out vertically from the strainer portion 2521. The purification apparatus 2500 and purification method of the present embodiment are effective when there is a building, such as a plant, on the ground surface directly above groundwater or soil including a contaminated object to be purified.

Even in the embodiments shown in FIGS. 29 and 31, not only a solid reducing agent, but also a water soluble reducing agent can be used as the reducing agent.

According to a purification apparatus and a purification method as other aspects of the present invention, a contaminated object containing halogenated organic compounds can be purified efficiently and easily. Particularly, water is reduced while being circulated between a site filled with flowable water in the contaminated object and the purification apparatus; for example, in the above-described embodiment, groundwater being circulated between the aquifer 2 and the purification apparatus. By this measure, water dehalogenated and given a reducing power can be returned into the contaminated object, without a rapid change in the quality of water, whereby the halogen ion concentration in the contaminated object can be decreased gradually, and the contaminated object containing halogenated organic compounds can be purified satisfactorily. Also, by giving the nutrient solution in a reduced state, the activity of heterotrophic microorganisms can be enhanced. Consequently, the contaminated object containing halogenated organic compounds can be purified satisfactorily by a combination of a chemical reaction and a biodegradation reaction.

Furthermore, according to a purification apparatus and a purification method as other aspects of the present invention, a contaminated object containing halogenated organic compounds can be purified easily and continuously in situ.

Figure 32:
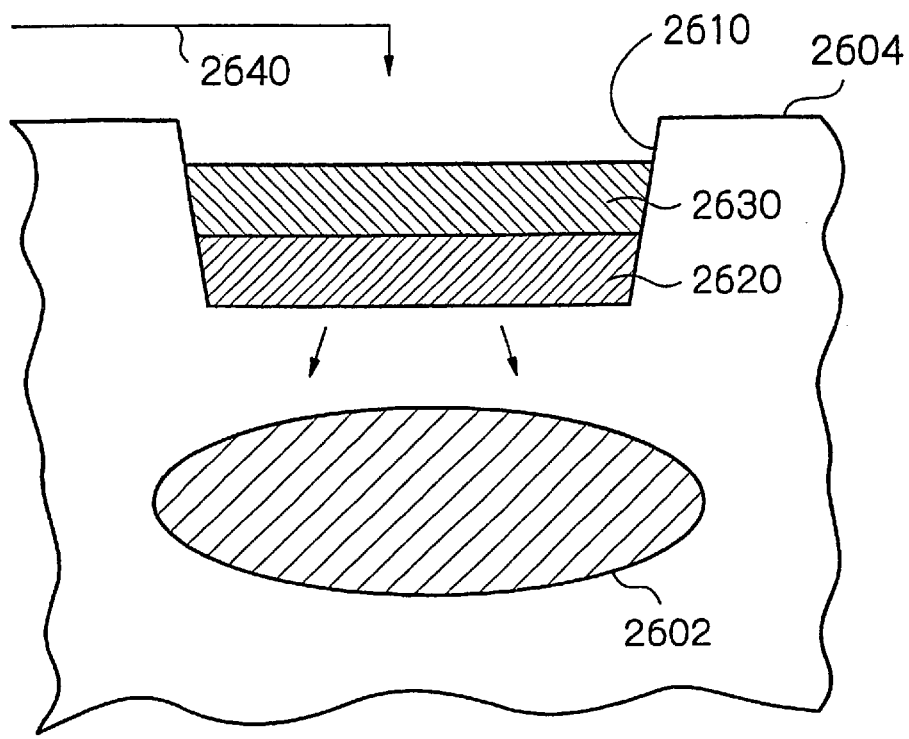
FIG. 32 is a schematic view showing a twenty-sixth embodiment of the present invention.

FIG. 32 shows another embodiment of a purification apparatus of the present invention. A shallow groove such as a trench, or an indentation, 2610, is dug in the ground surface. A groove is relatively narrow in width in comparison with a dimension in a direction in which the groove extends. On the other hand, an indentation may be narrow or broad in width. That is, a trench or groove is included in an indentation.

A reducing agent 2620, preferably a solid reducing agent, is filled as a first layer into a lower part of the indentation, and a nutrient source 2630, preferably a solid nutrient source, for heterotrophic anaerobic microorganisms is filled as a second layer into an upper part of the indentation. The indentation is provided above or upstream from a contaminated object 2602 containing halogenated organic compounds in the soil. Groundwater pumped up from the aquifer, or tap water may be sprinkled over the nutrient source 2630 via a line 2640. Alternatively, rainwater may be allowed to flow into the nutrient source 2630, without performing such sprinkling. In the case of groundwater, groundwater may be extracted from a pumping well having a strainer portion, or an underground wall, by a pump or the like, as stated earlier.

As a result, the sprinkled water or the rainwater passes through the nutrient source, turning into water containing the nutrient source. That is, a nutrient solution containing the nutrient source for heterotrophic anaerobic microorganisms and water is formed. Then, this nutrient solution is reduced with the reducing agent 2620. The reduced nutrient solution seeps into the soil by gravity, and is introduced into the contaminated object in the soil to purify the contaminated object.

A solid nutrient source is preferred as the nutrient source. As the solid nutrient source, it is preferred to use a solid organic material such as compost, manure, excess sludge, sediment with a high organic matter content, or organic waste. The solid nutrient source covers the reducing agent, and thus can decrease the contact of the reducing agent with oxygen in the air. Because of this arrangement, the reducing agent can be prevented from being consumed by reducing oxygen in the air.

Alternatively, it is permissible to provide a pumping well downstream from the contaminated object 2602, extract groundwater from this pumping well, and sprinkle groundwater over the nutrient source 2630 via the line 2604.

In FIG. 32, the indentation 2610 is formed at a lower level than a ground surface 2604. However, the indentation may be formed at a higher level than the ground surface 2604.

Figure 33:
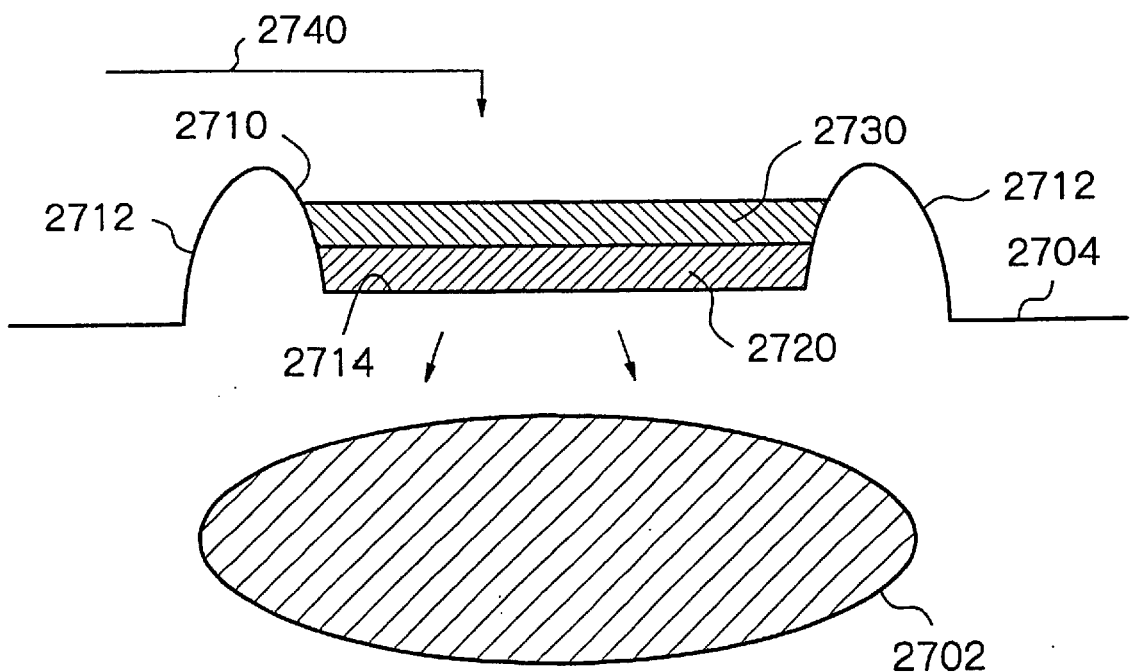
FIG. 33 is a schematic view showing a twenty-seventh embodiment of the present invention.

FIG. 33 shows another embodiment of the present invention. In order to form an indentation 2710, a protuberance 2712 is formed around a portion 2710 which will become the indentation 2710. The bottom 2714 of the indentation 2710 may be nearly on the same plane as a ground surface 2704, or may be at a higher or lower level than the ground surface 2704.

A reducing agent 2720, preferably a solid reducing agent, is filled as a first layer into a lower part of the indentation 2710, and a nutrient source 2730, preferably a solid nutrient source, for heterotrophic anaerobic microorganisms is filled as a second layer into an upper part of the indentation. Groundwater pumped up from the aquifer, or tap water may be sprinkled over the nutrient source 2730 via a line 2740. Alternatively, rainwater may be allowed to flow into the nutrient source 2730, without performing such sprinkling.

As a result, the sprinkled water or the rainwater passes through the nutrient source, turning into water containing the nutrient source. That is, a nutrient solution containing the nutrient source for heterotrophic anaerobic microorganisms and water is formed. Then, this nutrient solution is reduced with the reducing agent 2720. The reduced nutrient solution seeps into the soil by gravity, and is introduced into the contaminated object in the soil to purify the contaminated object.

The protuberance 2712 may be arranged repeatedly, whereby a plurality of the indentations 2710 may be formed repeatedly. The shape of the bottom surface of the indentation is not restricted, and may be quadrilateral or circular.

Alternatively, it is permissible to provide a pumping well downstream from a contaminated object 2702 with respect to the flow of groundwater, extract groundwater from this pumping well, and sprinkle groundwater over the nutrient source 2730 via the line 2704.

In the embodiments of FIGS. 32 and 33, particularly when the line is omitted, the contaminated object can be naturally purified each time the rain falls, and a power of a pump or the like is unnecessary.

What is claimed is:

1. A purification method for purifying a contaminated object containing halogenated organic compounds, including:

a reduction step in which a reducing agent having a standard electrode potential, relative to a standard hydrogen electrode at 25° C., of 300 mV to −2400 mV reduces a nutrient solution containing a nutrient source for heterotrophic anaerobic microorganisms and water; and an introduction step of introducing the reduced nutrient solution into the contaminated object after the reduction step.

2. The purification method as claimed in claim 1, wherein a well, an underground wall, a permeation gutter, a trench, or an indentation is used in the introduction step.

3. A purification method for purifying a contaminated object containing halogenated organic compounds, including:

a water reduction step of reducing water with a reducing agent having a standard electrode potential, relative to a standard hydrogen electrode at 25° C., of 300 mV to −2400 mV;

a contact step of bringing the water reduced in the reduction step into a nutrient source for heterotrophic anaerobic microorganisms to obtain a mixture containing the nutrient source; and an addition step of adding the mixture obtained in the contact step to the contaminated object.

4. The purification method as claimed in claim 3, wherein a well, an underground wall, a permeation gutter, a trench, or an indentation is used in the water reduction step, the contact step, or the addition step.

5. A purification method for purifying a contaminated object containing halogenated organic compounds, including:

a circulation step of circulating water so as to pass through the contaminated object; and a reduction step of reducing the circulating water with a reducing agent having a standard electrode potential, relative to a standard hydrogen electrode at 25° C., of 300 mV to −2400 mV.

6. The purification method as claimed in claim 5, wherein the reduction step is performed in soil.

7. The purification method as claimed in claim 5, wherein the circulation step has a step of taking in water present in the soil, and a step of discharging water into the soil.

8. The purification method as claimed in claim 7, wherein a well, an underground wall, a permeation gutter, a trench, or an indentation is used in the step of taking in water present in the soil.

9. The purification method as claimed in claim 7, wherein a well, an underground wall, a permeation gutter, a trench, or an indentation is used in the step of discharging water into the soil.

10. The purification method as claimed in claim 5, wherein the reduction step is performed by the reducing agent which is in a solid state, and insoluble or sparingly soluble in water.

11. The purification method as claimed in claim 5, wherein the reduction step is performed by the reducing agent which is water soluble.

12. The purification method as claimed in claim 5, having a nutrient source contact step of further bringing a nutrient source for heterotrophic anaerobic microorganisms into contact with water before being circulated.

13. The purification method as claimed in claim 5, having a nutrient source contact step of further bringing a nutrient source for heterotrophic anaerobic microorganisms into contact with water being circulated.

14. A purification apparatus for purifying a contaminated object containing halogenated organic compounds, comprising:

reduction means by which a reducing agent having a standard electrode potential, relative to a standard hydrogen electrode at 25° C., of 300 mV to −2400 mV reduces a nutrient solution containing a nutrient source for heterotrophic anaerobic microorganisms and water; and introduction means by which the reduced nutrient solution is introduced into the contaminated object via an introduction portion for introducing the reduced nutrient solution into the contaminated object.

15. The purification apparatus as claimed in claim 14, wherein the reduction means includes a contact device for bringing the nutrient solution into contact with the reducing agent which is in a solid state and is insoluble or sparingly soluble in water.

16. The purification apparatus as claimed in claim 14, wherein the reduction means includes a mixing device for mixing the nutrient solution with an aqueous solution containing the reducing agent which is water soluble.

17. The purification apparatus as claimed in claim 14, wherein the reduction means includes an underground wall filled with a water permeable filler, and the reducing agent is used as at least a part of the filler.

18. The purification apparatus as claimed in claim 14, further having pumping means for introducing the contaminated object into the introduction portion to perform circulation treatment of the contaminated object.

19. The purification apparatus as claimed in claim 14, wherein the introduction portion has a well, an underground wall, a permeation gutter, a trench, or an indentation.

20. The purification apparatus as claimed in claim 14, wherein the introduction means has a pump.

21. A purification apparatus for purifying a contaminated object containing halogenated organic compounds, characterized by having:

a reducing agent having a standard electrode potential, relative to a standard hydrogen electrode at 25° C., of 300 mV to −2400 mV;

a water intake portion located in the contaminated object or downstream from the contaminated object; and a water discharge portion located upstream from the water intake portion and located in the contaminated object or upstream from the contaminated object, and characterized in that water is circulated among the water intake portion, the reducing agent, and the water discharge portion to purify the contaminated object.

22. The purification apparatus as claimed in claim 21, wherein the reducing agent includes a reducing agent which is in a solid state and insoluble or sparingly soluble in water.

23. The purification apparatus as claimed in claim 21, wherein the reducing agent includes a water soluble reducing agent.

24. The purification apparatus as claimed in claim 21, wherein the reducing agent is located between the water intake portion and the water discharge portion.

25. The purification apparatus as claimed in claim 21, wherein the reducing agent is held in a reducing agent tank.

26. The purification apparatus as claimed in claim 21, wherein the water intake portion or the water discharge portion is provided in a well, an underground wall, a permeation gutter, a trench, or an indentation.

27. The purification apparatus as claimed in claim 21, having a pump in relation to circulation of water.

28. The purification apparatus as claimed in claim 21, further having a nutrient source for heterotrophic anaerobic microorganisms.

29. The purification apparatus as claimed in claim 28, wherein water before being circulated is contacted with the nutrient source.

30. The purification apparatus as claimed in claim 28, wherein water is circulated among the water intake portion, the reducing agent, the nutrient source, and the water discharge portion to purify the contaminated object.

31. The purification apparatus as claimed in claim 28, further having a nutrient source tank holding the nutrient source.

32. A purification apparatus for purifying contaminated soil containing halogenated organic compounds, including:

an indentation formed in a ground surface above or upstream from the contaminated soil;

a reducing agent disposed in the indentation and having a standard electrode potential, relative to a standard hydrogen electrode at 25° C., of 300 mV to −2400 mV; and a nutrient source for heterotrophic anaerobic microorganisms which is disposed above the reducing agent.

33. The purification apparatus as claimed in claim 32, wherein the reducing agent is a solid.

34. The purification apparatus as claimed in claim 32, wherein the nutrient source is a solid.

35. The purification apparatus as claimed in claim 32, wherein the reducing agent and the nutrient source are each arranged in a layer, and the layer comprising the nutrient source covers the layer comprising the reducing agent.

* * * * *

UNITED STATES PATENT AND TRADEMARK OFFICE
CERTIFICATE OF CORRECTION

PATENT NO. : 6,679,992 B1
DATED : January 20, 2004
INVENTOR(S) : Kitagawa et al.

It is certified that error appears in the above-identified patent and that said Letters Patent is hereby corrected as shown below:

<u>Title Page,</u>
Item [30], Foreign Application Priority Data, insert:
-- (30)      Foreign Application Priority Data

Jan. 25, 1999    (JP)      ……………………...    11-015929
       Feb. 10, 1999    (JP)      ……………………...    11-033403
       Jun. 4, 1999     (JP)      ……………………..    11-158100     --

Signed and Sealed this

Eighth Day of June, 2004

JON W. DUDAS
*Acting Director of the United States Patent and Trademark Office*